(12) United States Patent
Tsunoda et al.

(10) Patent No.: US 7,032,237 B2
(45) Date of Patent: Apr. 18, 2006

(54) DATA COMMUNICATION SYSTEM AND RECEIVING APPARATUS TO BE USED FOR SUCH SYSTEM

(75) Inventors: Tomohiro Tsunoda, Tokyo (JP); Shinobu Kuriya, Chiba (JP)

(73) Assignee: Sony Corporation, Tokyo (JP)

( * ) Notice: Subject to any disclaimer, the term of this patent is extended or adjusted under 35 U.S.C. 154(b) by 1108 days.

(21) Appl. No.: 09/765,008

(22) Filed: Jan. 18, 2001

(65) Prior Publication Data

US 2001/0024425 A1  Sep. 27, 2001

(30) Foreign Application Priority Data

Jan. 19, 2000  (JP)  ............................. 2000-010420

(51) Int. Cl.
*H04N 7/173*  (2006.01)
(52) U.S. Cl. .......................... 725/87; 725/114; 725/131
(58) Field of Classification Search .................. 725/87, 725/114, 115, 116, 131, 132, 133, 134
See application file for complete search history.

(56) References Cited

U.S. PATENT DOCUMENTS

| | | | | |
|---|---|---|---|---|
| 5,293,161 | A | * | 3/1994 | MacDonald et al. ......... 340/7.6 |
| 5,367,686 | A | * | 11/1994 | Fisher et al. ................. 717/174 |
| 5,404,505 | A | * | 4/1995 | Levinson ...................... 707/10 |
| 5,559,549 | A | * | 9/1996 | Hendricks et al. ............ 725/50 |
| 5,671,225 | A | * | 9/1997 | Hooper et al. ............... 370/468 |
| 6,098,099 | A | * | 8/2000 | Ellesson et al. ............. 709/223 |
| 6,236,395 | B1 | * | 5/2001 | Sezan et al. ................. 715/723 |
| 6,604,243 | B1 | * | 8/2003 | Freimann ..................... 725/131 |
| 6,774,926 | B1 | * | 8/2004 | Ellis et al. ................. 348/14.01 |
| 6,845,448 | B1 | * | 1/2005 | Chaganti et al. ............ 713/166 |

FOREIGN PATENT DOCUMENTS

| | | |
|---|---|---|
| EP | 0 963 115 | 12/1999 |
| WO | WO 95 08226 | 3/1995 |
| WO | WO 98 37696 | 8/1998 |
| WO | WO 99 41881 | 8/1999 |

* cited by examiner

*Primary Examiner*—Christopher Grant
*Assistant Examiner*—Dominic Saltarelli
(74) *Attorney, Agent, or Firm*—Frommer Lawrence & Haug LLP; William S. Frommer

(57) ABSTRACT

A data communication system including a transmitting apparatus, a plurality of receiving apparatuses, a data transmitting apparatus, a data selecting and receiving means, a profile ID linking means, and a received data processing means. The transmitting apparatus incorporates a contents data generating means for generating a contents data. The data transmitting apparatus transmits data between the transmitting apparatus and the receiving apparatuses. The received data processing means processes data received by the data selecting and receiving means. The profile ID linking means initially generates a profile ID corresponding to a profile related to the contents data and/or transmission and reception of the contents data and then causes the profile ID to be linked with the contents data.

2 Claims, 22 Drawing Sheets

DATA COMMUNICATION SYSTEM AND RECEIVING APPARATUS TO BE USED FOR SUCH SYSTEM

BACKGROUND OF THE INVENTION

1. Field of the Invention

The present invention relates to a data communication system and a data receiving apparatus to be used for such data communication system. More particularly, the present invention relates to such a data communication system capable of selectively receiving data solely required for user by way of utilizing existing broadcasting facilities without requiring specific broadcast facilities even when volume of broadcast data becomes excessively large, and yet, the present invention also relates to a data receiving apparatus to be used for this data communication system.

2. Description of the Related Art

In consideration of existing problems such as difficulty to obtain unpredictable data like news reports at an appropriate timing during communication via personal computers and also due to such a difficulty to precisely set up required data in the character multiplex broadcast system, the Japanese Laid-Open Patent Publication No. HEISEI-8-8859/1996 has proposed such a data communication system which is constructed to add classification codes to character data or the like in accordance with the data contents for broadcasting and enables a portable terminal apparatus to select character data or the like in accordance with classification codes received from another communication system before receiving the character data.

According to the Japanese Laid-Open Patent Publication No. HEISEI-8-8859/1996, in the above-referred data communication system, it is possible for such a portable terminal apparatus capable of receiving data broadcast via addition of individual classification codes per news report to automatically receive the latest news as much desired as possible any time and anywhere by selecting news reports via classification codes received from another communication system.

Nevertheless, the data communication system disclosed in the above-cited Japanese Laid-Open Patent Publication No. HEISEI-8-8859/1996 still had such a problem to solve in that the system was invented to quickly and selectively receive character data such as news reports requiring the prompt delivery of news contents, and thus, when excessive data has been broadcast, it is impracticable for user to solely receive such a data actually being required.

More particularly, it is expected that the number of channels in the digital broadcast system will greatly be increased in the near future to cause an enormous amount of data to be broadcast, and yet, individuals, shops, restaurants, and others, will also transmit data messages via receivable short-distance broadcast systems within specific local areas to cause the data amount to be increased furthermore. However, in the above-cited data communication system, the above-referred classification codes added to character data or the like are solely related to the contents of the data such as character data to be broadcast, and yet, only a single classification code is added to character data or the like. As a result, in the event that the amount of data for broadcasting has ever been increased excessively, it is quite difficult for any user to selectively receive such a data actually being required.

SUMMARY OF THE INVENTION

Accordingly, it is an object of the present invention to provide such a data communication system capable of selectively and solely receiving such a data required for reception by user even when the amount of broadcast data is increased excessively.

It is another object of the present invention to provide such a data receiving apparatus which is compatible with such a data communication system capable of selectively and solely receiving such a data required for reception by user even when amount of broadcast data is increased excessively, and yet, the system can be manufactured at a low cost.

The present invention provides such a data communication system which structurally consists of the following: a data transmitting apparatus provided with a contents data generating means for generating contents data; a plurality of data receiving apparatuses; and a data transmitting apparatus for transmitting data between the above-referred data transmitting apparatus and the above-referred data receiving apparatuses; wherein at least one of the plural data receiving apparatuses is provided with a data selecting and receiving means for selecting and receiving data transmitted from the transmitting apparatus and a received data processing means for processing data received by the data selecting and receiving means.

The data communication system further comprises the following: a profile ID linking means which generates a profile ID corresponding to such a profile related to the above-referred contents data and/or transmission/reception of the contents data and then causes the profile ID to be linked with the contents data; wherein at least one of the above-referred data receiving apparatuses changeably incorporates a data receiving device incorporating a received profile ID data memory means for storing profile ID data including receivable profile ID data, wherein the above-referred data selecting and receiving means selects and receives data based on the profile ID.

According to the present invention, the above-referred profile ID linking means generates such a profile ID corresponding to such a profile related to contents data and/or transmission and reception of the contents data to enable the profile to be linked with the contents data before broadcasting them. As a result, it is possible for any user to solely receive such a contents data linked with a specific profile ID by utilizing such a receiving device incorporating a received profile ID data memory means which stores profile ID data including receivable profile ID data. Accordingly, even when the number of channel in the digital broadcast system is rapidly increased in the near future to cause an enormous amount of data to be broadcast to further cause individuals, shops, or restaurants, to transmits a variety of data via receivable short-distance broadcast system within specific areas to result in the excessive amount of data being broadcasted, it is possible for the data receiving apparatus to solely and selectively receive the required data.

Further, according to the present invention, the data receiving apparatus changeably incorporates such a receiving device incorporating a received profile ID data memory means for storing profile ID data including receivable profile ID data. Accordingly, by way of providing other data receiving apparatuses with receiving devices as well to enable them to utilize the received profile ID data stored in the received profile ID data memory means, it is possible to efficiently and selectively receive only the contents data required for users via a plurality of data receiving apparatuses.

Further, according to the present invention, inasmuch as the data receiving apparatus changeably incorporates such a data receiving device incorporating a received profile ID data memory means which stores such a profile ID data including received profile ID data, it is possible for each of received profile ID data to fully protect own privacy.

Further, according to the present invention, inasmuch as the data receiving device is changeably built in a data-receiving apparatus and portable itself, it is possible for user to receive desired contents data anywhere.

In a preferred aspect for implementing the present invention, by way of causing the above-referred profile ID linking means to add the above-referred profile ID data to the above-referred contents data to be linked with each other, it is so arranged that, based on the profile ID data, the above-referred data selecting and receiving means selectively receives the contents data.

In a further preferred aspect for implementing the present invention, the above-referred profile ID linking means comprises the following: a profile generating means which generates the above-referred contents data and/or such a profile related to transmission and reception of the contents data; a profile ID generating means which generates profile ID data in correspondence with the profile of the above-referred contents data generated by the profile generating means; a profile data memory means which stores the profile related to the above-referred contents data and/or transmission and reception of the contents data and also stores profile data which is generated by the above-referred profile ID generating means and includes the above-referred profile ID data related to each of the corresponding profiles; a profile selecting means which selects at least one of profiles and a profile ID data corresponding thereto; a profile ID determining means which determines such a profile ID to be linked with the contents data based on a profile ID data generated by the above-referred profile ID generating means and/or based on such a profile ID data selected by the above-referred profile selecting means; and a profile ID data writing means which causes the above-referred profile ID data determined by the above-referred profile ID determining means to be written into the corresponding contents data. Further, the above-referred data transmitting apparatus incorporates a data transmitting means which transmits the contents data containing the profile ID data written by the above-referred profile ID data writing means.

In a still further preferred aspect for implementing the present invention, at least one of the above-referred data receiving apparatuses incorporates such a received profile ID data processing means which analyzes the above-referred profile ID data received by the above-referred data selecting and receiving means and then changes the received profile ID data stored in the above-referred received profile ID data memory means.

In a still further preferred aspect for implementing the present invention, the above-referred data receiving device of at least one of the data receiving apparatuses incorporates the above-referred received profile ID data processing means which is capable of changing the received profile ID data stored in the above-referred received profile ID data memory means by way of analyzing the profile ID data received by the above-referred data selecting and receiving means.

In a still further preferred aspect for implementing the present invention, the data receiving device is changeably built in the data receiving apparatus, where the data receiving device incorporates a received profile ID data processing means which is capable of changing the received profile ID data stored in the received profile ID data memory means by way of analyzing the profile ID data received by the data selecting and receiving means. Inasmuch as the data receiving device analyzes the profile ID data received by the data selecting and receiving means as the received antecedents data and then rewrites the received profile ID data stored in the received profile ID data memory means, by way of setting the data receiving devices inside of a plurality of data receiving apparatuses, it is possible to generate a receivable profile ID data based on the profile ID data received by a plurality of data-receiving apparatuses before storing the profile ID data in the received profile ID memory means.

According to a still further preferred aspect for implementing the present invention, inasmuch as the data receiving device is changeably built in the data receiving apparatus and portable itself, user can receive desired contents data anywhere.

According to a still further preferred aspect for implementing the present invention, a data receiving device of at least one of the data receiving apparatuses incorporates the above-referred data selecting means.

According to a still further preferred aspect for implementing the present invention, inasmuch as the data receiving device changeably built in the data receiving apparatus incorporates a data selecting means, it is possible for user to efficiently and selectively receive only the required contents data by way of utilizing a plurality of data receiving apparatuses merely by carrying the data receiving device.

According to a still further preferred aspect for implementing the present invention, the above-referred received profile ID data processing means generates the above-referred receivable profile ID data or changes the received profile ID data stored in the received profile ID data memory means.

According to a still further preferred aspect for implementing the present invention, inasmuch as one of the data receiving apparatuses incorporates a received profile ID processing means capable of generating receivable profile ID data or changing said profile ID data, it is possible to update the received profile ID data in correspondence with new contents data to be broadcast or in response to user's need.

According to a still further preferred aspect for implementing the present invention, the above-referred data receiving device of at least one of the above-referred data receiving apparatuses further incorporates the above-referred received data processing means.

According to a still further preferred aspect for implementing the present invention, inasmuch as the data receiving device changeably built in one of the data receiving apparatuses further incorporates a received data processing means, it is possible for user to efficiently and selectively receive only the required contents data by way of utilizing a plurality of data receiving apparatuses merely by carrying the data receiving device.

According to a still further preferred aspect for implementing the present invention, inasmuch as the data receiving device is changeably built in a data receiving apparatus and portable itself, it is possible for user to receive desired contents data anywhere.

According to a still further preferred aspect for implementing the present invention, the above-referred data selecting and receiving means incorporates a profile ID identifying means which identifies whether the contents data should be received or not based on the profile ID data added to said contents data and in accordance with the received profile ID data stored in the received profile ID data memory means, and yet, it also incorporates a data receiving means which solely receives such contents data identified to be receivable by the profile ID identifying means.

According to a still further preferred aspect for implementing the present invention, the above-referred received data processing means incorporates the following: an event signal generating means which generates and outputs an event signal for executing a predetermined process in accordance with the above-referred profile ID data identified to be receivable by the above-referred profile ID identifying means; and a contents data processing means which executes a predetermined process against an event processing data for coordinating the profile ID data with the processed contents and also against the contents data; wherein the event signal generating means generates the event signal based on the event processing data, whereas the contents data processing means executes a predetermined process against the contents data in accordance with the event signal generated by the event signal generating means.

According to a still further preferred aspect for implementing the present invention, inasmuch as the above-referred event signal generating means generates an event signal based on the event processing data, and yet, inasmuch as the above-referred contents data processing means executes a predetermined process against the contents data in accordance with the event signal generated by the event signal generating means, it is possible for user to cause other data-receiving apparatuses to receive urgently required contents data in accordance with priority order to improve utility of the data communication system.

According to a still further preferred aspect for implementing the present invention, the event processing data is stored in the above-referred received profile ID data memory means.

According to a still further preferred aspect for implementing the present invention, at least one of the data receiving apparatuses further incorporates an event processing data memory means which stores the event processing data.

According to a still further preferred aspect for implementing the present invention, the data receiving device built in at least one of the data receiving apparatuses incorporates the event processing data memory means.

According to a still further preferred aspect for implementing the present invention, inasmuch as a data receiving device changeably built in one of data receiving apparatuses incorporates an event processing data memory means, it is possible for user to cause other data receiving apparatuses to receive urgently required contents data in accordance with priority order to improve utility of the data communication system.

In a still further preferred aspect for implementing the present invention, the above-referred received data processing means incorporates a contents data memory means for cumulatively storing received contents data, whereas the above-referred contents data processing means causes the above-referred contents data memory means to cumulatively store received contents data and processes contents data cumulatively stored in the contents data memory means.

In a still further preferred aspect for implementing the present invention, the received data processing means further incorporates an event signal processing means which executes a predetermined process against the data receiving apparatus based on an event signal generated by the above-referred event signal generating means and in accordance with the event processing data.

In another preferred aspect for implementing the present invention, the above-referred data transmitting apparatus solely transmits the profile ID data linked with the contents data, and yet, the above-referred data selecting and receiving means built in at least one of the data receiving apparatuses incorporates an profile ID identifying means which identifies whether contents data linked with the profile ID data should be received or not based on the profile ID data and an contents data transmission requesting means which outputs a data transmission request signal against the data transmitting apparatus by way of requesting transmission of such a contents data linked with the profile ID data.

According to another preferred aspect for implementing the present invention, the data transmitting apparatus solely transmits such a profile ID data linked with a contents data, whereas the data receiving apparatus solely receives such a profile ID data linked with a contents data. Accordingly, it is possible for user to request the transmitting apparatus to transmit a contents data and selectively receive only the required contents data based on the received profile ID data. In consequence, the data communication system can selectively receive such a contents data actually required by user, thus decreasing the amount of data to be broadcast.

According to a further preferred aspect for implementing the present invention, the above-referred profile ID linking means causes the profile ID data to be linked with the contents data via addition thereto, whereas the above-referred data selecting and receiving means selectively receives the contents data based on the profile ID data.

In a still further preferred aspect for implementing the present invention, the above-referred profile ID linking means comprises the following: a profile generating means which generates such a profile data related to the contents data and/or transmission and reception of the contents data; a profile ID generating means which generates a profile ID in correspondence with the profile of the contents data generated by the profile generating means; a profile data memory means which stores the profile the contents data generated by the profile generating means and/or transmission and reception of the contents data and also stores a profile data including the profile ID which is generated by the profile ID generating means and related to each of the corresponding profiles; a profile selecting means which selects at least one profile from the profile data and a profile ID corresponding thereto from the profile data stored in the profile data memory means; a profile ID determining means which determines such a profile ID that should be linked with the contents data based on the profile ID generated by the profile ID generating means and/or based on such a profile ID selected by the profile selecting means; and a profile ID writing means which writes the profile ID determined by the profile ID determining means into the corresponding contents data. The above-referred data transmitting means incorporates a data transmitting means which causes the contents data containing the profile ID written by the above-referred profile ID writing means to be transmitted via the broadcast form.

In a still further preferred aspect for implementing the present invention, at least one of the data receiving apparatuses incorporates a received profile ID data processing means which analyzes the profile ID received by the data selecting and receiving means and then changes the received profile ID data stored in the received profile ID data memory means.

In a still further preferred aspect for implementing the present invention, the data receiving device built in at least one of the data receiving apparatuses incorporates the above-referred received profile ID data processing means which analyzes the profile ID received by the data selecting and receiving means and then changes the received profile ID data stored in the received profile ID data memory means.

According to a still further preferred aspect for implementing the present invention, the data receiving device is changeably built in one of the data receiving apparatuses. The data receiving device incorporates such a received profile ID data processing means which analyzes a profile ID received by the data selecting and receiving means and then changes the received profile ID stored in the received profile ID data memory means. The received profile ID data processing means analyzes such a profile ID data received by the data selecting and receiving means as the received antecedent data and then rewrites the received profile ID data stored in the received profile ID memory means. Accordingly, by way of setting a plurality of data receiving devices inside of a plurality of data receiving apparatuses, it is possible to generate a receivable profile ID data based on a profile ID received by a plurality of data receiving apparatuses and then store them in the received profile ID memory means.

In a still further preferred aspect for implementing the present invention, the above-referred data receiving device built in at least one of the data receiving apparatuses further incorporates the above-referred data selecting and receiving means.

According to a still further preferred aspect for implementing the present invention, inasmuch as the data receiving device changeably built in one of the data receiving apparatuses incorporates a data selecting and receiving means, it is possible for user to efficiently and selectively receive only the required contents data by utilizing a plurality of data receiving apparatuses merely by carrying the data receiving device itself.

According to a still further preferred aspect for implementing the present invention, inasmuch as the data receiving device is changeably built in one of the data receiving apparatuses and yet portable itself, user can receive desired contents data anywhere.

In a still further preferred aspect for implementing the present invention, the above-referred received profile ID data processing means generates the above-referred receivable profile ID data or changes the received profile ID data stored in the above-referred received profile ID data memory means.

According to a still further preferred aspect for implementing the present invention, inasmuch as the data receiving device incorporates the received profile ID data processing means which generates or changes the receivable profile ID data, it is possible to update the received profile ID data in accordance with a contents data to be broadcasted or in response to user's need.

According to a still further preferred aspect for implementing the present invention, inasmuch as the data receiving device is changeably built in one of the data receiving apparatuses and yet portable itself, user can receive desired contents data anywhere.

In a still further aspect for implementing the present invention, the above-referred data receiving device built in at least one of the data receiving apparatuses further incorporates the above-referred received data processing means.

According to a still further preferred aspect for implementing the present invention, inasmuch as the data receiving device changeably built in one of the data receiving apparatuses further incorporates the above-referred received data processing means, it is possible for user to efficiently and selectively receive only the required contents data by way of utilizing a plurality of data receiving apparatuses merely by carrying the data receiving device itself.

According to a still further preferred aspect for implementing the present invention, inasmuch as the data receiving device is changeably built in one of the data receiving apparatuses and yet portable itself, user can receive desired contents data anywhere according to a still further preferred aspect for implementing the present invention, the above-referred data selecting and receiving means incorporates a profile ID identifying means which identifies whether the contents data should be received or not based on the profile ID data added to the contents data and in accordance with the received profile ID data stored in the above-referred received profile ID data memory means, and yet, it also incorporates a data receiving means which solely receives such a contents data identified to be receivable by the profile ID identifying means.

In a still further preferred aspect for implementing the present invention, the above-referred received data processing means incorporates an event signal generating means which generates such an event signal for instructing that a predetermined process should be executed in accordance with the profile ID data identified to be receivable by the above-referred profile ID identifying means, and yet, it also incorporates a contents data processing means which executes a predetermined process against an event processing data coordinating the profile ID data with the processing contents and the contents data; wherein the event signal generating means generates the event signal based on the event processing data, whereas the contents-data processing means executes a predetermined process against a contents data in accordance with the even signal generated by the event signal generating means.

According to a still further preferred aspect for implementing the present invention, inasmuch as the above-referred event signal generating means generates an event signal based on the event processing data, and yet, inasmuch as the above-referred contents data processing means executes a predetermined process against contents data in accordance with the event signal generated by the event signal generating means, it is possible for user to cause other data receiving apparatuses to receive only the urgently required contents data by way of adding a priority order thereto, whereby improving utility of the data communication system.

In a still further preferred aspect for implementing the present invention, the above-referred event processing data is stored in the above-referred received profile ID data memory means.

In a still further preferred aspect for implementing the present invention, at least one of the data receiving apparatuses further incorporates an event processing data memory means which stores the event processing data therein.

In a still further preferred aspect for implementing the present invention, the above-referred data receiving device built in at least one of the data receiving apparatuses incorporates the event processing data memory means.

According to a still further preferred aspect for implementing the present invention, inasmuch as the data receiving device changeably built in one of the data receiving apparatuses further incorporates an event processing data memory means, it is possible for user to cause other data receiving apparatuses to receive only the urgently required contents data by adding a priority order thereto, whereby improving utility of the data communication system.

In a still further preferred aspect for implementing the present invention, the above-referred received data processing means incorporates a contents data memory means which cumulatively stores received contents data, wherein the above-referred contents data processing means causes the contents data memory means to cumulatively store received contents data, and yet, the contents data processing means processes contents data cumulatively stored in the contents data memory means.

In a still further preferred aspect for implementing the present invention, the above-referred received data processing means incorporates an event signal processing means which executes a predetermined process against the above-referred data receiving apparatuses based on an event signal generated by the above-referred event signal generating means and in accordance with the event processing data.

In a still further preferred aspect for implementing the present invention, at the moment at which the above-referred profile ID identifying means identifies whether transmission of contents data linked with the profile ID data should be requested or not, the above-referred event signal generating means generates an event signal to enable the above-referred contents data transmission requesting means to output a transmission request signal for requesting transmission of such a contents data linked with the profile ID data.

In a still further preferred aspect for implementing the present invention, such a communication data processing apparatus is provided, which receives a data transmitted from the above-referred transmitting apparatus and then transmits the received data to at least one of the above-referred data receiving apparatuses, wherein the communication data processing apparatus incorporates the above-referred profile ID linking means.

In a still further preferred aspect for implementing the present invention, the above-referred profile ID linking-means comprises the following: a profile generating means which generates such a profile related to the contents data and/or transmission and reception of the contents data; a profile ID generating means which generates a profile ID data in correspondence with the profile of the contents data generated by the profile generating means; a profile data memory means which stores the profile data related to the contents data and/or transmission and reception of the contents data generated by the profile generating means and also stores a profile data including the profile ID data related to each of the corresponding profiles; a profile selecting means which selects at least one profile and the corresponding profile ID data from the profile data stored in the profile data memory means; a profile ID determining means which determines such a profile ID that should be linked with the contents data based on such a profile ID data selected by the profile ID generated by the profile ID generating means and also based on such a profile ID selected by the profile selecting means; and a profile ID writing means which writes the profile ID data determined by the profile ID determining means into the corresponding contents data. Further, the above-referred data transmitting apparatus incorporates a data transmitting means which transmits the contents data containing the profile ID written by the profile ID writing means via the broadcasting form.

In a still further preferred aspect for implementing the present invention, at least one of the above-referred data receiving apparatuses incorporates a received profile ID data processing means which analyzes the profile ID data received by the above-referred data selecting and receiving means and then changes the received profile ID data stored in the above-referred received profile ID data memory means.

In a still further preferred aspect for implementing the present invention, the above-referred data receiving device built in at least one of the data receiving apparatuses incorporates the above-referred received profile ID data processing means which analyzes the profile ID data received by the above-referred data selecting and receiving means and then changes the received profile ID data stored in the above-referred received profile ID data memory means.

According to a still further preferred aspect for implementing the present invention, the data receiving device is changeably built in one of the data receiving apparatuses, wherein the data receiving device incorporates a received profile ID data processing means which analyzes a profile ID data received by the data selecting and receiving means and then changes the received profile ID data stored in the above-referred received profile ID data memory means. Inasmuch as the data receiving device analyzes the profile ID data received by the data selecting and receiving means and then rewrites the received profile ID data stored in the received profile ID data memory means, by way of setting the data receiving devices inside of a plurality of data receiving apparatuses, it is possible to generate a receivable profile ID data based on the profile ID data received by a plurality of the data receiving apparatuses and then store them in the received profile ID data memory means.

In a still further preferred aspect for implementing the present invention, the data receiving device built in at least one of the above-referred data receiving apparatuses further incorporates the above-referred data selecting and receiving means.

According to a still further preferred aspect for implementing the present invention, inasmuch as the data receiving device changeably built in one of the data receiving apparatuses incorporates a data selecting and receiving means, it is possible for user to efficiently and selectively receive only the required contents data by utilizing a plurality of data receiving apparatuses merely by carrying the data receiving device itself.

According to a still further preferred aspect for implementing the present invention, the data receiving device is changeably built in one of the data receiving apparatuses and portable itself to enable user to receive desired contents data anywhere.

In a still further preferred aspect for implementing the present invention, the above-referred received profile ID data processing means generates the received profile ID data or changes the received profile ID data stored in the above-referred received profile ID data memory means.

According to a still further aspect for implementing the present invention, inasmuch as the data receiving device incorporates a received profile ID processing means which generates the received profile ID or changes the received profile ID, it is possible to update the received profile ID in accordance with a contents data to be broadcasted or in response to user's need.

In a still further preferred aspect for implementing the present invention, the data receiving device built in at least one of the data receiving apparatuses further incorporates the above-referred received data processing means.

According to a still further preferred aspect for implementing the present invention, inasmuch as the data receiving device changeably built in one of the data receiving apparatuses further incorporates a received data processing means, it is possible for user to efficiently and selectively receive only the required contents data by utilizing a plurality of data receiving apparatuses merely by carrying the data receiving device itself.

According to a still further preferred aspect for implementing the present invention, inasmuch as the data receiving device is changeably built in one of the data receiving apparatuses and portable itself, user can receive desired contents data anywhere.

In a still further preferred aspect for implementing the present invention, the above-referred data selecting and receiving means incorporates a profile ID identifying means which identifies whether the contents data should be received or not based on the profile ID added to the contents data and in accordance with the received profile ID data stored in the above-referred received profile ID data memory means and a data receiving means which solely receives such a contents data identified to be receivable by the profile ID identifying means.

In a still further preferred aspect for implementing the present invention, the above-referred received data processing means incorporates an event signal generating means which generates such an event signal for instructing that a predetermined process should be executed in accordance with the profile ID data identified to be receivable by the above-referred profile ID identifying means and a contents data processing means which executes a predetermined process against such an event processing data coordinating profile ID data with processing contents and also against the contents data. It is so arranged that the event signal generating means generates the event signal based on the event processing data, whereas the contents data processing means executes a predetermined process against the contents data in accordance with the event signal generated by the event signal generating means.

According to a still further preferred aspect for implementing the present invention, inasmuch as the above-referred event signal generating means generates an event signal based on the event processing data, and yet, inasmuch as the above-referred contents data processing means executes a predetermined process against the contents data in accordance with an event signal generated by the event signal generating means, it is possible for user to cause other data receiving apparatuses to receive only the urgently required contents data by way of adding a priority order thereto, whereby improving utility of the data communication system.

In a still further preferred aspect for implementing the present invention, the above-referred event processing data is stored in the above-referred received profile ID data memory means.

In a still further preferred aspect for implementing the present invention, at least one of the above-referred data receiving apparatuses further incorporates an event processing data memory means which stores the event processing data therein.

In a still further preferred aspect for implementing the present invention, the data receiving device built in at least one of data receiving apparatuses incorporates the above-referred event processing data memory means.

According to a still further preferred aspect for implementing the present invention, inasmuch as the data receiving device changeably built in one of the data receiving apparatuses further incorporates an event processing data memory means, it is possible for user to cause other data receiving apparatuses to receive only the urgently required contents data by way of adding a priority order thereto, whereby improving utility of the data communication system.

In a still further preferred aspect for implementing the present invention, the above-referred received data processing means incorporates a contents data memory means which cumulatively stores received contents data, wherein the above-referred contents data processing means causes the contents data memory means to cumulatively store the received contents data, and yet, the contents-data processing means processes the contents data cumulatively stored in the contents data memory means.

In a still further preferred aspect for implementing the present invention, the above-referred received data processing means further incorporates an event signal processing means which executes a predetermined process against the above-referred data receiving apparatus based on an event signal generated by the above-referred event signal generating means and in accordance with the event processing signal.

In a still further preferred aspect for implementing the present invention, the above-referred data receiving device comprises such a recording medium selected from a group consisting of a "Sim Card", a "Smart Media", a "Memory Stick", a "Compact Flash", and a "Memory Card".

According to a still further preferred aspect for implementing the present invention, inasmuch as the above-referred data receiving device comprises such a recording medium consisting of a "Sim Card", or a "Smart Media", or a "Memory Stick", or a "Compact Flash", or a "Memory Card", which are individually portable, user can receive desired contents data anywhere.

In a still further preferred aspect for implementing the present invention, the above-referred data receiving device further incorporates a verified data memory means which stores a verified data, wherein at least one of the above-referred data receiving apparatuses incorporates such a verifying means which initially reads a verified data stored in the verified data memory means of the data receiving device and then approves connection of the receiving apparatus to the data receiving device solely in such a case in which the read-out verified data exactly corresponds to a predetermined verified data.

According to a still further preferred aspect for implementing the present invention, even though there is a fear of losing the portable data receiving device, it is still possible to securely prevent the device from being abused by others.

In a still further preferred aspect for implementing the present invention, applicable verifying data comprises a variety of biometrical data such as finger-print data, or a vein distribution data, or a voice-print data, or such a data related to reddened symptom of eye-balls, or individual pass words.

In a still further preferred aspect for implementing the present invention, the above-referred profile comprises such a data related to the contents of contents data, such a data related to the above-referred data transmitting apparatus, and such a data related to the above-referred data receiving apparatuses.

In a still further preferred aspect for implementing the present invention, such a data related to the above-referred data transmitting apparatus includes the name of the data transmitter, time and location related to data transmission, and the method of data transmission.

In a still further preferred aspect for implementing the present invention, the data related to the above-referred data receiving apparatuses includes the following: sexual classification, age, blood type, birth date, full name, address, zip code, ID address, home telephone number, portable telephone number, mail address, kinds of equipment for composing a data receiving apparatus, receptive capacity of the available data receiving apparatus, reproduction capacity of the available data receiving apparatus, kinds of operating system and names of POP and SMTP servers of the available data receiving apparatus, group ID of data receiving persons, group identifier, and individual ID and passwords, for example.

In a still further preferred aspect for implementing the present invention, the above-referred profile includes such a data containing the tree structure.

In a still further preferred aspect for implementing the present invention, at least one of the above-referred data receiving apparatuses incorporates a profile ID resetting means which counts the rounds of data reception performed by the above-referred data selecting and receiving means, and then, if the rounds of data reception performed by the data selecting and receiving means is less than the predetermined rounds within a predetermined time, the profile ID resetting means resets the above-referred profile ID used for selecting data by the data selecting and receiving means to be back to such a profile ID that corresponds to such a profile ID having own layer being upper than the profile in the tree-structure corresponding to the above-referred profile ID.

In a still further preferred aspect for implementing the present invention, the above-referred profile ID resetting means counts the rounds of data reception performed by the data selecting and receiving means, and then, if the rounds of data reception performed by the data selecting and receiving means is less than the predetermined rounds within a predetermined time, the profile ID resetting means resets the above-referred profile ID used for selecting data by the data selecting and receiving means to be back to such a profile ID that corresponds to such a profile ID having own layer upper than the profile in the tree-structure corresponding to the above-referred profile ID. Accordingly, it is possible to properly control the rounds of data reception- in correspondence with the rounds of data reception within a predetermined time immediately before the present time.

In a still further preferred aspect for implementing the present invention, the above-referred profile ID comprises an identifier.

In a still further preferred aspect for implementing the present invention, it is so arranged that the above-referred profile ID linking means causes a plurality of the profile IDs to be linked with the contents data.

In a still further preferred aspect for implementing the present invention, it is so arranged that the above-referred profile ID linking means causes the plural profile IDs to be linked with the contents data via forms of AND, OR, NAND, NOR, or NOT.

In a still further preferred aspect for implementing the present invention, at least one of the above-referred data receiving apparatuses incorporates the following: a contents-data generating means which generates contents data; a profile generating means which generates such a profile related to the contents data generated by the contents-data generating means and its transmission and reception; a profile ID generating means which generates profile ID data in correspondence with the profile of the contents data generated by the profile generating means; a profile data memory means which stores the profile related to the contents data and/or transmission and reception of the contents data generated by the profile generating means and also stores such a profile data generated by the profile ID generating means and contains the profile ID related to each of the corresponding profiles; a profile selecting means which selects at least one profile and a profile ID data corresponding thereto from the profile data stored in the profile data memory means; a profile ID determining means which determines such a profile ID data that should be linked with the contents data based on a profile ID generated by the profile ID generating means and/or such a profile ID selected by the profile selecting means; a profile ID writing means which writes the profile ID determined by the profile ID determining means into the corresponding contents data; and a data transmitting means which transmits the contents data containing the profile ID data written by the profile ID writing means via the broadcasting form.

According to a preferred aspect for implementing the invention, the above-referred data receiving apparatus initially generates a contents data and then causes profile ID data to be linked therewith whereby enabling the linked contents data and profile ID data or the profile ID alone to be transmitted. As a result, they can be broadcasted on the mutual basis.

In a further preferred aspect for implementing the present invention, the above-referred data transmitting apparatus is movably structured.

In a still further preferred aspect for implementing the present invention, the above-referred data transmitting apparatus is mounted on a variety of mobile means including an automobile, an electric train, a mono-rail train, a bicycle, a mobile food-shop, or a mobile-chair, or the like.

In a still further preferred aspect for implementing the present invention, the contents data includes a sale data and a prize data.

In a still further preferred aspect for implementing the present invention, at least one of the above-referred data receiving apparatuses is movably structured.

In a still further preferred aspect for implementing the present invention, at least one of the above-referred data receiving apparatuses is mounted on an automobile, or an electric train, or a bicycle, or carried by an individual person himself.

In a still further preferred aspect for implementing the present invention, it is so arranged that the above-referred event signal processing means executes a variety of processing operations against the above-referred data receiving apparatus based on an event signal generated by the above-referred event signal generating means and in accordance with the event processing data, wherein the processing operations include display of pop-up message, activation of a vibrator, audio generation, data transfer, activation of communication, activation of programs, and reading of a contents data.

In a still further preferred aspect for implementing the present invention, the above-referred profile ID data is ciphered by means of specific codes that can solely be deciphered by the above-referred data transmitting apparatus and at least by one of the above-referred data receiving apparatuses.

In a still further preferred aspect for implementing the present invention, in addition to the profile ID data, the contents data are also ciphered by means of specific codes that can solely be deciphered by the above-referred data transmitting apparatus and at least by one of the above-referred data receiving apparatuses.

In a still further preferred aspect for implementing the present invention, it is so arranged that the profile ID data and/or the profile ID linked with the contents data are individually ciphered by means of a secret key that can solely be open to the above-referred data transmitting apparatus and at least by one of the above-referred data receiving apparatuses for deciphering and/or by means of such a secrete key and such a common key that can also be open to any apparatus other than the above-referred data transmitting apparatus and at least to one of the data receiving apparatuses for deciphering.

In a still further preferred aspect for implementing the present invention, either a DES (Data Encryption Standard) key or a triple-DES key is specifically used for sufficing the secrete key.

In a still further preferred aspect for implementing the present invention, an RSA key, or an RC2 key, or an RC4 key, or an RGP key is used for sufficing the common key for example.

In a still further preferred aspect for implementing the present invention, at least one of the above-referred data receiving apparatuses consists of a portable telephone set.

In a still further preferred aspect for implementing the present invention, at least one of the above-referred data receiving apparatuses consists of an individually usable data receiving apparatus provided with short-distance radio function.

In a still further preferred aspect for implementing the present invention, the above-referred profile ID can optionally be input into ID space in the address forming system.

In a still further preferred aspect for implementing the present invention, the above-referred profile ID linking means causes the contents data to be linked with the profile ID by applying water mark technique.

In a still further preferred aspect for implementing the present invention, it is so arranged that the above-referred data transmitting apparatus can transmit data by means of such a communication network selected from a group comprising ground TV broadcasting networks, satellite broadcasting networks, cable TV broadcasting networks, radio broadcasting networks, short-distance radio communication networks, and DAB networks.

In a still further preferred aspect for implementing the present invention, the contents data includes stream format data selected from a group consisting of video data and audio data.

The above-specified objects of the present invention are fulfilled by way of providing a data receiving apparatus used for such a data communication system comprising a data selecting and receiving means which selectively receives broadcast contents data and a received data processing means which processes data received by the data selecting and receiving means. The data receiving apparatus changeably incorporates a data receiving device provided with a received profile ID data memory means which stores profile ID data including receivable profile ID, wherein the above-referred data selecting and receiving means selects such a contents data that corresponds to such a profile related to the contents data and/or transmission and reception of the contents data based on the profile ID linked with the contents data.

According to the present invention, it is possible to generate such a profile ID corresponding to such a profile related to contents data and/or transmission and reception of the contents data to cause the profile ID to be linked with the contents data before being broadcasted. Further, it is possible for user to solely receive the contents data linked with a specific profile ID by way of utilizing the data receiving device incorporating a received profile ID data memory means which stores profile ID data including receivable profile ID. Accordingly, even when the number of channels in the digital broadcasting system rapidly increases in the near future to cause an enormous amount of data to be broadcasted, and in addition, even when individual persons, shops, and restaurants, respectively transmit a variety of data in the style of short-distance broadcasting receivable within a specific local area to cause the broadcast data amount to be excessively increased, it is still possible for the data receiving apparatus to selectively receive only the required data.

Further, according to the present invention, inasmuch as the data receiving apparatus changeably incorporates the data receiving device provided with a received profile ID data memory means for storing profile ID data including receivable profile ID therein, by way of setting the data receiving devices inside of other data receiving apparatuses to utilize such a receivable profile ID data stored in the received profile ID memory means, it is possible for user to efficiently and selectively receive only the required contents data via a plurality of data receiving apparatuses.

Further, according to the present invention, inasmuch as the data receiving apparatus changeably incorporates the data receiving device provided with a received profile ID data memory means for storing profile ID data including receivable profile ID therein, it is possible to protect privacy of the received profile ID.

Further, according to the present invention, inasmuch as the data receiving device is changeably built in one of the data receiving apparatuses and yet being portable itself, user can receive desired contents data anywhere.

In a preferred aspect for implementing the present invention, the data receiving apparatus for the data communication system further incorporates such a received profile ID data processing means which analyzes the profile ID received by the data selecting and receiving means and then changes the received profile ID data stored in the above-referred received profile ID data memory means.

In a further preferred aspect for implementing the present invention, the above-referred data receiving device further incorporates the above-referred received profile ID data processing means which analyzes the profile ID received by the above-referred data selecting and receiving means and then changes the received profile ID data stored in the above-referred received profile ID data memory means.

In a still further preferred aspect for implementing the present invention, the data receiving device is changeably built in one of the data receiving apparatuses, wherein the data receiving device incorporates a received profile ID data processing means which analyzes profile ID received by a data selecting and receiving means as a received antecedent data and then rewrites the received profile ID data stored in a received profile ID data memory means. Accordingly, by way of setting the data receiving devices inside of a plurality of data receiving apparatuses, it is possible to generate receivable profile ID data based on a profile ID received by a plurality of data receiving apparatuses and then store the profile ID data in a received profile ID data memory means.

In a still further preferred aspect for implementing the present invention, the above-referred data receiving device further incorporates the above-referred data selecting and receiving means.

According to a still further preferred aspect for implementing the present invention, inasmuch as the data receiving device changeably built in one of data receiving apparatuses incorporates a data selecting and receiving means, it is possible for user to efficiently and selectively receive only the required contents data by utilizing a plurality of data receiving apparatuses merely by carrying the data receiving device itself.

According to a still further aspect for implementing the present invention, inasmuch as the data receiving device is changeably built in one of data receiving apparatuses and yet being portable itself, user can receive desired contents data anywhere.

In a still further preferred aspect for implementing the present invention, the above-referred received profile ID data processing means generates the receivable profile ID data or changes the received profile ID data stored in the above-referred received profile ID data memory means.

According to a still further aspect for implementing the present invention, inasmuch as the data receiving device incorporates a received profile ID processing means which generates a receivable profile ID data or changes received profile ID data, it is possible to update receivable profile ID data in correspondence with such a contents data to be broadcasted or user's need.

In a still further preferred aspect for implementing the present invention, the above-referred data receiving device further incorporates the above-referred received data processing means.

According to a still further preferred aspect for implementing the present invention, inasmuch as the data receiving device changeably built in one of the data receiving apparatuses further incorporates a received data processing means, it is possible for user to efficiently and selectively receive only the required contents data by utilizing a plurality of data receiving apparatuses merely by carrying the data receiving device itself.

According to a still further aspect for implementing the present invention, inasmuch as the data receiving device is changeably built in one of the data receiving apparatuses and yet being portable itself, user can receive desired contents data anywhere.

According to a still further preferred aspect for implementing the present invention, the data receiving device changeably built in one of the data receiving apparatuses further incorporates a received data processing means, and yet, the device further incorporates integrated broadcast receiving function. On the other hand, the data receiving device itself dispenses with provision of interface components, thus allowing low-cost production.

In a still further preferred aspect for implementing the present invention, the above-referred data selecting and receiving means incorporates the following: a profile ID identifying means which identifies whether the contents data should be received or not based on the profile ID added to the contents data and in accordance with the received profile ID data stored in the above-referred received profile ID data memory means; and a data receiving means which solely receives such a contents data identified to be receivable by the profile ID identifying means.

In a still further preferred aspect for implementing the present invention, the above-referred received data processing means incorporates the following: an event signal generating means which initially generates such an event signal for instructing that a predetermined process should be executed in accordance with the profile ID data identified to be receivable by the above-referred profile ID identifying means and then outputs the event signal; and a contents data processing means which executes a predetermined process against each contents data: wherein the event signal generating means generates the event signal based on the event processing data, whereas the contents data processing means executes a predetermined process against each contents data in accordance with an event signal generated by the event signal generating means.

According to a still further preferred aspect for implementing the present invention, inasmuch as the above-referred event signal generating means generates an event signal based on event signal processing data, whereas the contents data processing means executes a predetermined process against each contents data, it is possible for user to cause other data receiving apparatuses to receive only the urgently required contents data by way of adding priority order thereto, whereby promoting utility of the data communication system.

In a still further preferred aspect for implementing the present invention, the above-referred event processing data is stored in the above-referred profile ID data memory means.

In a still further preferred aspect for implementing the present invention, the data receiving device built in one of the data receiving apparatuses further incorporates an event processing data memory means for storing the event processing data therein.

According to a still further preferred aspect for implementing the present invention, inasmuch as the data receiving device changeably built in one of the data receiving apparatuses further incorporates an event processing data memory means, it is possible for user to cause other data receiving apparatuses to receive only the urgently required contents data by way of adding priority order thereto, whereby promoting utility of the data communication system.

In a still further preferred aspect for implementing the present invention, the above-referred received data processing means incorporates a contents data memory means which cumulatively stores received contents data, wherein the contents data processing means causes the contents data memory means to cumulatively store the received contents data, and yet, processes the contents data cumulatively stored in the contents data memory means.

In a still further preferred aspect for implementing the present invention, the above-referred received data processing means further incorporates an event signal processing means which executes a predetermined process against the above-referred data receiving device based on an event signal generated by the above-referred event signal generating means and in accordance with the event processing data.

In a still further preferred aspect for implementing the present invention, the data receiving apparatus provided for the data communication system further incorporates a contents-data transmission requesting means which outputs a transmission requesting signal for requesting transmission of such a contents data linked with the above-referred profile ID in the event that the above-referred profile ID identifying means identifies that such a contents data linked with the input profile ID should be received based on the result identified by the above-referred profile ID identifying means and in the event that the contents data linked with the profile ID has not yet been input.

According to a still further preferred aspect for implementing the present invention, inasmuch as the data receiving apparatus provided for the data communication system incorporates a contents data transmission requesting means which outputs such a transmission requesting signal for requesting transmission of such a contents data linked with a profile ID identified to be receivable when the contents data linked with the profile ID has not yet been input, it is possible for user to request the transmitting apparatus to transmit the contents data based on the received profile ID and selectively receive only the required contents data to cause only the profile ID linked with the required contents data to be broadcasted to enable the receiving apparatus to receive it. As a result, it is possible for user to selectively receive only the required contents data, and yet, decrease the amount of data to be broadcasted.

In a still further preferred aspect for implementing the present invention, the data receiving apparatus provided for the data communication system further comprises the following: a contents data generating means which generates contents data; a profile generating means which generates such a profile related to the contents data generated by the profile generating means and transmission and reception thereof; a profile ID generating means which generates such a profile ID in correspondence with the profile of the contents data generated by the profile generating means; a profile data memory means which stores such a profile data including the profile ID generated by the profile ID generating means and being related to each of the corresponding profiles; a profile selecting means which selects at least one profile and a corresponding profile ID from the profile data stored in the profile data memory means; a profile ID determining means which determines such a profile ID to be linked with the contents data based on such a profile ID generated by the profile ID generating means and/or such a profile ID selected by the profile selecting means; a profile ID linking means which causes the profile ID determined by the profile ID determining means to be linked with the corresponding contents data; and a data transmitting means which transmits the contents data linked with the profile ID by the profile ID linking means via the broadcasting form.

According to another preferred aspect for implementing the present invention, inasmuch as the data receiving apparatus provided for the data communication system generates such a contents data to be linked with a profile ID whereby enabling transmission of the contents data linked with the profile ID or transmission of the profile ID alone, and thus, it is possible to broadcast them on the mutual basis.

In a further preferred aspect for implementing the present invention, the above-referred data receiving device comprises such a memory medium selected from a group consisting of a "Sim Card", a "Smart Media", a "Memory Stick", a "Compact Flash", and a "Memory Card". Inasmuch as any of the above-referred memory media is portable, user can receive desired contents data anywhere.

In a still further preferred aspect for implementing the present invention, the data receiving device further incorporates a verified data memory means for storing the verified data. On the other hand, the data receiving apparatus provided for the data communication system incorporates such a verifying means which approves connection of the data receiving device to the data receiving apparatuses solely in the case in which such a verified data stored in the verified data memory means of the data receiving device read by the verifying means exactly corresponds to a predetermined verified data.

According to a still further aspect for implementing the present invention, even though there is a fear of losing the portable data receiving device, it is still possible to securely prevent the data receiving device from being abused by others.

In a still further preferred aspect for implementing the present invention, applicable verifying data comprises biometrical data such as finger-print data, or a vein distribution data, or a voice-print data, or such a data on reddened symptom of eye-balls, or individual pass words.

In a still further preferred aspect for implementing the present invention, the above-referred profile comprises such a data related to the contents of contents data, such a data related to the above-referred data transmitting apparatus, and such a data related to the above-referred data receiving apparatuses.

In a still further preferred aspect for implementing the present invention, such a data related to the above-referred data transmitting apparatus includes the name of the data transmitter, time and location related to the data transmission, and the method of data transmission.

In a still further preferred aspect for implementing the present invention, such a data related to the above-referred data receiving apparatuses includes the following: sexual classification, age, blood type, birth date, full name, address, zip code, ID address, stationary telephone number, portable telephone number, mail address, kinds of equipment for constituting a data receiving apparatus, actual receptive capacity of the available data receiving apparatus, reproducing capacity of the available data receiving apparatus, kinds of operating system and names of POP (Post Office Protocol) and SMTP (Simple Mail Transfer Protocol) servers of the available data receiving apparatus, group ID of data receiving persons, group identifier, and individual IDs and passwords, for example.

In a still further preferred aspect for implementing the present invention, the above-referred profile includes such a data containing tree structure.

In a still further preferred aspect for implementing the present invention, at least one of the above-referred data receiving apparatuses incorporates a profile ID resetting means which counts the rounds of data reception performed by the above-referred data selecting and receiving means, and then, if the rounds of data reception performed by the data selecting and receiving means is less than the predetermined rounds within a predetermined time, the profile ID resetting means resets the above-referred profile ID used for selecting data by the data selecting and receiving means to be back to such a profile ID that corresponds to such a profile ID having own layer being upper than the profile in the tree structure corresponding to the above-referred profile ID.

In a still further preferred aspect for implementing the present invention, the above-referred profile ID resetting means counts the rounds of data reception performed by the data selecting and receiving means, and then, if the rounds of data reception performed by the data selecting and receiving means is less than the predetermined rounds within a predetermined time, the profile ID resetting means resets the above-referred profile ID used for selecting data by the data selecting and receiving means to be back to such a profile ID that corresponds to such a profile ID having own layer upper than the profile in the tree structure corresponding to the above-referred profile ID. Accordingly, it is possible to properly control the rounds of data reception in correspondence with the rounds of data reception within a predetermined time immediately before the present time.

In a still further preferred aspect for implementing the present invention, it is so arranged that the above-referred profile ID linking means causes a plurality of the profile IDs to be linked with the contents data.

In a still further preferred aspect for implementing the present invention, the above-referred profile ID consists of an identifier.

In a still further preferred aspect for implementing the present invention, it is so arranged that the above-referred ID linking means causes the plural profile IDs to be linked with the contents data via forms of AND, OR, NAND, NOR, or NOT.

In a still further preferred aspect for implementing the present invention, the data receiving apparatus provided for the data communication system is movably structured.

In a still further preferred aspect for implementing the present invention, the data receiving apparatus provided for the data communication system is mounted on an automobile, or an electric train, or a bicycle, or carried by an individual person himself.

In a still further preferred aspect for implementing the present invention, the above-referred event signal processing means executes a variety of processes against the above-referred data receiving apparatus based on the event signal generated by the above-refereed event signal generating means and in accordance with the above-referred event processing data, wherein the processes include display of pop-up message, activation of a vibrator, generation of audio, data transfer, activation of data communication, activation of programs, and reading of the contents data.

In a still further preferred aspect for implementing the present invention, the above-referred profile ID is ciphered, and yet, the data receiving apparatus provided for the data communication system incorporates a deciphering means for deciphering the ciphered profile ID.

In a still further preferred aspects for implementing the present invention, in addition to the profile ID, the above-referred contents data are also ciphered, wherein the above-referred deciphering means deciphers the ciphered contents data.

In a still further preferred aspect for implementing the present invention, it is so arranged that the data receiving apparatus provided for the data communication system receives data via a communication network selected from a group comprising ground TV broadcasting networks, satellite broadcasting networks, cable TV broadcasting networks, radio broadcasting networks, short-distance radio communication networks, and DAB networks.

In a still further preferred aspect for implementing the present invention, the data receiving apparatus provided for the data communication system comprises a portable telephone set.

In a still further preferred aspect for implementing the present invention, the data receiving apparatus provided for the data communication system comprises an individually usable receiving apparatus incorporating short-distance radio communication function.

In a still further preferred aspect for implementing the present invention, the above-referred contents data includes a sale data and a prize data.

In a still further preferred aspect for implementing the present invention, the above-referred profile ID is optionally input into ID space in the address forming system.

In a still further preferred aspect for implementing the present invention, the above-referred profile ID linking means causes the contents data to be linked with the profile ID by applying water mark technique.

In a still further preferred aspect for implementing the present invention, the above-referred contents data includes such a stream-format data selected from a group comprising video data and audio data.

DESCRIPTION OF THE PREFERRED EMBODIMENTS

Referring now to the accompanying drawings, details of the preferred aspects for implementing the present invention are described below.

Figure 1:
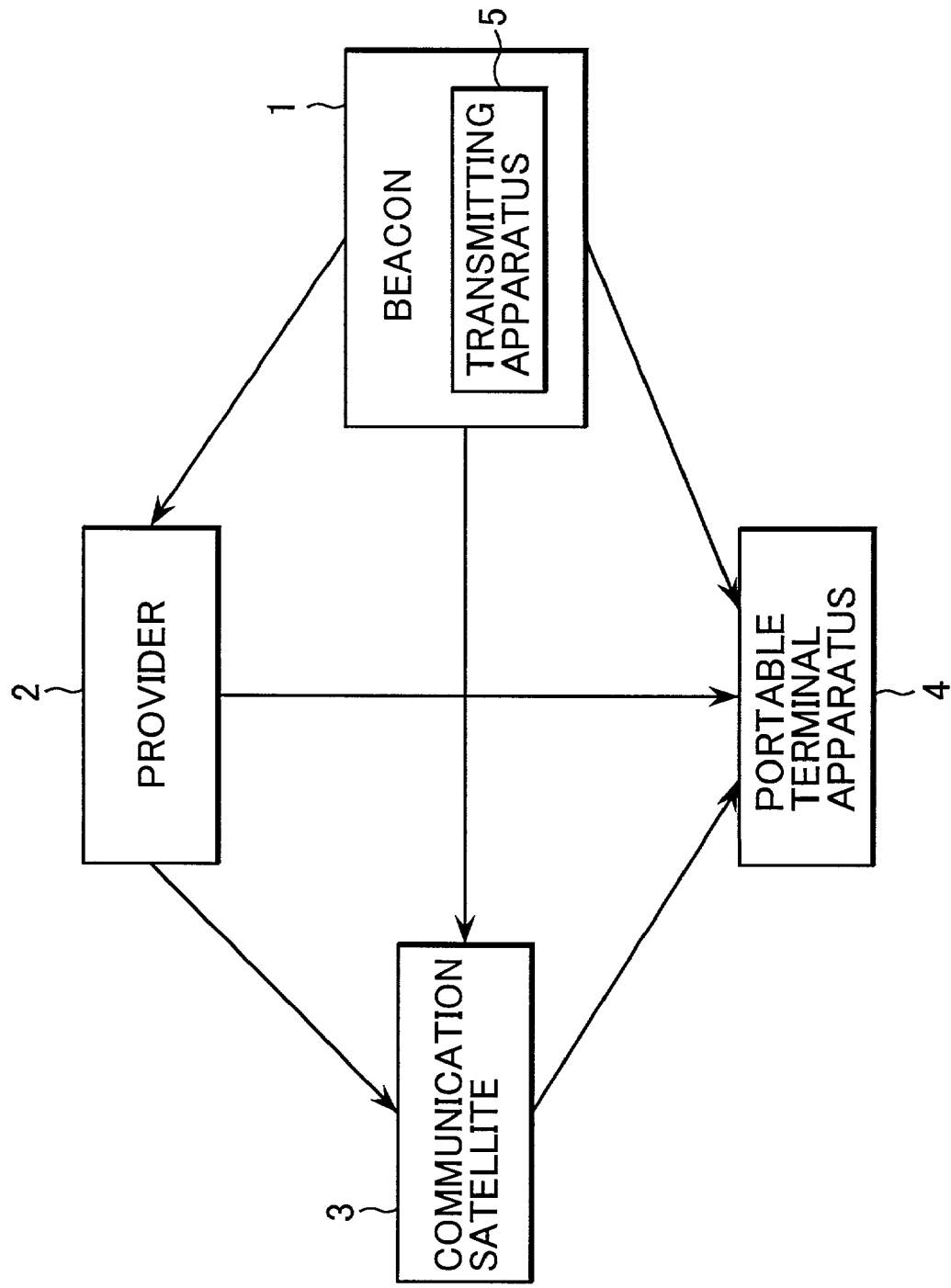
FIG. 1 is a simplified block diagram of a data communication system related to a preferred aspect for implementing the present invention.

FIG. 1 is a simplified block diagram of a data communication system related to a preferred aspect for implementing the present invention.

As shown in FIG. 1, the data communication system according to a preferred aspect for implementing the present invention comprises a beacon 1 which transmits a contents data via broadcasting form and a portable terminal apparatus 4 which directly receives the contents data transmitted from the beacon 1 or indirectly receives the contents data via a provider 2 or via both the provider 2 and a communication satellite 3. The beacon 1 is provided with a data transmitting apparatus 5.

Figure 2:
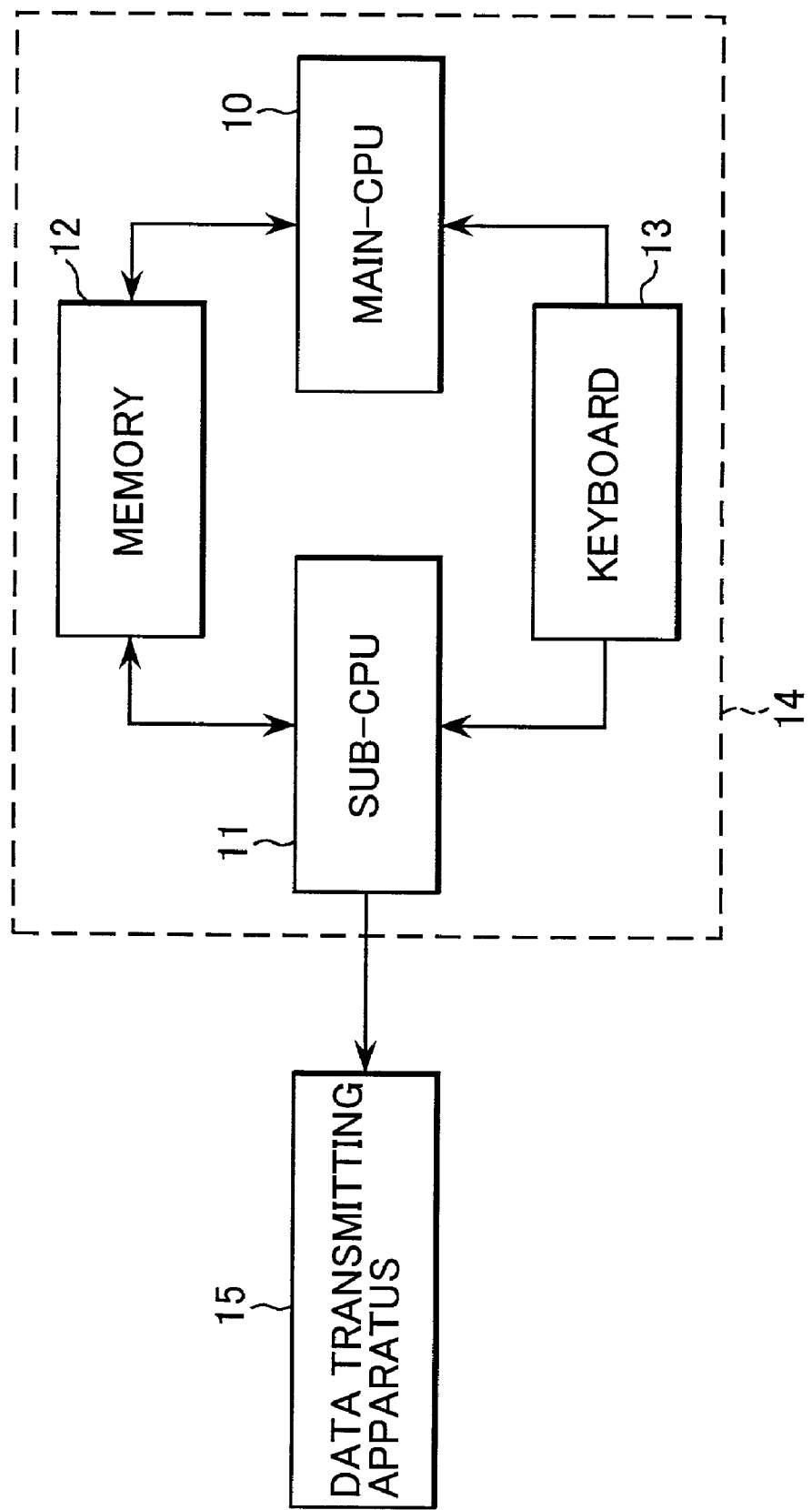
FIG. 2 is a simplified block diagram of a data transmitting apparatus related to a preferred aspect for implementing the present invention.

FIG. 2 is a simplified block diagram of a data transmitting apparatus 5.

As shown in FIG. 2, the data transmitting apparatus 5 comprises a personal computer 14 which is provided with a main CPU (Central Processing Unit) 10, a sub-CPU 11, a memory 12, and a keyboard 13, and a data transmitting apparatus 15.

Figure 3:
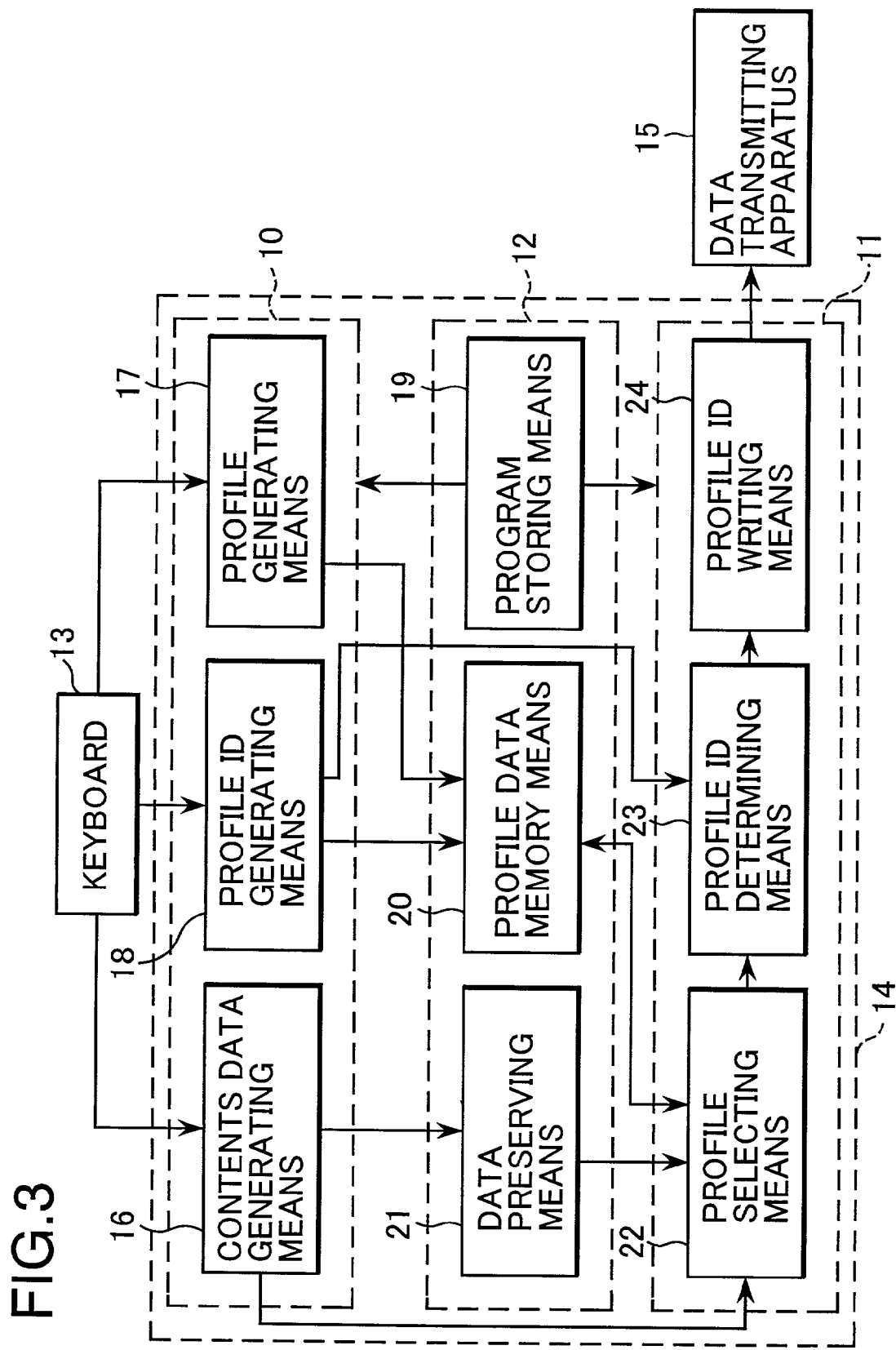
FIG. 3 is a schematic block diagram of a personal computer for constituting a data transmitting apparatus.

FIG. 3 is a schematic block diagram of the personal computer 14 for constituting the above-referred data transmitting apparatus 5.

As shown in FIG. 3, the main CPU 10 of the personal computer 14 for constituting the data transmitting apparatus 5 incorporates a contents data generating means 16 which generates a contents data consisting of stream-format data such as video data and audio data, a profile generating means 17 which generates a profile including such a data related to the contents data to be broadcasted and such a data related to the transmitter side and such a data related to the receiver side, and a profile ID generating means 18 which generates such a profile ID being an identifier in correspondence with the profile generated by the profile generating means 17.

As shown in FIG. 3, a memory 12 stored in the personal computer 14 for constituting the above-referred data transmitting apparatus 5 incorporates the following: a program storing means 19 which stores programs for operating the main CPU 10, a profile generated by the profile generating means 17 of the CPU 10, a profile data memory means 20 which stores profile data including profile IDs generated by the profile ID generating means 18 and respectively being related to the corresponding profiles, and a data preserving means 21 which preserves the contents data generated by a contents data generating means 16 of the main CPU 10.

As shown in FIG. 3, the sub-CPU 11 of the personal computer 14 for constituting the above-referred data transmitting apparatus 5 comprises the following: a profile selecting means 22 which selects at least one profile and a profile ID corresponding thereto from the profile data stored in the profile data memory means 20 of the memory 12, a profile ID determining means 23 which determines such a profile ID that should be added to a contents data generated by the contents data generating means 16 based on such a profile ID generated by the profile ID generating means 18 and/or such a profile ID corresponding to the profile selected by the profile selecting means 22, and a profile ID writing means 24 which writes such a profile ID determined by the profile ID determining means 23 into a corresponding contents data.

The above-referred data transmitting apparatus 15 for constituting the above-referred data transmitting apparatus 5 receives such a contents data from the personal computer 14 to prepare for transmission of the contents data generated by the contents data generating means 16 of the main CPU 10 and containing a specific profile ID written by the profile ID writing means 24.

In the practical aspect for implementing the present invention, the data related to the contents of the contents data of a profile prepared for broadcasting includes the kinds of contents data such as sports, music, and movies, for example. Data related to the transmitter side of the profile includes the name of the transmitter of the contents data and the transmitting time. Accordingly, for example, it is possible for such user who wants such a specific contents data, the data for sports for example, to selectively receive such a contents data solely related to sports by way of utilizing a profile ID being a digital identifier corresponding to the profile pertaining to sports. Further, in a practical aspect for implementing the present invention, inasmuch as the portable terminal apparatus 4 incorporates such a memory for storing a contents data, by way of utilizing such a profile ID corresponding to a profile pertaining to the time of transmitting the contents data, it is possible for user to selectively receive only such a contents data being broadcasted within a specific transmission time. Further, the data related to user who receives profile contains a variety of information including sexual classification, age, address, group ID, kinds of equipment for constituting a receiving apparatus, data receptive capacity of the available data receiving apparatus, and data reproduction capacity of the available data receiving apparatus. Accordingly, for example, by way of utilizing such a profile ID corresponding to a specific profile related to females of a certain age-group, it is also possible for them to selectively receive a specific contents data targeted against them. Accordingly, by way of utilizing a specific profile ID corresponding to such a profile pertaining to local addresses and group ID, it is possible for any of local users having addresses in specific local areas to selectively receive such a contents data related to groups in the corresponding local areas and supporting member associations, for example. Further, in such a case in which broadcast contents data can not effectively be received nor reproduced unless utilizing a specific receiving apparatus having a specific capacity, by way of utilizing a specific profile ID corresponding to a profile covering the kinds of equipment for constituting the receiving apparatus, data receptive capacity of the available receiving apparatus, and data reproduction capacity of the available data receiving apparatus, it is also possible to enable only those users equipped with a data receiving apparatus capable of effectively receiving and reproducing the corresponding contents data to selectively receive the contents data.

The above-referred main CPU 10 and the sub-CPU 11 are operated via manual operation of the keyboard 13. Accordingly, the above-referred profile generating means 17 and profile ID generating means 18 are also operated via manual operation of the keyboard 13. Accordingly, operator can activate the profile generating means 17 to generate a profile in correspondence with the contents of the contents-data to be broadcasted and in consideration of actual transmitting condition, target user, and receiving apparatuses as the object of broadcasting. It is also possible for operator to activate the profile ID generating means 18 to generate a profile ID by entering a profile ID corresponding to the profile by operating the keyboard 13. By utilizing the generated profile and a profile ID related to the corresponding profile, a profile data is generated and then stored in the above-referred profile data memory means 20 of the memory 12. The profile data stored in the profile data memory means 20 is open to users to enable them to freely use the profile data stored in the profile data memory means 20 in order to select a specific contents data that should be received by them.

The above-referred profile selecting means 22 reads a contents data generated by the contents data generating means 16, and then, based on the read out result, the profile selecting means 22 extracts such a profile related to the contents of the contents data, such a profile related to transmission and reception of the contents data, and a profile ID corresponding to the profiles out from the profile data stored in the profile data memory means 20 of the memory 12. Then, the profile selecting means 22 outputs the profile ID corresponding to the profile extracted from the profile data to a profile ID determining means 23. On the other hand, the profile generating means 17 is operated by the operator as required. When a fresh profile is generated by the profile generating means 17, the profile ID generating means 18 outputs such a profile ID corresponding to a newly and simultaneously generated profile to the profile ID determining means 23.

Based on such a profile ID delivered from the above-referred profile selecting means 22 and/or the profile ID generating means 18, the above-referred profile ID determining means 23 determines such a profile ID that should be linked with the contents data, and then outputs the determined profile ID to a profile ID writing means 24.

On receipt of a profile ID from the profile ID determining means 23, the profile ID data writing means 24 writes the received profile ID in a predetermined data area of a contents data, and then outputs the written profile data to the data transmitting apparatus 15.

On receipt of the contents data containing the written profile ID from the profile ID writing means 24, the data transmitting apparatus 15 transmits the received contents data to the portable terminal apparatus 4 and a provider 2 via the broadcasting form.

Figure 4:
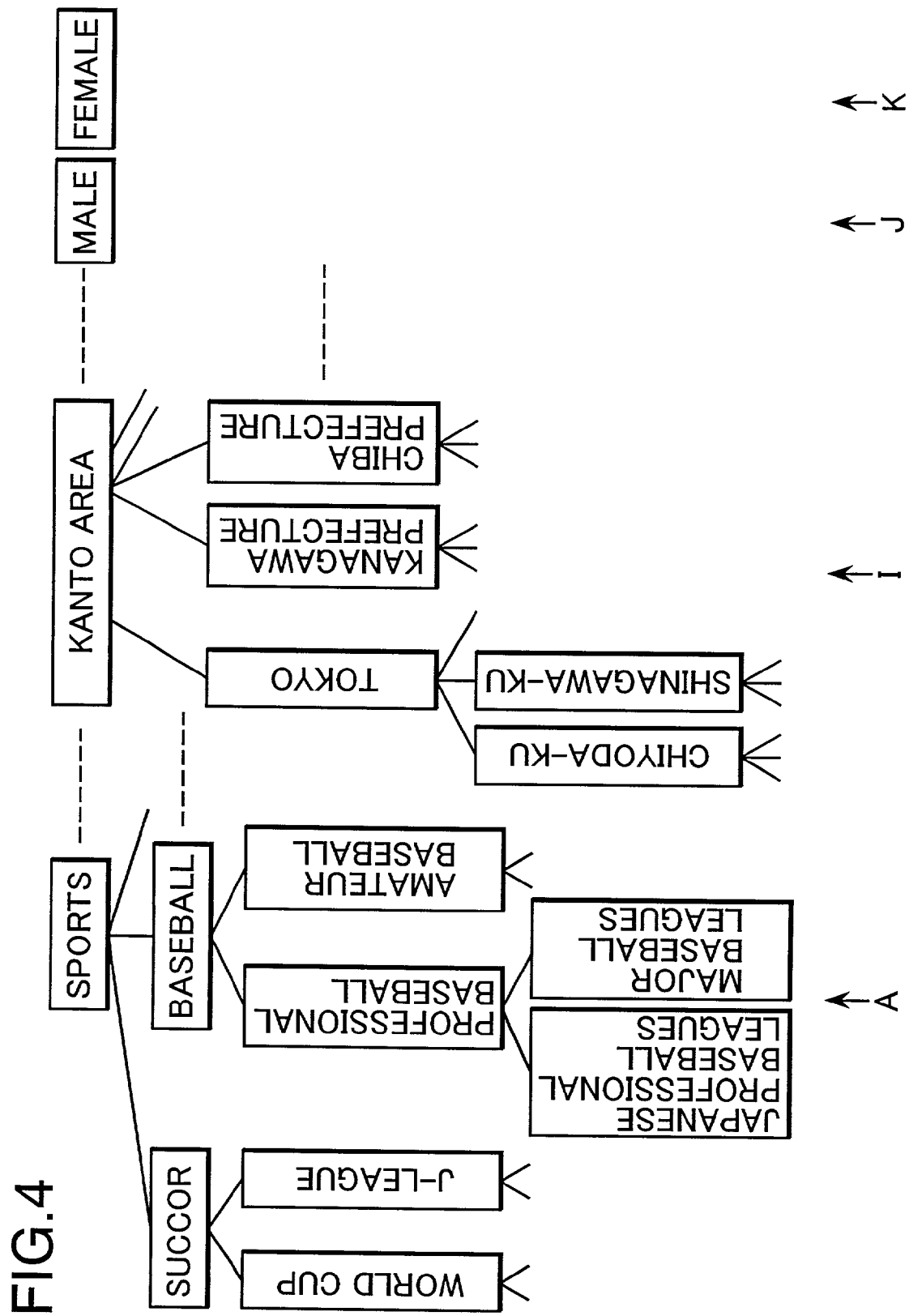
FIG. 4 is a simplified block diagram conceptually designating a profile data.

FIG. 4 conceptually designates a profile data.

As shown in FIG. 4, the profile data consists of a plurality of unit profile data A, . . . I, . . . J, and K. In FIG. 4, only the unit profile data a and i are classified per layer to form a tree structure having a minimum of 3 layers. However, all the unit profile data A, . . . I, . . . J, and K respectively have a tree structure with minimum of 3 layers.

In the practical aspect for implementing the present invention, the above-referred profile selecting means 22 of the sub-CPU 11 initially reads a contents data and then selects and extracts more than two of profiles contained in different unit profile data from profile data stored in the profile data memory means 20 of the memory 12. In addition, it is also possible to extract more than two of profiles with different layer composition from a single unit profile data. For example, it is possible to select four profiles comprising various sports, baseball games, professional baseball players/games, and Japanese professional baseball players/games for example, and then write them into a contents data. Accordingly, by way of coordinating the portable terminal apparatus 4 in order to solely receive such a contents data added with profile IDs corresponding to various sports, baseball games, professional baseball players/games, and the Japanese professional baseball players/games for example, even when the amount of broadcast data becomes excessive, it is still possible for user to selectively receive only the desired contents data.

Figure 5:
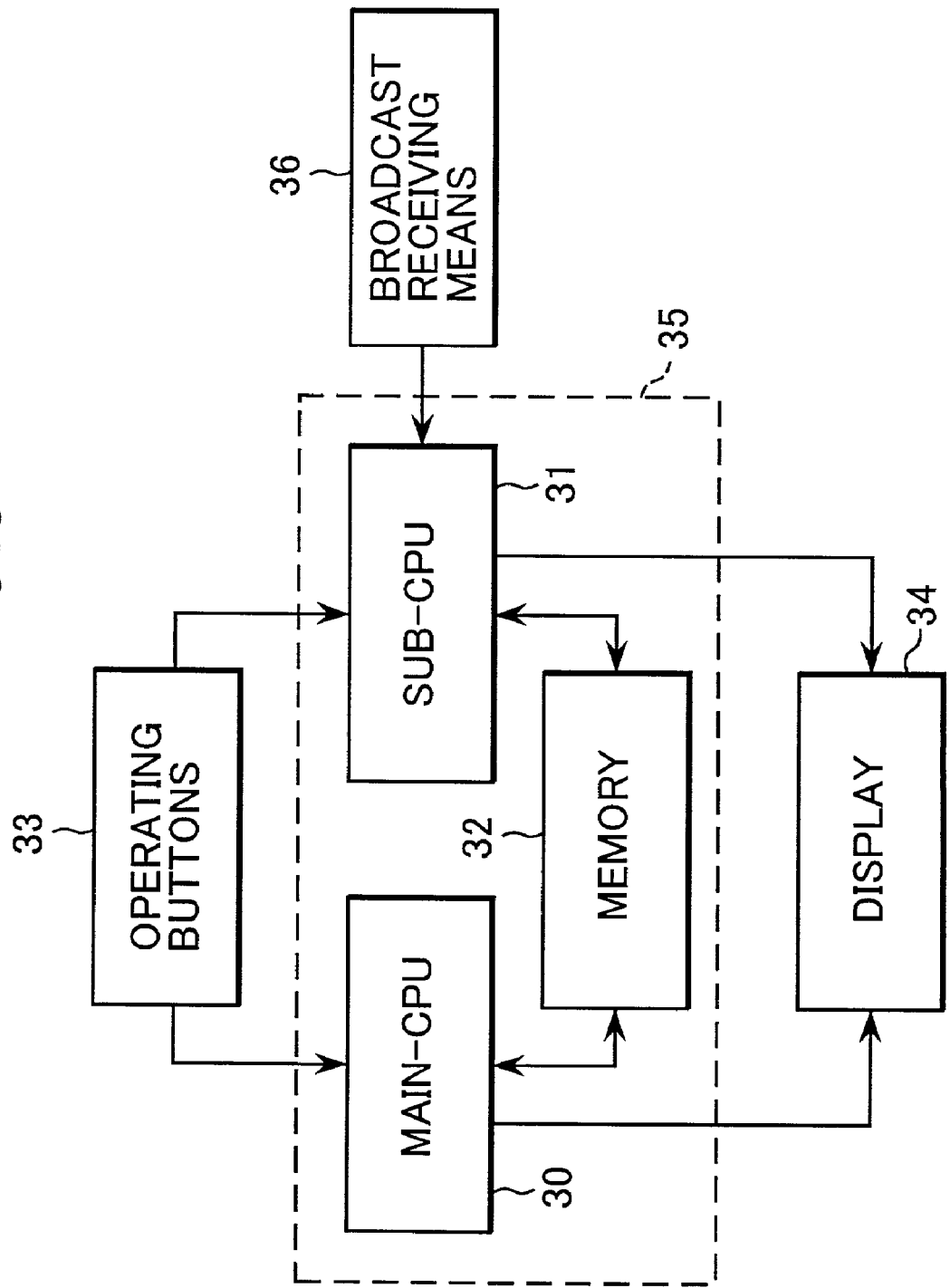
FIG. 5 is a simplified block diagram of a portable terminal apparatus for processing data received via broadcasting.

FIG. 5 is a schematic block diagram of the portable terminal apparatus 4 which is substantially a data receiving apparatus itself.

As shown in FIG. 5, the portable terminal apparatus 4 related to a practical form for implementing the present invention comprises a data receiving device 35 incorporating a main CPU 30, a sub-CPU 31, and a memory 32, a group of data input buttons 33 for entering data to the data receiving device 35, a display 34, and a broadcast data receiving means 36 which is composed of a modem consisting of a modulator and a demodulator. The data receiving device 35 is interchangeably built in the portable terminal apparatus 4.

Figure 6:
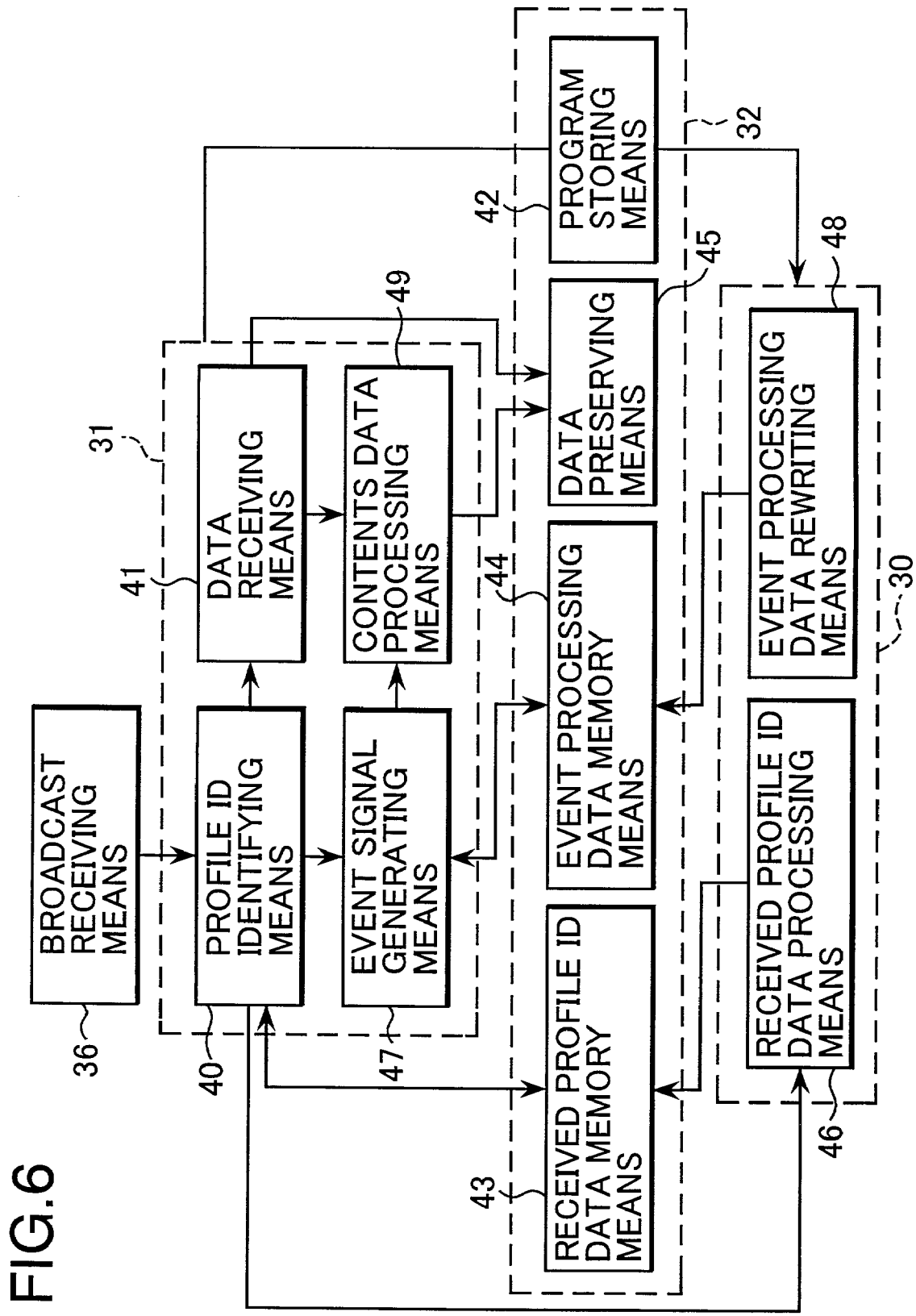
FIG. 6 is a schematic block diagram of a personal computer for constituting a portable terminal apparatus.

FIG. 6 is a schematic block diagram of the data receiving device 35.

As shown in FIG. 6, the sub-CPU 31 of the data receiving device 35 interchangeably built in the portable terminal apparatus 4 consists of a profile ID identifying means 40 for identifying whether the contents data should decisively be received or not based on such a profile ID added to the contents data received by the broadcast data receiving means 36 and a data receiving means 41 which receives such a contents data identified by the profile ID identifying means 40 to be decisively receivable.

As shown in FIG. 6, the above-referred memory 32 of the data receiving device 35 interchangeably built in the portable terminal apparatus 4 comprises the following: a program storing means 42 which stores operating programs of the main CPU 30 and the sub-CPU 31, a received profile ID data memory means 43 which stores received profile ID data comprising receivable profile IDs, an event processing data memory means 44 which stores such an event processing data for coordinating the profile ID stored in the received profile ID data memory mean 43 with the processed contents, and a data preserving means 45 which stores the contents data received by the data receiving means 41 of the sub-CPU 31.

As shown in FIG. 6, the main-CPU 30 of the data receiving device 35 which is interchangeably built in the portable terminal apparatus 4 comprises a received profile ID data processing means 46 which generates a receivable profile ID data that should be stored in the received profile ID data memory means 43 of the memory 32 and changes the received profile ID data stored in the received profile ID data memory means 43 and an event processing data rewriting means 48 which generates an event processing data and then rewrites the event processing data stored in the event processing data of the memory 32.

As shown in FIG. 6, the sub-CPU 31 of the data receiving device 35 which is interchangeably built in the portable terminal apparatus 4 further comprises an event signal generating means 47 which generates and outputs an event signal for instructing that a predetermined process should be executed in accordance with such a profile ID identified to be decisively receivable by the profile ID identifying means 40 and a contents data processing means 49 which processes the contents data received by the data receiving means 41.

The above-referred received profile ID data processing means 46 of the main CPU 30 is operated via a group of operating buttons 33 provided for the portable terminal apparatus 4. Utilizing such a profile data opened by a data transmitting source and such a profile data offered via internet service and by way of manually operating the operating buttons 33 provided for the portable terminal apparatus 4, it is possible for user to input a profile ID or a profile that should be received and then input a corresponding profile ID via internet service to cause the received profile ID data processing means 46 to write the input profile ID into the received profile ID data memory means 43 to generate a received profile ID data.

Such a profile ID identified by the profile ID identifying means 40 to be receivable is delivered to the received profile ID data processing means 46, and then, the received profile ID data processing means 46 analyzes the profile ID received from the profile ID identifying means 40 as the received antecedent data in accordance with a program stored in the program storing means 42 of the memory 32, and yet, the received profile ID data processing means 46 rewrites the received profile ID data stored in the received profile ID data memory means 43 as required. Accordingly, the received profile ID data stored in the received profile ID data memory means 43 becomes the actual result of accumulating the previously received profile IDs to designate the user's profile desired by the user for reception thereof. It is also possible to register the combination of profile IDs to be broadcasted via addition to the contents data, concretely, it is possible for user to register the profile IDs coupled by means of AND, NAND, and NOR into the received profile ID data as a receivable profile ID. Accordingly, when the user desires to specify a profile of a certain layer of a unit profile data bearing tree-structure, for example, when user desires to specify such a profile corresponding to the Major Baseball Leagues among the unit profile data pertaining to sports, by way of operating the received profile ID data processing means 46, user can enter such a profile ID corresponding to the above-referred profile as the profile ID that should be received.

The above-referred memory 32 of the data receiving device 35 interchangeably built in the portable terminal apparatus 4 incorporates an event processing data memory means 44 which stores such an event processing data for coordinating the profile ID stored in the received profile ID data memory means 43 with the processed contents. Further, the sub-CPU 31 incorporates an event signal generating means 47 and a contents data processing means 49 which processes a contents data received by the data receiving means 41. The contents data processing means 49 executes a variety of processes against contents data received by the data receiving means 41 in accordance with the profile ID. Based on the above arrangement, it is possible for user to newly generate an event processing data by way of operating the event processing data rewriting means 48 via operating keys 33 provided for the portable terminal apparatus 4 and then cause the newly generated event processing data to be stored in the event processing data memory means 44 or rewrite the event processing data stored in the event processing data memory means 44.

In the data communication system related to the practical form for implementing the present invention, based on the above-described structure, a specified contents data is broadcasted via the data transmitting apparatus 5 and received by the portable terminal apparatus 4.

Initially, the main-CPU 10 is activated into operation to cause the contents data generating means 16 to generate such a contents data to be subject to broadcasting.

Next, the contents data generated by the contents data generating means 16 is output to the data preserving means 21 and stored therein. Next, when the designated contents data is broadcasted, the sub-CPU 11 is activated into operation to cause the profile selecting means 22 of the sub-CPU 11 to read the contents data. When the designated contents data is subject to broadcasting immediately after generation, the sub-CPU 11 is activated into operation together with the main-CPU 10 to cause the contents data to be delivered directly to the profile selecting means 22 of the sub-CPU 11 from the contents data generating means 16.

In this case, if operator judges that a new profile should be generated, operator then inputs a new profile via the keyboard 13 and also inputs a profile ID corresponding to the new profile. As a result, the profile generating means 17 is operated to generate a new profile to simultaneously operate the profile ID generating means 18 to cause a corresponding profile ID to be generated. The newly generated profile ID is then written into the profile data stored in the profile data memory means 20. When broadcasting a newly generated contents data immediately after its generation, simultaneous with the broadcasting, the newly generated profile ID is output to the profile determining means 23 from the profile ID generating means 18.

When broadcasting a contents data, the sub-CPU 11 is activated into operation to cause the profile selecting means 22 of the sub-CPU 11 to read the contents data delivered from the contents data generating means 16. Then, based on the result of reading the contents data, the profile selecting means 22 searches the profile data stored in the profile data memory means. When the profile subject to selection is detected, the profile selecting means 22 selects the detected profile and a profile ID corresponding to the profile and then outputs both of them to the profile ID determining means 23.

Based on the profile ID received from the profile selecting means 22 and/or the profile ID generating means 18, the profile ID determining means 23 of the sub-CPU 11 determines such a profile ID that should be linked with the contents data to be subject to broadcasting, and then delivers the determined profile ID to the profile ID writing means 24.

The profile ID writing means 24 of the sub-CPU 11 writes the profile ID delivered from the profile ID determining means 23 into a predetermined data area of the contents data and then causes the contents data to be subject to broadcasting to be linked with the written profile ID, and then outputs the contents data containing the written profile ID to the data transmitting apparatus 15.

On receipt of the contents data containing the written profile ID from the profile ID writing means 24, the data transmitting apparatus 15 transmits the contents data containing the written profile ID to the portable terminal apparatus 4, to the provider 2 and/or the communication satellite station 3 via the broadcasting form.

The contents data transmitted from the data transmitting apparatus 15 of the transmitting apparatus 5 is directly received by a broadcast receiving means 36 of the portable terminal apparatus 4 or via the provider 2 and/or the communication satellite station 3.

When receiving the contents data, a sub-CPU 31 of the data receiving device 35 is activated into operation to cause the broadcast receiving means 36 to output the received contents data to the above-referred sub-CPU 11, and then, the contents data is delivered to the above-referred profile ID identifying means 40.

The profile ID identifying means 40 of the sub-CPU 31 initially reads the profile ID written in the contents data received from the broadcast receiving means 36, and then identifies whether the read-out profile ID coincides with the profile ID previously set by the ID setting means 39 or not.

As a result, in the event if the profile ID written in the contents data and read out by the profile ID identifying means 40 is judged to be out of coincidence with the profile ID previously set by the ID setting means 39, the profile ID identifying means rejects reception of the input contents data.

On the other hand, in the event if the read-out profile ID is judged to be coincident with the profile ID previously set by the ID setting means 39, the profile ID identifying means 40 outputs the input contents data to the data processing means 41 to decisively allow the reception of the contents data.

In the practical form for implementing the present invention, it is possible to extract such a profile of the identical layer or such a profile in a different layer contained in more than two of unit profile data out from a profile data stored in the profile data memory means 20 of the memory 12 of the personal computer 14 which constitutes the data transmitting apparatus 5 and then add the extracted profiles to the contents data. Accordingly, for example, by way of broadcasting such a profile ID corresponding to four of profiles related to various sports, baseball players/games, professional baseball players/games, and Japanese professional baseball players/games via addition to the contents data, and yet, by way of registering such a profile ID linked with the profile ID corresponding to the above-referred four profiles via AND in the received profile ID memory means 43 of the memory 32 of the above-referred data receiving device 35 interchangeably built in the portable terminal apparatus 4, it is possible for user to selectively receive only the desired contents data added with such a profile ID corresponding to four of profiles related to various sports, baseball players/games, professional baseball players/games, and Japanese professional baseball players/games via the above-referred data receiving means 41, and yet, even when the amount of broadcast data becomes excessive, it is still possible for user to selectively receive only the desired contents data.

At the same time, the above-referred profile ID identifying means 40 outputs such a profile ID added to the contents data to a received profile ID data processing means 46 of the main-CPU 30 and also outputs the profile ID to an event signal generating means 47 of the sub-CPU 31.

While the main-CPU 30 remains activated, on receipt of a profile ID from the profile ID identifying means 40, in accordance with the program stored in a program storing means 42, the above-referred received profile ID data processing means 46 analyzes the profile ID received from the profile ID identifying means 40 as the received antecedent data and then rewrites the received profile ID data stored in the received profile ID data memory means 43 as required.

On the other hand, as soon as a profile ID is delivered from the profile ID identifying means 40, the event signal generating means 47 of the sub-CPU 31 accesses the event processing data memory means 44 and then reads an event processing data corresponding to the input profile ID to generate such an event signal for instructing that the readout event processing data should be executed against the contents data, and then outputs the event signal to a contents data processing means 49.

Based on the input event signal, the above-referred contents data processing means 49 of the sub-CPU 31 executes a predetermined process against the contents data received by the data receiving means 31. For example, in such a case in which a corresponding profile ID is added to a contents data via selection of the time of transmitting the contents data, it is so arranged that the contents data transmitted to such an event processing data stored in an event processing data memory means 44 at a transmission time against a profile ID corresponding to the transmission time is stored in a data preserving means 45, and yet, in such a case in which such a processing contents for effecting reproduction is allocated later on, the event signal generating means 47 generates such an event signal for instructing that the process should be executed against the contents data. On the other hand, the contents data processing means 49 causes the data preserving means 45 to store the contents data received by the data receiving means 41 in accordance with an event signal. Further, when such a processing contents for instructing that the contents data transmitted at the above-referred transmission time should preferentially be reproduced during reproduction mode is allocated to the profile ID, the event signal generating means 47 generates such an event signal for instructing that the contents data should be stored in the data preserving means 45 by effecting the above process. Next, this event signal is output to the contents data processing means 49. Next, in response to the event signal, the contents data processing means 49 adds an instruction for instructing preferential reproduction of the above contents data during reproduction mode, and then causes the contents data received by the data receiving means 41 to be stored in the data memory means 45. Assuming that when a profile corresponding to Italian food cooking is selected to cause a corresponding profile ID to be added to a contents data, in such a case in which the contents data comprising an event processing data stored in the event processing data memory means 44 added with a profile data corresponding to Italian food cooking has such a processing contents for storing the data en bloc via allocation within a certain memory area of the data preserving means 45, then, the event signal generating means 47 generates an event signal for instructing execution of the above process, and then this event signal is output to the contents data processing means 49, which then causes the above-referred contents data added with a profile ID corresponding to the profile related to Italian food cooking to be stored en bloc within a certain holder area of the data preserving means 45 in accordance with the above-referred event signal.

On the other hand, in such a case in which execution of a specific process is not formulated against such a profile ID added to the contents data in the event processing data stored in the event processing data memory means 44, the event signal generating means 47 does not generate such an event signal, and yet, the contents data processing means 49 does not execute any particular process against the contents data to enable the data receiving means 41 to decisively receive and process the contents data.

According to the practical form for implementing the present invention, the above-referred profile generating means 17 generates such a profile including a data related to the contents of a contents data subject to broadcasting, such a data related to the transmitting side, and such a data related to the receiving side. The above-referred profile ID generating means 17 generates such a profile ID corresponding to the above-referred profile whereby generating such a profile data comprising the profile and the profile ID, which is then stored in the above-referred profile data memory means 20. The above-referred profile selecting means 22 initially reads such a contents data subject to broadcasting generated by the above-referred contents data generating means 16, and then, based on the result of the reading, it selects and extracts such a profile related to the contents of the contents data, such a profile related to transmission and reception of the contents data, and a profile ID corresponding to these profiles from the profile data stored in the profile data memory means 20. In order to provide a profile ID, the profile selecting means 22 selects and extracts such a profile present in an identical layer or such a profile present in a different layer respectively being contained in more than two of the unit profile data out from the profile data stored in the profile data memory means 20, and then adds a profile data to the specified contents data. Further, it is also possible for the profile selecting means 22 to extract more than two of profiles having different layers out from a single unit profile data and then adds the extracted profiles to the specified contents data. In the event if such a profile that should be added to such a contents data subject to broadcasting is not contained in the profile data stored in the profile data memory means, operator of the data transmitting apparatus 5 can activate the profile generating means 17 and the profile ID generating means 18 by manually operating the keyboard 13, whereby enabling the desired profile ID to be added to a specific contents data that should be broadcasted. On the other hand, the portable terminal apparatus 3 incorporates the above-referred received profile ID memory means 43 which stores the received profile ID data consisting of a receivable profile ID generated by utilizing such a profile data opened by the data transmitting source. It is so arranged that a combination of profile IDs subject to broadcasting via addition to a specific contents data, in other words, such profile IDs coupled with each other via AND means, can be registered to the received profile ID as a receivable profile ID. Accordingly, even when the amount of broadcasting data becomes excessively large, by way of adding a plurality of profile IDs to a contents data subject to broadcasting and registering such a profile ID consisting of plural profile IDs linked with each other via AND to the received profile ID, it is possible for individual users to efficiently and selectively receive only the required contents data.

According to the practical form for implementing the present invention, inasmuch as the above-referred data receiving device 35 is interchangeably built in the portable terminal apparatus 4, by way of setting the data receiving devices 35 inside of other portable terminal apparatuses, and yet, by way of utilizing the received profile ID data stored in the received profile ID memory means 43, it is possible for individual users to efficiently and selectively receive only the required contents data via a plurality of portable terminal apparatuses.

Further, according to the practical form for implementing the present invention, inasmuch as the data receiving device 35 is interchangeably built in the portable terminal apparatus 4, and yet, inasmuch as the received profile ID data processing means 46 analyzes such a profile identified by the profile identifying means 40 to be receivable as the received antecedent data and then rewrites the received profile ID data stored in the received profile ID memory means, by way of setting the data receiving devices 35 inside of a plurality of portable terminal apparatuses 4, based on the profile IDs received by a plurality of portable terminal apparatuses 4, it is possible to generate a received profile ID data to store the generated profile ID in the received profile ID memory means 43.

Further, according to the practical form for implementing the present invention, inasmuch as the data receiving device 35 is interchangeably built in the portable terminal apparatus 4, and yet, inasmuch as the sub-CPU 31 has such a function to initially identify the profile ID added to a contents data and then receive and preserve the contents data, it is possible for individual users to efficiently and selectively receive only the required contents data by utilizing a plurality of portable terminal apparatuses 4 merely by carrying the data receiving device 35.

Further, according to the practical form for implementing the present invention, inasmuch as the data receiving device 35 does not require interface components, it can be produced at a low cost.

Further, according to the practical form for implementing the present invention, inasmuch as the data receiving device 35 incorporating a received profile ID data memory means 43 for storing the received profile ID data is interchangeably built in the portable terminal apparatus 4, it is possible to protect privacy of the contents data.

Further, according to the practical form for implementing the present invention, based on the event processing data stored in an event processing data memory means 44 of the memory 32 of the data receiving device 35 interchangeably built in the portable terminal apparatus 4, in response to a profile ID, an event signal generating means 47 of the sub-CPU 31 reads an event processing data corresponding to the received profile ID and then generates an event signal for delivery to a contents data processing means 49. Next, based on the input event signal, the contents data processing means 49 causes the data preserving means 45 of the memory 32 to store the contents data received by the data receiving means 41 as it is or by adding a reproduction-stage priority order to the contents data received by the data receiving means 41. Alternatively, the contents data processing means 49 causes the data preserving means 45 to store only the contents data added with a specific profile ID in a certain holder area thereof. It is also possible to rewrite the event processing data by operating an event processing data rewriting means 48 of the main-CPU 30 by way of activating operation of the main-CPU 30. Accordingly, even when the amount of broadcast data becomes excessively large, it is possible to process the contents data received by the portable terminal apparatus 4 to facilitate individual users to readily handle the contents data pertaining to Italian food cooking, for example.

Further, according to the practical form for implementing the present invention, inasmuch as a contents data is generated by the main-CPU 10, whereas addition of a profile ID to the contents data and broadcasting of the contents data added with the profile ID are solely executed by the sub-CPU 11, when generating a contents data, it is suggested that only the main-CPU 10 should be activated, whereas when broadcasting such a contents data added with a profile ID, it is suggested that only the sub-CPU 11 should be activated, thus lowering power consumption.

Further, in a practical aspect for implementing the present invention, inasmuch as the memory 12 of the personal computer 14 incorporates a data preserving means 21 for preserving contents data, by way of preserving the contents data generated by the contents data generating means 16 inside of the data preserving means 21, when broadcasting the contents data, by way of activating only the sub-CPU 11 to write a profile ID in the contents data stored in the data preserving means 21 to prepare for broadcasting, power consumption can be saved.

Further, in a practical aspect for implementing the present invention, inasmuch as the above-referred profile ID identifying means 40, the data receiving means 41, the event signal generating means 47, and the contents data processing means 49, are respectively built in the sub-CPU 31 of the data receiving device 35, when receiving a contents data, only the sub-CPU 31 of the data receiving device 35 should be activated, thus lowering power consumption.

Figure 7:
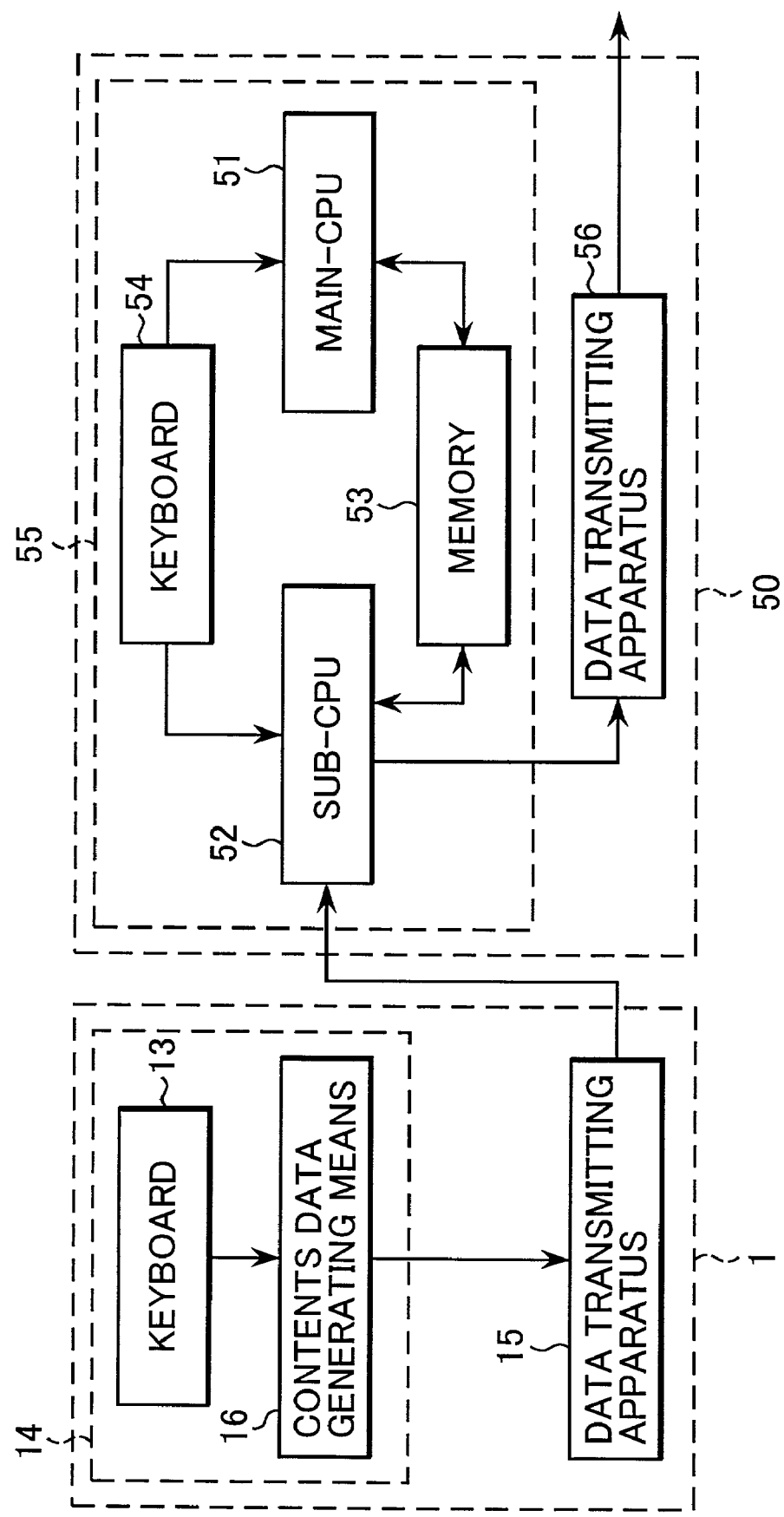
FIG. 7 is a schematic block diagram of a transmitting apparatus of a data communication system and a communication data processing apparatus provided on the part of a provider related to another preferred aspect for implementing the present invention.

FIG. 7 is a schematic block diagram of a data transmitting apparatus 5 of a data communication system and a communication data processing apparatus set on the part of a provider 2 according to another preferred aspect for implementing the present invention, As shown in FIG. 7, the data transmitting apparatus 5 pertaining to the practical form for implementing the present invention merely incorporates the contents data generating means 16 for generating such a contents data composed of video data and audio data, a personal computer 14 provided with the keyboard 13, and the data transmitting apparatus 15 which transmits the contents data generated by the contents data generating means 16 via the broadcasting form, and thus, the data transmitting apparatus 5 is not provided with such a function to generate any profile nor a profile ID nor such a function to add a corresponding profile ID to the corresponding contents data.

On the other hand, as shown in FIG. 7, the above-referred communication data processing apparatus set on the part of the provider 2 is equipped with a main-CPU 51, a sub-CPU 52, a personal computer 55 fitted with a memory 53 and a keyboard 54, and a data transmitting apparatus 56.

Figure 8:
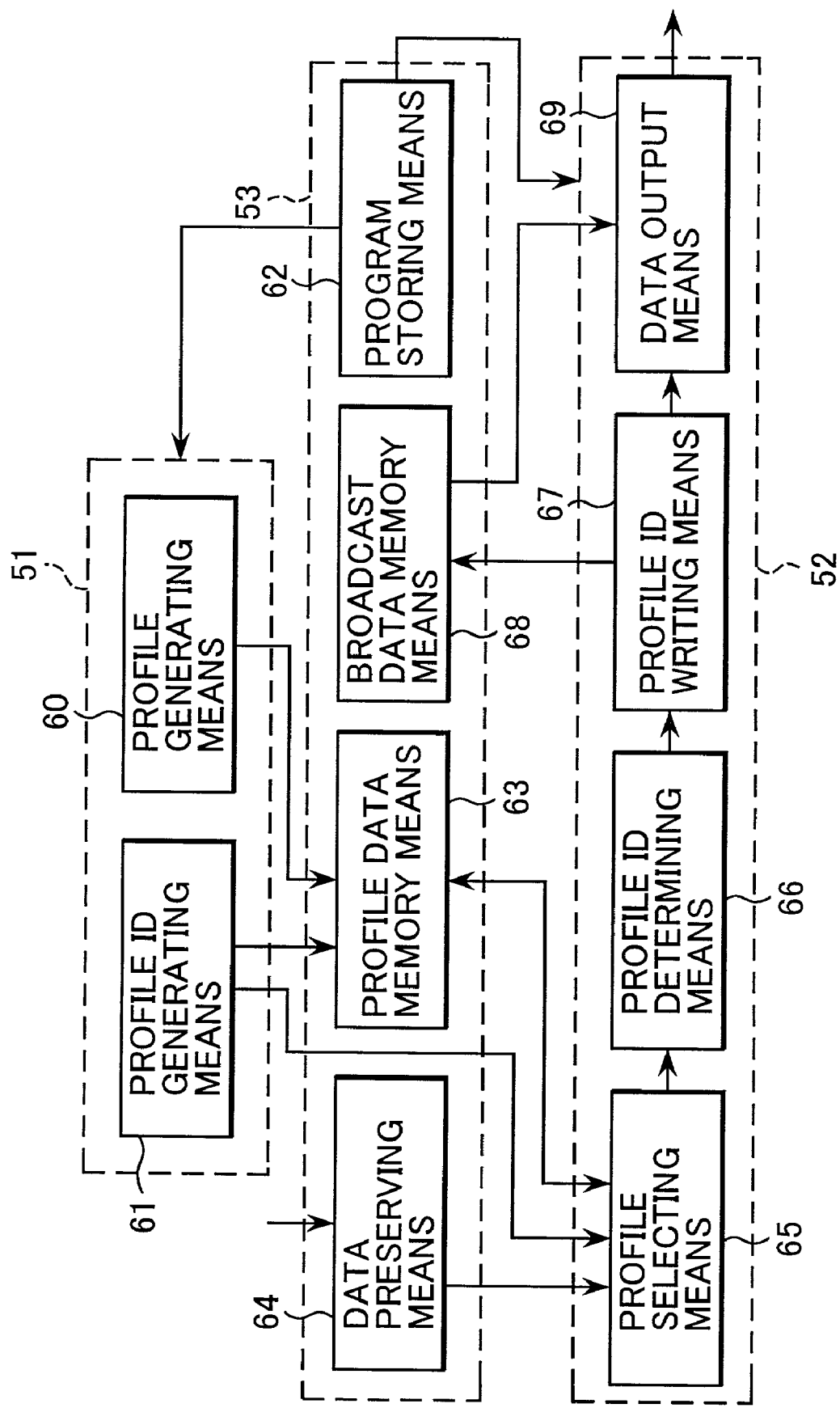
FIG. 8 is a schematic block diagram of a personal computer for constituting a communication data processing apparatus.

FIG. 8 is a schematic block diagram of the personal computer 55 provided for the communication data processing apparatus 50.

As shown in FIG. 8, the main-CPU 51 of the personal computer 55 incorporates the following: a profile generating means 60 which generates such a profile including the data related to the contents of a contents data to be subject to broadcasting after reception from the data transmitting apparatus 5, the data related to the transmitting side, and the data related to the receiving side; and a profile ID generating means 61 which generates such a profile ID being an identifier corresponding to the profile generated by the profile generating means 60.

As shown in FIG. 8, the above-referred memory 53 built in the personal computer 55 which constitutes the above-referred communication data processing apparatus 50 incorporates the following: a program storing means 62 which stores programs for operating the main-CPU 51 and a sub-CPU 52; a profile data memory means 63 which stores such a profile data including a profile generated by the profile generating means 60 of the main-CPU 51 and profile IDs generated by the profile ID generating means 61 and related to each of the corresponding profiles; a data preserving means 64 which stores a contents data received from the data transmitting apparatus 5; and a broadcast data memory means 68 which stores such a contents data containing a profile ID written therein by a profile ID writing means 67 of the sub-CPU 52.

As shown in FIG. 8, the sub-CPU 52 built in the personal computer 55 which constitutes the above-referred communication data processing apparatus 50 incorporates the following: a profile selecting means 65 which selects at least one profile and a profile ID corresponding thereto from the profile data stored in the profile data memory means 63 of the memory 53; a profile ID determining means 66 which determines such a profile ID that should be added to a contents data received from the data transmitting apparatus 5 based on a profile ID generated by the profile ID generating means 61 and/or such a profile ID corresponding to a profile selected by the profile selecting means 65; a profile ID writing means 67 which writes the profile ID determined by the profile ID determining means 66 into the corresponding contents data; and a data output means 69 which outputs such a contents data containing a profile ID written by the profile ID writing means 67 or such a contents data containing a written profile ID and being stored in the above-referred broadcast data memory means 68.

The data communication system related to the practical form for implementing the present invention featuring the above-described structure transmits a contents data from the transmitting apparatus 5 to the portable terminal apparatus 4 via the broadcasting format by way of the procedure described below.

Initially, such a contents data to be subject to broadcasting is generated by a contents data generating means 16 of the transmitting apparatus 5. Then, the contents data is transmitted by the data transmitting apparatus 15 to the provider 2 via the broadcasting form, and then, the transmitted contents data is received by the communication data processing apparatus 50 on the part of the provider 2.

On receipt of the transmitted contents data via the transmitting apparatus 5, the communication data processing apparatus 50 stores the received contents data in the data preserving means 64.

In the communication data processing apparatus 50 related to the practical form for implementing the present invention, initially, only the main-CPU 51 built in the personal computer 55 is activated to generate a contents data and then the generated contents data is stored in a data preserving means 64 of the memory 53. Next, such a profile ID corresponding to a profile corresponding to a specific contents data generated by the profile generating means 60 and also corresponding to such a profile generated by a profile ID generating means 61 is stored in the profile data memory means 63. When preparing for broadcasting, initially, only the sub-CPU 52 of the personal computer 55 is activated to add a desired profile ID to the contents data before actually broadcasting the profile-ID-added contents data.

More particularly, before actually broadcasting the contents data received from the transmitting apparatus 5, initially, the sub-CPU 52 built in the personal computer 55 is activated. Then, a profile selecting means 65 reads the contents of a contents data stored in the data preserving means 64 of the memory 53. Based on the result of reading the contents, the profile selecting means 65 extracts a profile related to the contents of the contents data, a profile related to transmission and reception of the contents data, and a profile ID corresponding to both of the contents data out from a profile data stored in the profile data memory means 63. Next, the profile selecting means 65 outputs such a profile ID corresponding to the profiles extracted from the profile data.

On the other hand, when it is required to newly generate a profile and a profile ID, the main-CPU 51 is also activated to enable operator to activate operation of the profile generating means 60 via operation of a keyboard 54, thus generating a fresh profile. Simultaneously, a new profile ID corresponding to the newly generated profile is also generated by the profile ID generating means 61, and then, the newly generated profile ID is output to a profile ID determining means 66 built in the sub-CPU 52.

Based on the profile ID received from the profile selecting means 65 and/or the profile ID generating means 61, the profile ID determining means 66 determines such a profile ID to be linked with such a contents data being subject to broadcasting, and then outputs the determined profile ID to a profile ID writing means 67.

The profile ID determining means 67 writes the profile ID received from the profile ID determining means 66 in a predetermined data area in the contents data read out of the data preserving means 64, and then causes the contents data subject to broadcasting to be linked with the written profile ID.

A data output means 69 outputs a designated contents data containing a profile ID written by the profile ID writing means 67 to a data transmitting apparatus 56, which then transmits the contents data containing the written profile ID via the broadcasting form.

In the communication data processing apparatus 50 related to the practical form for implementing the present invention, it is also possible to cause a broadcasting data memory means 68 of the memory 53 to store such a contents data containing a profile ID written by the profile ID writing means 67, and then, before actually broadcasting the designated contents data, only the sub-CPU 52 of the personal computer 55 is activated to cause the data output means 69 to read out the contents data containing the written profile ID and being stored in the broadcasting data memory means 68 of the memory 53 before delivering the contents data to the data transmitting apparatus 56 prior to the broadcasting thereof.

According to the practical form for implementing the present invention, a desired profile ID is written into a contents data broadcast from the transmitting apparatus 5 via the communication data processing apparatus 50 set on the part of the provider 2, and then, the contents data added with the written profile ID is transmitted to the portable terminal apparatus 4. The portable terminal apparatus 4 incorporates a received profile ID data memory means 63 which stores a received profile ID data consisting of receivable profile IDs generated by user by way of utilizing such a profile data opened by the transmitting source. It is so arranged that a combination of profile IDs to be broadcasted via addition to a contents data, in other words, the profile IDs linked with each other via AND can be registered to a received profile ID data as a receivable profile ID. Accordingly, even when the amount of broadcast data becomes excessively large, by way of adding a plurality of profile IDs to a contents data to be subject to broadcasting via the communication data processing apparatus 50 set on the part of the provider 2 and also by way of registering plural profile IDs linked with each other via AND to the received profile ID data as a receivable profile ID, it is possible for individual users to efficiently and selectively receive only the required contents data.

Further, according to the practical form for implementing the present invention, inasmuch as addition of a profile ID to a contents data and broadcasting of the contents data added with a profile ID are solely executed by the sub-CPU 52, before actually broadcasting such a contents data added with a profile ID, it is solely necessary to activate only the sub-CPU 52, thus saving power consumption.

Further, in the practical form for implementing the present invention, inasmuch as the memory 53 built in the personal computer 55 incorporates the broadcast data memory means 68 which stores such a contents data containing a written profile ID, before actually broadcasting the contents data containing a written profile ID, it is solely necessary to activate only the sub-CPU 52, thus saving power consumption.

Figure 9:
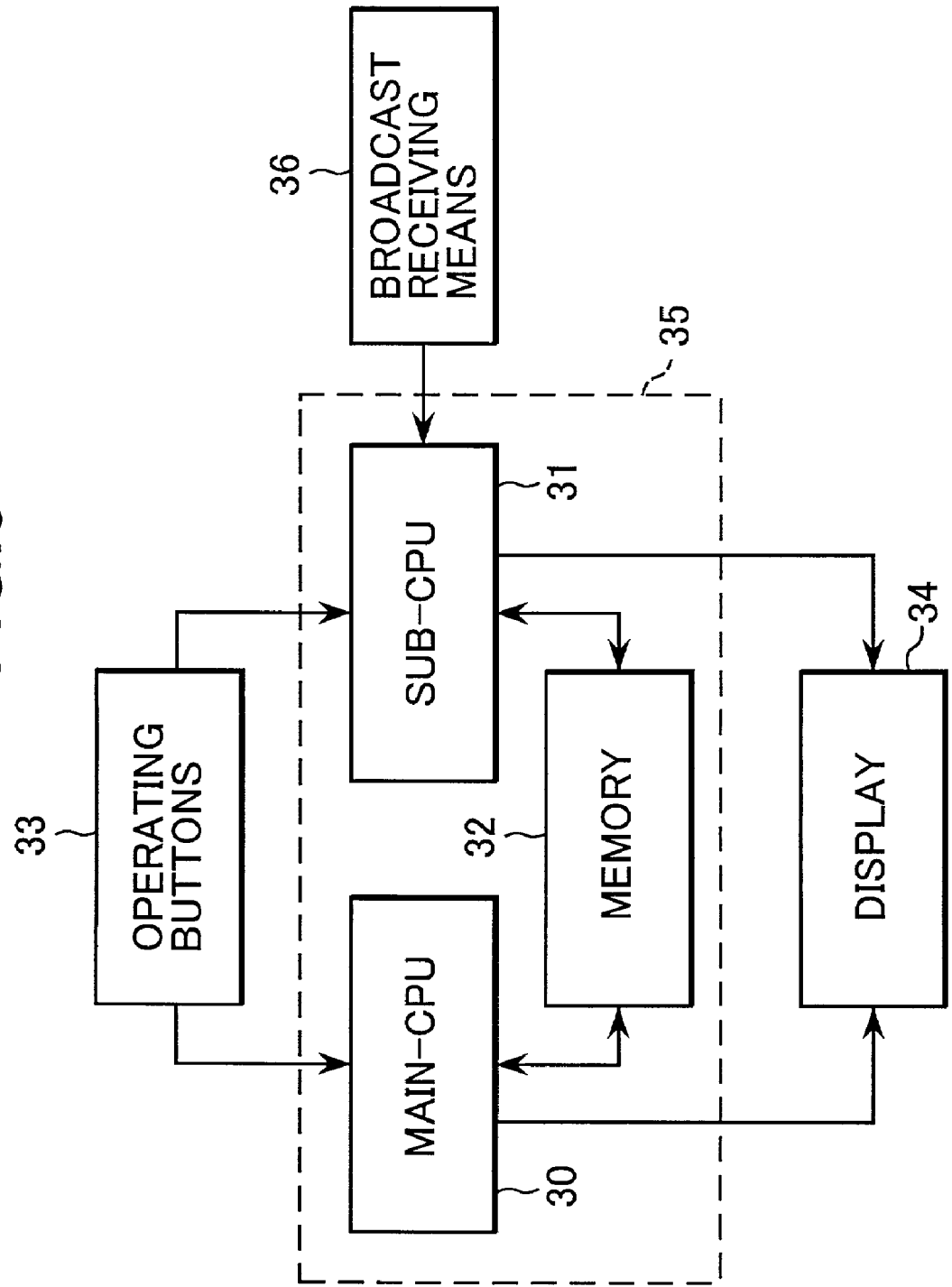
FIG. 9 is a schematic block diagram of a portable terminal apparatus related to another aspect for implementing the present invention.
Figure 10:
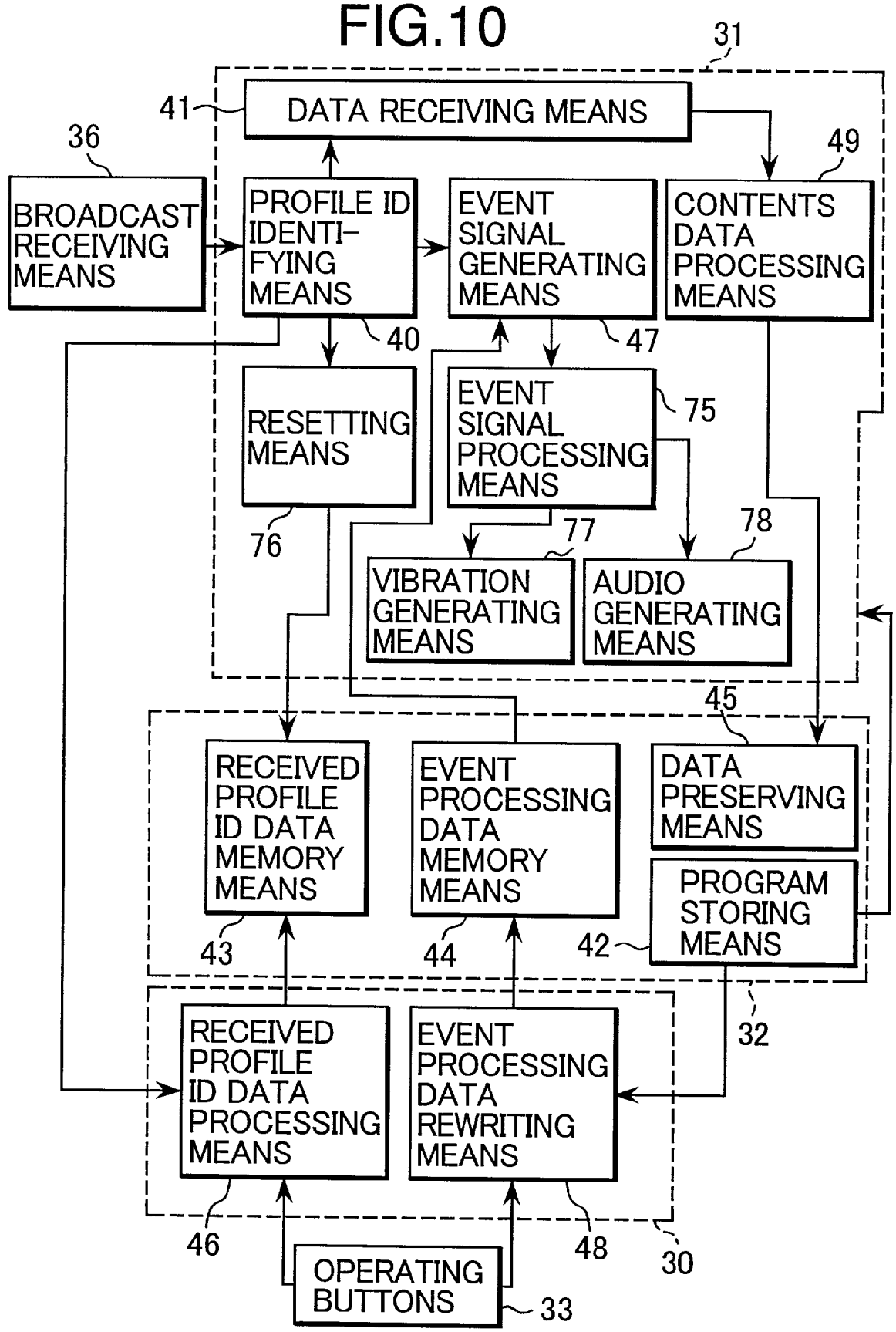
FIG. 10 is a schematic block diagram of a personal computer for constituting a portable terminal apparatus.

FIG. 9 is a schematic block diagram of the portable terminal apparatus 4 related to another preferred aspect for implementing the present invention. FIG. 10 is a schematic block diagram of a personal computer.

As shown in FIG. 9, like the portable terminal apparatus 4 related to the practical aspect shown in FIG. 5, the portable terminal apparatus 4 related to the embodiment shown in FIG. 9 also incorporates the data receiving device 35 provided with the main-CPU 30, the sub-CPU 31, the memory 32, group of operating buttons 33, the display 34, and the broadcast data receiving means 36. The data receiving device 35 is interchangeably built in the portable terminal apparatus 4.

As shown in FIG. 10, in addition to the main-CPU 30 of the data receiving device 35 shown in FIG. 6, the sub-CPU 31 of the data receiving device 35 related to the practical aspect shown in FIG. 10 comprises the following: an event signal processing means 75 which executes a predetermined process against the portable terminal apparatus 4 based on an event signal generated by the event signal generating means 47; a resetting means 76 which sets such a profile ID corresponding to such a profile of a certain layer of a unit profile data having a tree structure that should be received by the profile ID identifying means 40 to such a profile ID corresponding to a profile having a layer grade upper by one grade than such a profile corresponding to a profile ID set by user when the rounds of the reception of the contents data received within a predetermined time T immediately before the present time is less than the predetermined rounds N after causing the profile ID identifying means 40 to identify the receivable profile ID and also after causing the data receiving means 41 to count the rounds of the reception of the contents data; an vibration generating means 77 which vibrates the portable terminal apparatus 4, and a audio generating means 78 which generates audio.

In the practical form for implementing the present invention shown in FIG. 10, an event processing data stored in the event processing data memory means 44 includes such an event processing data which causes the vibrating generating means 7 to vibrate the portable terminal apparatus 4 or causes the audio generating means 78 to generate audio signal when a contents data provided with a specific profile ID has been received.

After reading a profile ID written in a predetermined data area of the input contents data and then scanning the received profile ID stored in the received profile ID memory means 43, when the profile ID identifying means 40 identifies that the read-out profile ID is contained in the received profile ID stored in the received profile ID memory means 43, the profile ID identifying means 40 outputs the input contents data to the data receiving means 41 to cause the contents data to be received decisively and then outputs the profile ID added to the contents data to the above-referred event signal generating means 47.

On receipt of a profile ID from the profile ID identifying means 40, the event signal generating means 47 accesses the event processing data memory means 44 and then reads an event processing data corresponding to the input profile ID out from the stored event processing data.

Then, when such an event processing signal for instructing the profile ID input from the profile ID identifying means 40 to execute a process for vibrating the portable terminal apparatus 4 is stored in the event processing data memory means 34, the event signal generating means 37 generates such an event signal for instructing to vibrate the portable terminal apparatus 4 and then outputs this event signal to an event signal processing means 75.

On the other hand, when such an event processing data for instructing the profile ID input from the profile ID identifying means 40 to generate audio is stored in the event processing data memory means 44, the event signal generating means 47 generates such an event signal for instructing generation of audio and then outputs the generated event signal to the event signal processing means 75.

On the other hand, when such an event processing data for instructing the profile ID input from the profile ID identifying means 40 to process the received contents data is stored in the event processing data memory means 44, the event signal generating means 47 generates such an event signal containing instruction to execute a corresponding process and then outputs this event signal to the contents data processing means 49.

On receipt of such an event signal for instructing to vibrate the portable terminal apparatus 4, the event signal processing means 75 outputs a drive signal to the vibration generating means 77 to generate vibration to cause the portable terminal apparatus 4 to be vibrated. When such an event signal for instructing to generate audio is received, the event signal processing means 75 outputs a drive signal to the audio generating means 78 to cause audio signals such as a music tune to be generated, for example.

In the practical form for implementing the present invention, when the rounds of the reception of a contents data within a predetermined time T immediately before the present time is less than the predetermined rounds N, only for the period within a predetermined time T, it is so arranged that the receivable profile ID is reset by the resetting means 76 to be back to such a profile ID corresponding to such a profile having the layer one grade upper than the profile of a unit profile data containing a preset tree structure via a profile ID designating means 38 operated by user in order that the desired contents data can be received based on a milder standard.

More particularly, the data receiving means 41 counts the rounds of the reception of the contents data. When the above-referred profile ID identifying means 40 identifies that the round of reception of the contents data by the portable terminal apparatus 4 is less than the predetermined rounds N within a predetermined time T after identifying a specific profile ID that should be received, assume that user has already set a specific profile ID corresponding to a profile related to the Major Baseball Leagues among a unit profile data group related to sports by operating the profile ID designating means 38, in order to increase the rounds of reception, based on the received profile ID data stored in the received profile ID memory means 43, the resetting means 76 resets the profile ID to be received by the profile ID identifying means 40 to be back to such a profile having the layer one grade upper than the profile corresponding to the profile preset by user, concretely, the profile ID to be received by the profile ID identifying means 40 is reset to be back to such a profile ID corresponding to a profile related to the professional baseball having the layer one grade upper than the profile related to the Major Baseball Leagues as shown in FIG. 4 for example.

As a result, such a contents data added with a profile ID corresponding to a profile related to the Japanese professional baseball leagues can also be received by the data receiving means 41. This means that, when the rounds of the reception of contents data are excessively small, it is possible to increase the rounds of the reception of contents data.

Even after resetting the preset profile ID, the profile ID identifying means 40 identifies such a profile ID that should be received, and yet, the data receiving means 41 counts the rounds of reception of the contents data. When the rounds of the reception of contents data exceed a predetermined round N within a predetermined time T thenceforth, the resetting means 76 resets such a profile ID to be received by the profile ID identifying means 40 back to the profile ID preset by user, for example, back to the profile ID corresponding to the Major Baseball Leagues. On the other hand, even within a following predetermined time T, if the rounds of the reception of contents data is less than the preset rounds N, in accordance with the reset profile ID, the resetting means 76 causes the profile ID identifying means 40 to continuously identify profile IDs until the rounds of reception of contents data received by the data receiving means 41 exceed the preset round N within a predetermined time T.

According to the practical form for implementing the present invention, in addition to the preceding embodiments shown in FIG. 1 to FIG. 6, by way of previously generating such an event data processing data for vibrating the portable terminal apparatus 4 and another event data processing data for generating speech/audio signal against the profile ID added to such a contents data which is urgently desired by user for reception, and yet, by way of storing the above event data in the event processing data memory means 44, user can be informed of the reception of the desired contents data by vibrating the portable terminal apparatus 4 or by generating audio signals such as a music tune at the moment of receiving the contents data, thus enabling the user to quickly and selectively receive the desired contents data so that he can effectively utilize the received contents data.

Further, according to the practical form for implementing the present invention, in addition to the preceding embodiments shown in FIG. 1 to FIG. 6, the rounds of reception of the contents data are counted by the data receiving means 41, and yet, when the rounds of the reception of contents data are too small being less than the preset rounds N within a predetermined time T, the resetting means 76 resets the receivable profile ID to be back to such a profile ID corresponding to such a profile having the layer one layer upper than the profile corresponding to the profile ID preset by user, and yet, the profile ID identifying means 40 continuously identifies whether a specific contents data should be received or not in accordance with the profile ID corresponding to the profile having an upper layer until the rounds of the reception of contents data received by the data receiving means 41 exceed the preset round N within a predetermined time T. Accordingly, it is possible to maintain proper rounds of reception of the content data.

Figure 11:
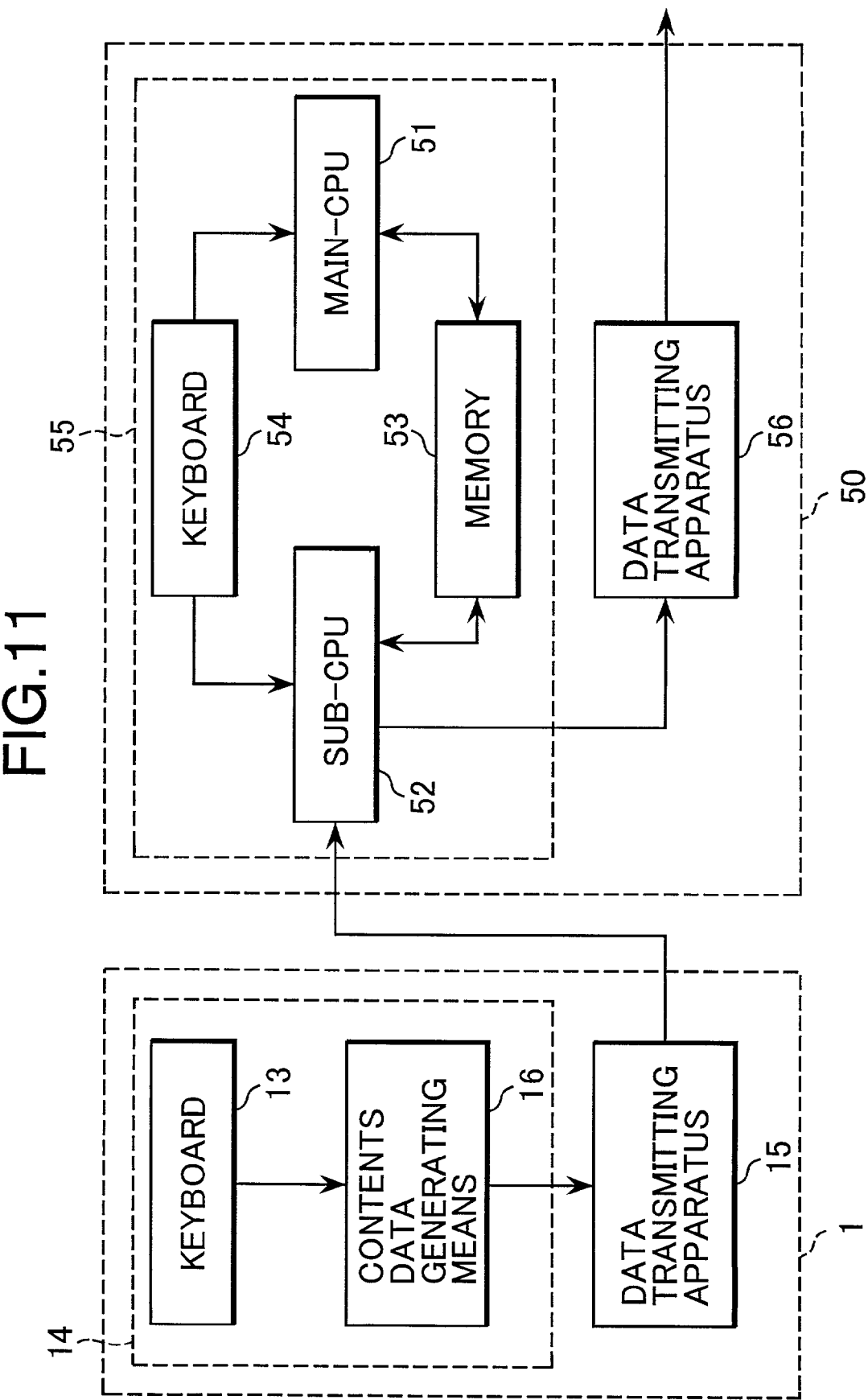
FIG. 11 is a schematic block diagram of a transmitting apparatus of a data communication system and a communication data processing apparatus provided on the part of a provider related to another preferred aspect for implementing the present invention.

FIG. 11 is a schematic block diagram of the data transmitting apparatus 5 of the data communication system and a communication data processing apparatus 50 installed on the part of the provider 2 according to another preferred aspect for implementing the present invention.

As shown in FIG. 11, the data transmitting apparatus 5 of the data communication system and the communication data processing apparatus 50 of the provider 2 according to another preferred embodiment of the present invention are respectively provided with the structure exactly identical to the one shown in FIG. 7.

Figure 12:
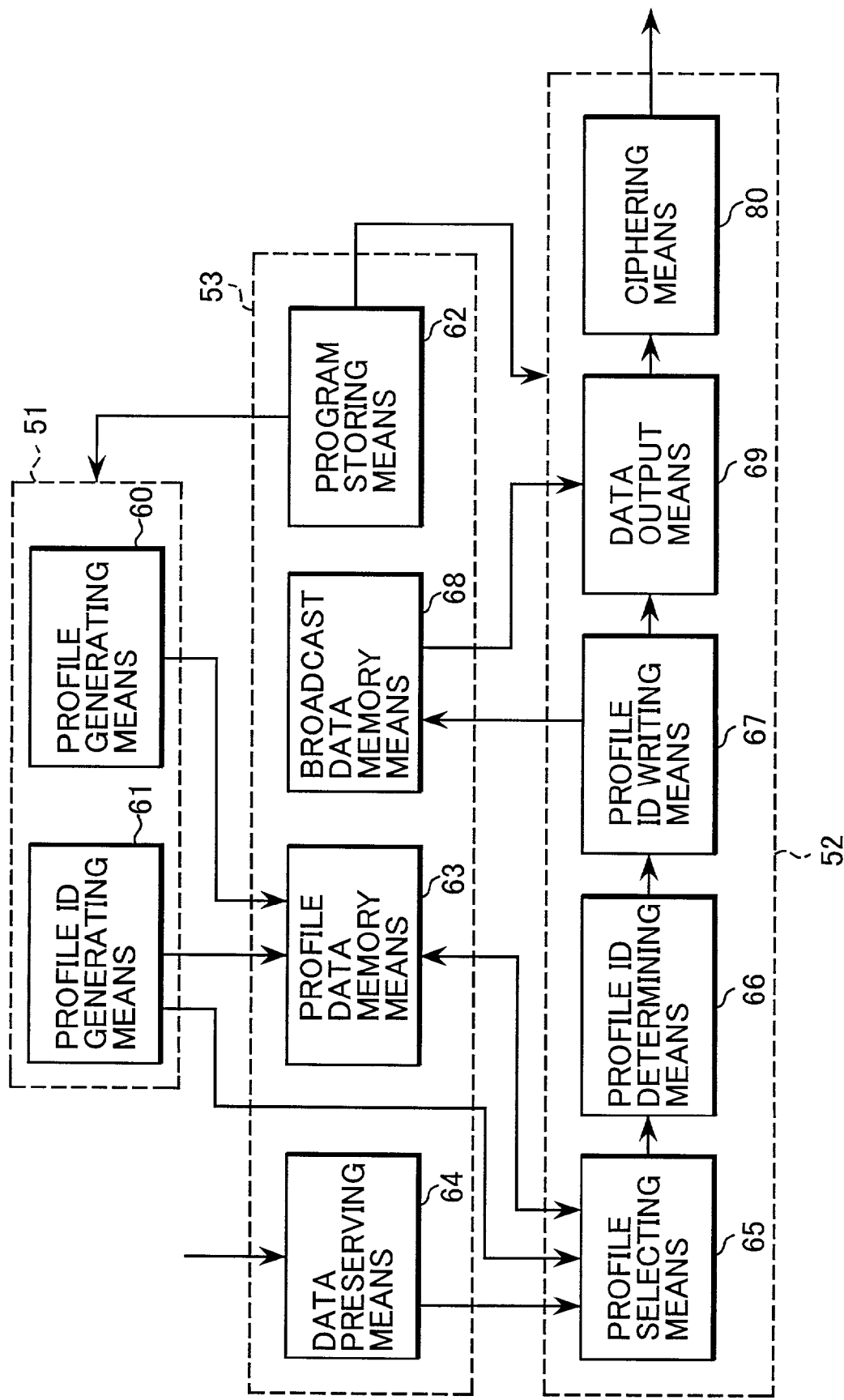
FIG. 12 is a schematic block diagram of a personal computer of a communication data processing apparatus.

FIG. 12 is a schematic block diagram of a personal computer 55 provided for the above-referred communication data processing apparatus 50 according to another preferred embodiment of the present invention.

As shown in FIG. 12, a sub-CPU 52 built in the personal computer 55 of the communication data processing apparatus 50 related to this embodiment is provided with a ciphering means 80 for ciphering a contents data containing a profile ID written by a profile ID writing means 67 therein. Except for the arrangement for ciphering the contents data written with a profile ID therein to be compatible with the broadcasting, the personal computer 55 provided for this embodiment is complete with the structure exactly identical to that of the above-referred personal computer 55 of the communication data processing apparatus 50 shown in FIG. 8.

In the embodiment shown in FIG. 12, it is so arranged that the contents data to be broadcasted via the provider 2 and the profile ID added to this contents data are totally ciphered by the above-referred ciphering means 80 by means of a secret key DES which can never be opened to any receiving apparatus other than the one owned by the provider 2 and by a specific receiving person contracted with the provider 2. It is so arranged that the ciphered contents data and the profile ID can solely be transmitted by a data transmitting apparatus 56 by way of broadcasting.

Figure 13:
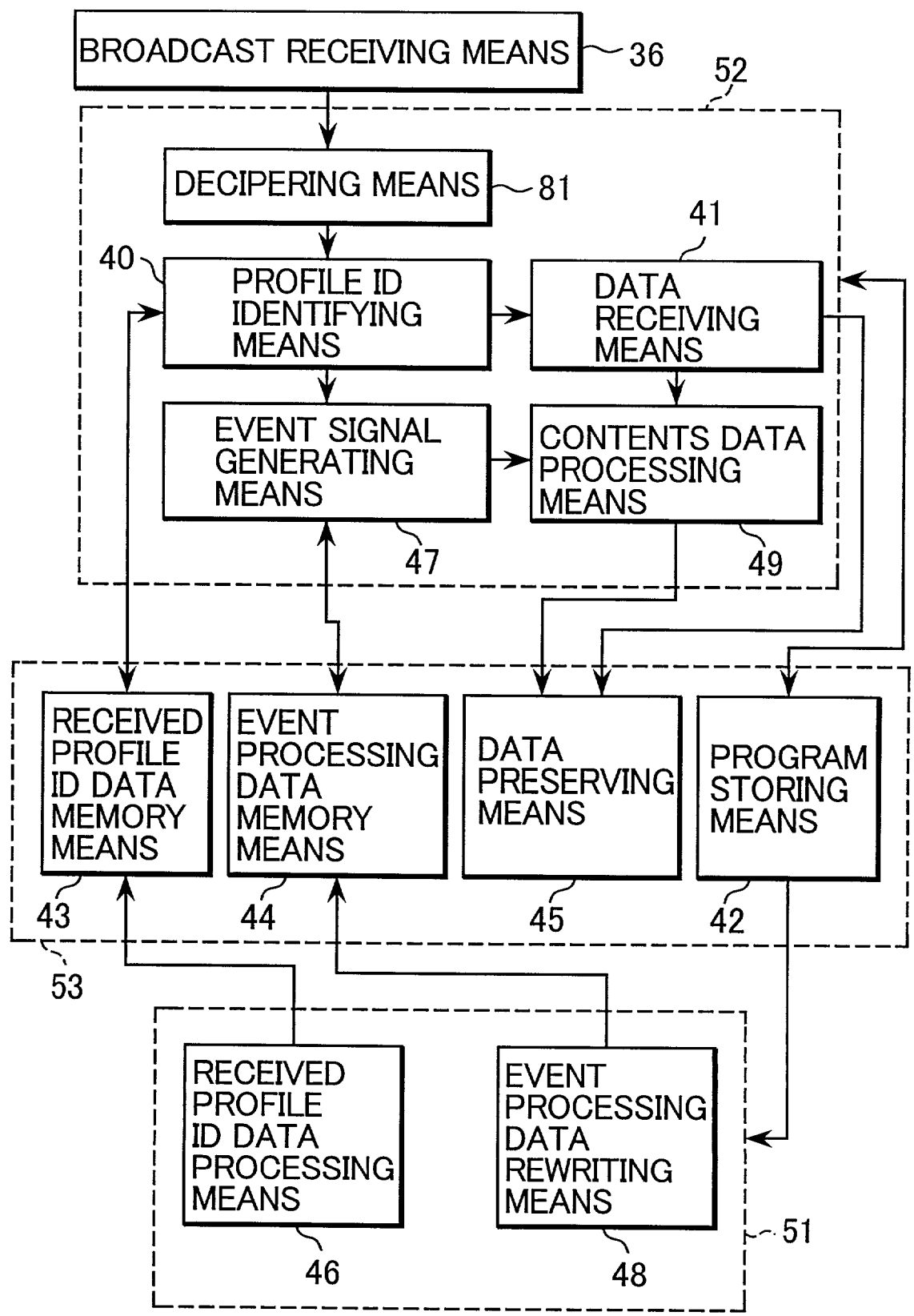
FIG. 13 is a schematic block diagram of a personal computer for constituting a portable terminal apparatus related to another preferred aspect for implementing the present invention.

FIG. 13 is a schematic block diagram of the portable terminal apparatus 4 related to a still preferred aspect for implementing the present invention. The portable terminal apparatus 4 has such a structure compatible with the above-referred communication data processing apparatus 50 installed on the part of the provider 2 shown in FIGS. 11 and 12. The portable terminal apparatus 4 is provided with a data receiving device 35 incorporating a main-CPU 30, a sub-CPU 31, and a memory 32, a group of operating buttons 33, a display 34, and a broadcast data receiving means 36 for receiving broadcast data. The data receiving apparatus 35 is interchangeably built in the portable terminal apparatus 4.

As shown in FIG. 13, except for the provision of a deciphering means 81 for deciphering such a contents data and a profile ID added to the contents data input to the sub-CPU 52 via ciphering by applying a secrete key DES, the data receiving device 35 of the portable terminal apparatus 4 related to this embodiment has such a structure exactly identical to that of the data receiving apparatus 35 of the portable terminal apparatus 4 shown in FIG. 6.

In the communication data processing apparatus 50 on the part of the provider 2 shown in FIG. 12, a profile ID writing means 67 writes a profile ID determined by a profile ID determining means 66 in a predetermined area of the contents data received from the data transmitting means 15 of the transmitting apparatus 5 and then outputs the written profile ID to a data output means 69 or a broadcast data memory means 68.

When a contents data has been received from the profile ID writing means 67, the data output means 69 outputs the received contents data to the ciphering means 80 or reads the contents data added with a profile ID stored in the broadcast data memory means 68 and then outputs the contents data to the ciphering means 80.

In such a case in which the input profile ID corresponds to such a profile ID added to the contents data identified to be receivable solely by a data receiving apparatus owned by user under a specific contract with the provider 2, by utilizing a secrete key DES that can never be open to any data receiving apparatus other than the one owned by the provider 2 and user under a contract with the party, the ciphering means 80 ciphers the input contents data and the profile ID added thereto. If the above condition is not identified, the ciphering means 80 directly outputs the received contents data and the profile ID added to the contents data to the data transmitting apparatus 56 without executing any process against them.

The data transmitting apparatus 56 transmits the ciphered contents data and the profile ID added to the ciphered contents data via the broadcasting form.

In the portable terminal apparatus 4 shown in FIG. 13, the contents data and the profile ID added thereto already broadcast and then received by the broadcast data receiving means 36 are initially delivered to the above-referred deciphering means 81 of the sub-CPU 52 built in the data receiving apparatus 35.

In such a case in which the input contents data and the profile ID written in a predetermined data are of the contents data are not ciphered, the deciphering means 81 outputs both of them to the profile ID identifying means 40 without executing any process against them. On the other hand, in such a case in which the received contents data and the profile ID added thereto are respectively ciphered by applying a secrete key DES, using a secrete key DES delivered from the provider 2, the deciphering means 81 deciphers both of them and then outputs the deciphered contents data and the profile ID added thereto to the profile ID identifying means 40.

According to the embodiment shown in FIG. 13, it is possible to enable only the specific user to selectively receive a specific contents data.

Figure 14:
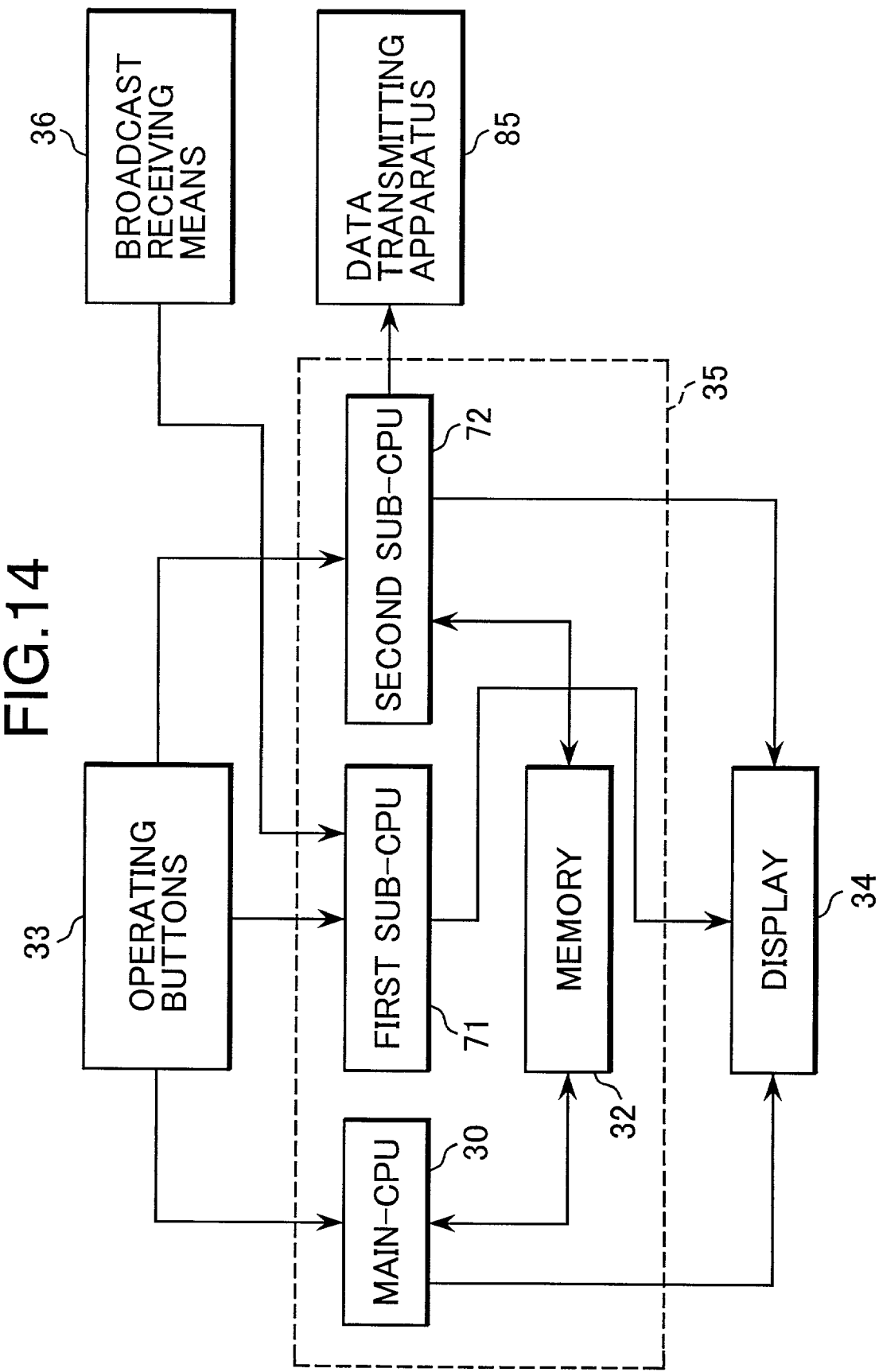
FIG. 14 is a schematic block diagram of a portable terminal apparatus related to another preferred aspect for implementing the present invention.

FIG. 14 is a schematic block diagram of the portable terminal apparatus 4 provided for the data communication system according to another preferred aspect for implementing the present invention.

The portable terminal apparatus 4 according to the embodiment shown in FIG. 14 is so structured that it can execute not only the reception of a contents data, but it can also execute broadcasting of the contents data. As shown in FIG. 14, in addition to the data receiving device 35 incorporating the main-CPU 30, a first sub-CPU 71, a second sub-CPU 72, and the memory 32, the portable terminal apparatus 4 further incorporates a data transmitting means 85 for transmitting a contents data via the broadcasting form. The data receiving apparatus 35 itself is interchangeably built in the portable terminal apparatus 4.

Figure 15:
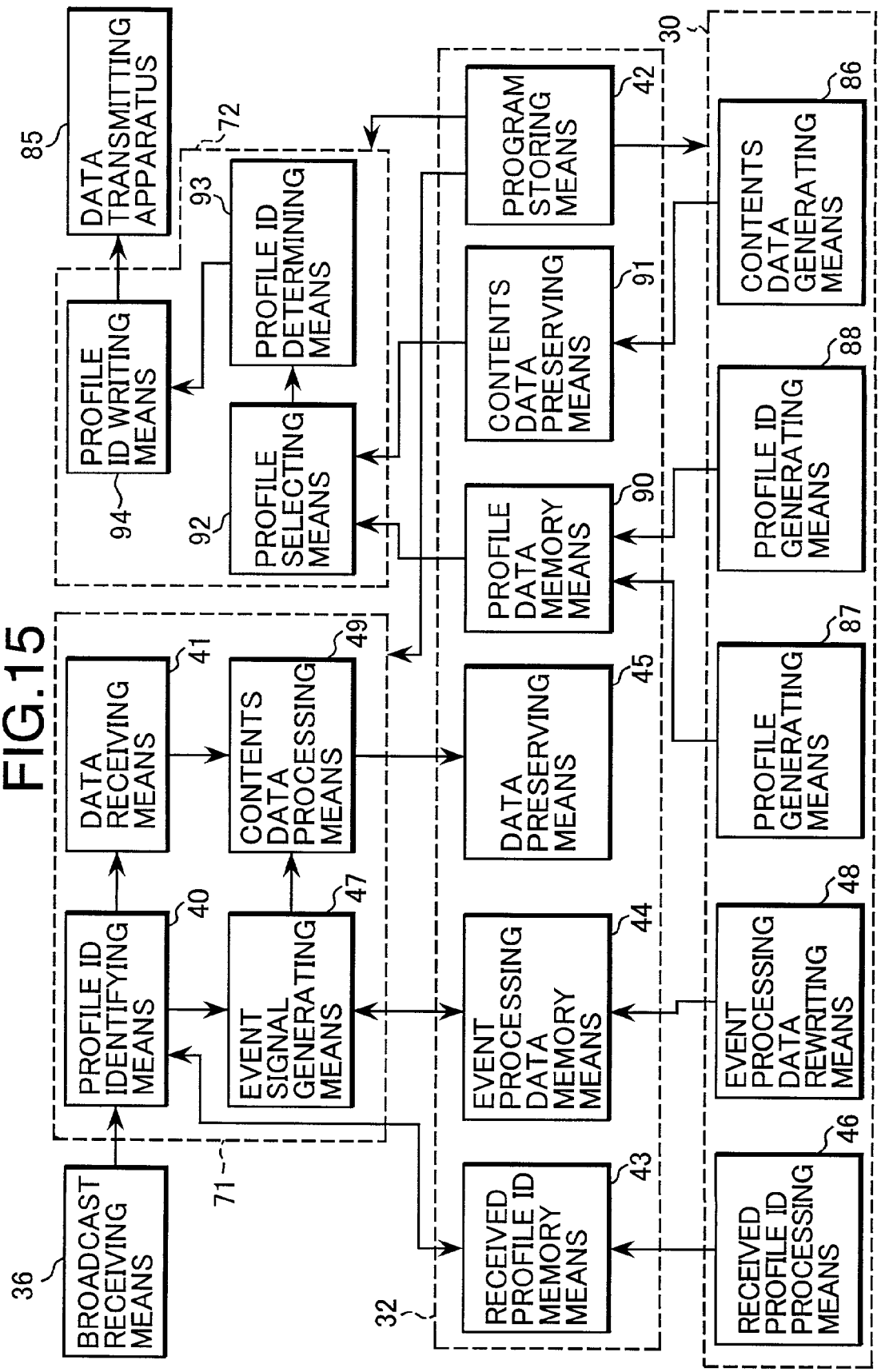
FIG. 15 is a schematic block diagram of a portable terminal apparatus related to another preferred aspect for implementing the present invention.

FIG. 15 is a schematic block diagram of the data receiving device 35.

As shown in FIG. 15, like the sub-CPU 31 related to the preceding embodiment shown in FIG. 6, the first sub-CPU 71 built in the data receiving apparatus 35 related to this embodiment incorporates a profile ID identifying means 40, a data receiving means 41, an event signal generating means 47, and a contents data processing means 49.

As shown in FIG. 15, like the data transmitting apparatus 5 shown in FIG. 3, the main-CPU 30 of the data receiving device 35 incorporates a contents data generating means 86, a profile ID generating means 87, and a profile ID generating means 88.

As shown in FIG. 15, the second sub-CPU 72 of the data receiving device 35 incorporates a profile selecting means 92, a profile ID determining means 93 and a profile ID writing means 94.

As shown in FIG. 15, like the memory 32 related to the preceding embodiment shown in FIG. 6, the memory 32 of the data receiving device 35 incorporates a program storing means 42, a received profile ID memory means 43, an event processing data memory means 44, and a data preserving means 45. The memory 32 further incorporates the following: a profile data memory means 90 which stores such a profile data including a plurality of profile IDs which are respectively generated by the profile ID generating means 88 and related to each of the corresponding profiles; a contents data preserving means 91 which preserves such a contents data generated by the contents data generating means 86; and a program storing means 32.

The data transmitting apparatus 85 used for this embodiment has such a structure capable of transmitting a contents data via the broadcasting form.

In this embodiment, the above-referred profile ID writing means 94 writes a profile ID in a predetermined data area of a contents data, whereas the profile ID identifying means 40 identifies whether a designated content data should decisively be received or not based on the profile ID written in a predetermined data area of the contents data.

According to this embodiment, it is possible for user to generate such a contents data to express his desire to purchase a certain commodity at less than a certain price via the contents data generating means 86, and then, write a profile ID in a predetermined data area of the generated contents data via the profile ID writing means 94 before eventually transmitting the profile ID written contents data via the data transmitting apparatus 85 by way of broadcasting them. Further, on receipt of such a contents data added with a specific profile ID identical to the profile ID added to the contents data transmitted from the party who received the broadcast data, it is possible for user to selectively receive only the required contents data after selecting the contents data by operating the profile ID identifying means 40. Further, when the user receives a contents data added with such a profile ID identical to the profile ID added to the broadcast contents data, by way of storing such an event processing data for causing the contents data to be stored in a specific holder area of the data preserving means 45 in the event processing data memory means 44, it is possible to collectively control and utilize the contents data received in response to the broadcast data by operating the contents data processing means 49.

In the practical form for implementing the present invention, inasmuch as the data receiving device 35 provided for the portable terminal apparatus 4 incorporates such a function to broadcast a contents data, in such a case in which the receiving device 35 receives a contents data added with a specific profile ID while mutually transmitting and receiving them between groups for example, by way of generating an event processing data in order to immediately generate a contents data of a predetermined format for broadcasting, it is possible to securely exchange the desired contents data between groups via broadcasting.

Figure 16:
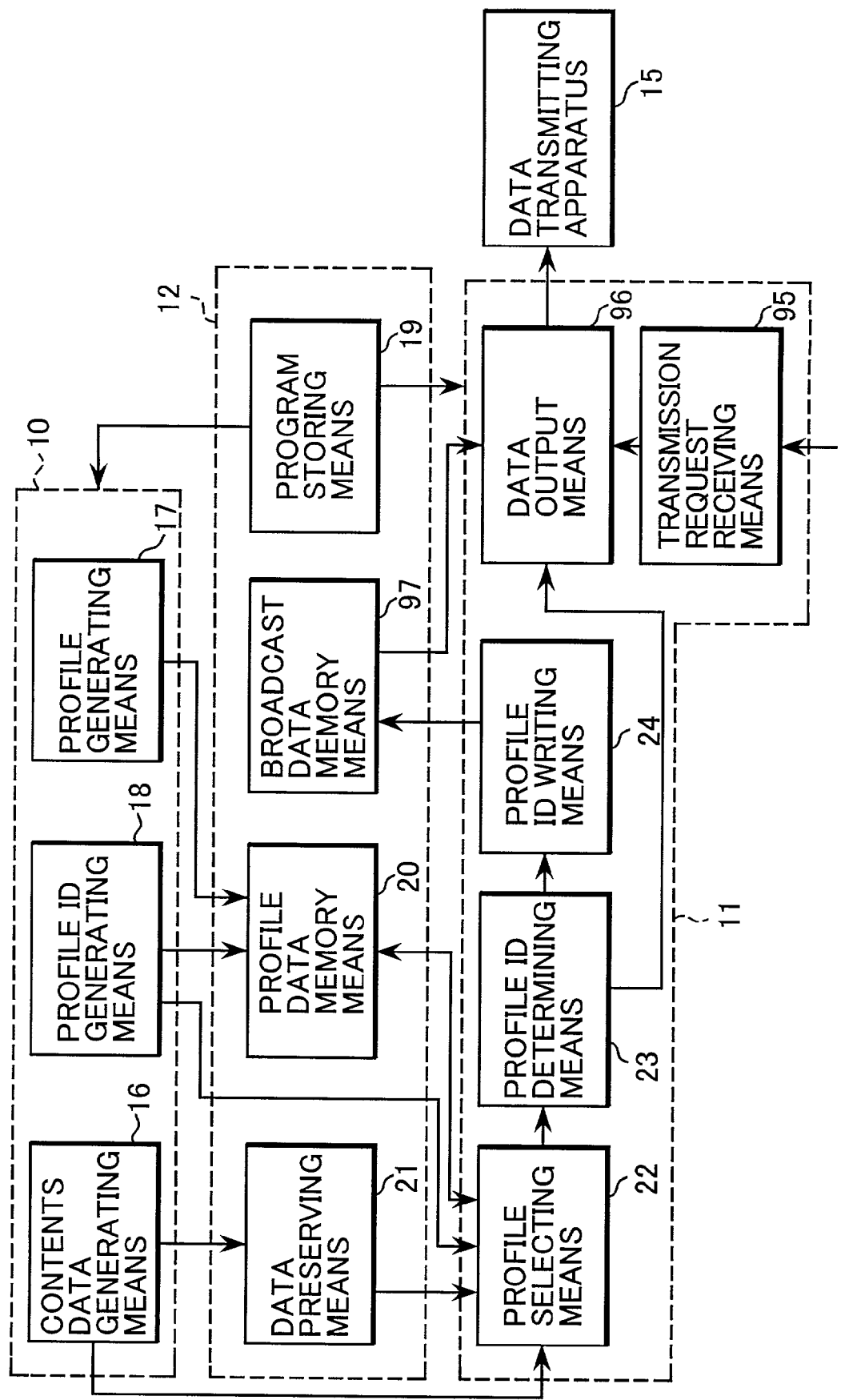
FIG. 16 is a schematic block diagram of a personal computer of a transmitting apparatus related to another preferred aspect for implementing the present invention.
Figure 17:
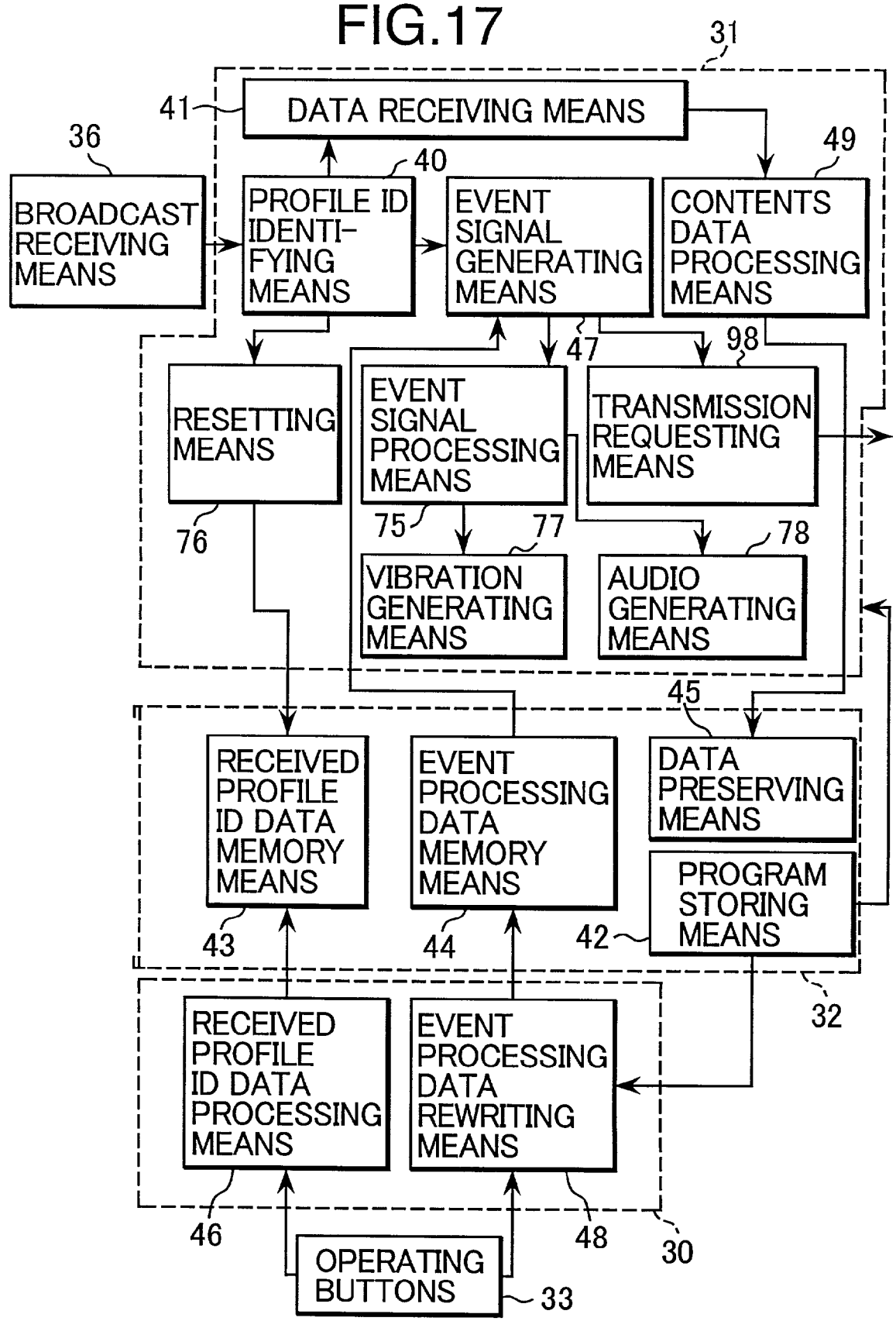
FIG. 17 is a schematic block diagram of a personal computer for constituting a portable terminal apparatus related to another preferred aspect for implementing the present invention.

FIG. 16 is a schematic block diagram of the transmitting apparatus 5 of the data communication system according to another preferred aspect for implementing the present invention. FIG. 17 is a schematic block diagram of the portable terminal apparatus 4.

The transmitting apparatus 5 related to the embodiment shown in FIG. 16 incorporates a short-distance radio communication function, which is mountable on a movable vehicle such as a taxi cab or the like. Like the data transmitting apparatus 5 shown in FIG. 2, the transmitting apparatus 5 shown in FIG. 16 is provided with the personal computer 14 incorporating the main-CPU 10, the sub-CPU 11, the memory 12, and the keyboard 13, and the data transmitting apparatus 15.

As shown in FIG. 16, the sub-CPU 11 built in the personal computer 14 related to this embodiment incorporates a transmission request receiving means 95. The sub-CPU 11 shown in FIG. 16 has such a structure identical to that of the preceding sub-CPU 11 shown in FIG. 3 except for such an arrangement in which a profile ID determined by the profile ID determining means 23 is delivered to the profile ID writing means 24 and also to a data output means 96, and then the data output means 96 normally transmits only the profile ID to the data transmitting apparatus 15 via the broadcasting form.

Further, as shown in FIG. 16, the memory 12 built in the personal computer 14 related to this embodiment is also provided with such a structure identical to that of the memory 12 related to the preceding embodiment shown in FIG. 3 except for the provision of a broadcast data memory means 97 for storing such a contents data containing a profile ID written by the profile ID writing means 24.

Further, exactly like the portable terminal apparatus 4 shown in FIG. 5, the portable terminal apparatus 4 related to this embodiment shown in FIG. 16 is provided with the data receiving device 35 incorporating the main-CPU 30, the sub-CPU 31, and the memory 32, a group of operating buttons 33, the display 34, and the broadcast data receiving means 36. In this embodiment, the data receiving device 35 is also interchangeably built in the portable terminal apparatus 4.

As shown in FIG. 17, the sub-CPU 31 of the data receiving device 35 has such a structure identical to that of the sub-CPU 31 of the preceding embodiment shown in FIG. 10 except for the provision of a transmission requesting means 98.

In this embodiment shown in FIGS. 16 and 17, in accordance with a contents data generated by the contents data generating means 16 of the data transmitting apparatus 5 and based on such a profile ID corresponding to such a profile selected by the profile selecting means 22 and also based on such a profile ID generated by the profile ID generating means 18, normally, the profile ID determined by the profile ID determining means 23 is output to the data receiving apparatus 15 as it is via the data output means 96 without being written into the contents data, where only the profile ID is transmitted via the broadcasting form to cause the user to receive only the transmitted profile ID. The profile ID determined by the profile ID determining means 23 is output to the data output means 96 and also to the profile ID writing means 24. Next, the determined profile ID is written into a predetermined data area of the corresponding contents data by the profile ID writing means 24 and then delivered to the broadcast data memory means 97 inside of the memory 12 of the personal computer 14 before being stored therein. Only in such a case in which the above-referred transmission request receiving means 95 has received such a transmission requesting signal from a user in receipt of the broadcast profile ID which notifies transmission of the corresponding contents data, in accordance with an instruction signal from the transmission request receiving means 95, such a contents data added with the corresponding profile ID stored in the broadcast data memory means 97 is read out by the data output means 96 and then delivered to the data transmitting apparatus 15 before eventually being transmitted via the broadcasting form. Simultaneous with the external delivery of a predetermined contents data, a proper profile ID corresponding to the transmission request signal is added to the contents data by the transmission request receiving means 95.

As shown in FIG. 17, the sub-CPU 31 of the data receiving device 35 which is interchangeably built in the portable terminal apparatus 4 incorporates the transmission requesting means 98 capable of receiving an event signal from the event signal generating means 47. In the portable terminal apparatus 4 related to this embodiment, the profile ID identifying means 40 solely receives profile IDs. While there is no transmission of the contents data, the profile ID identifying means 40 outputs a signal for notifying the event signal generating means 47 of this condition. In response, the event signal generating means 47 generates a transmission requesting signal for requesting transmission of a contents data and then delivers this signal to a transmission requesting means 98. In response, the transmission requesting means 98 transmits a transmission requesting signal to the data transmitting apparatus 5 for requesting transmission of a proper contents data corresponding to the received profile ID.

According to this embodiment, the data transmitting apparatus 5 solely broadcasts the profile IDs. Only in such a case in which the transmission request receiving means 95 receives a signal for requesting transmission of a contents data from the transmission requesting means 98 of the data receiving device 35 interchangeably built in the portable terminal apparatus 4, such a contents data added with a corresponding profile ID stored in the broadcast data memory means 97 is output to the data transmitting apparatus 15 and then transmitted via the broadcasting form. On the other hand, it is so arranged that, based on a proper profile ID corresponding to a transmission requesting signal added to the corresponding contents data output from the transmission request receiving means 95, the contents data is received by the profile ID identifying means 40 of the data receiving device 35 which is interchangeably built in the portable terminal apparatus 4. Accordingly, the amount of data subject to broadcasting is decreased to enable the receiving party to selectively receive only the required information. On the other hand, only the proper profile is subject to broadcasting unless there is no request for transmitting it, even when a greater amount of information is broadcasted, the amount of data to be subject to broadcasting can be prevented from being increased. This in turn enables the user to selectively receive only the required information by way of utilizing profile IDs.

Further, according to this embodiment, inasmuch as the amount of data subject to broadcasting can be decreased, it is possible to mount the data transmitting apparatus 5 on a movable vehicle such as a taxi cab for example, thus making it possible to broadcast a variety of information related to sale and prize per individual local district to provide fine services.

Figure 18:
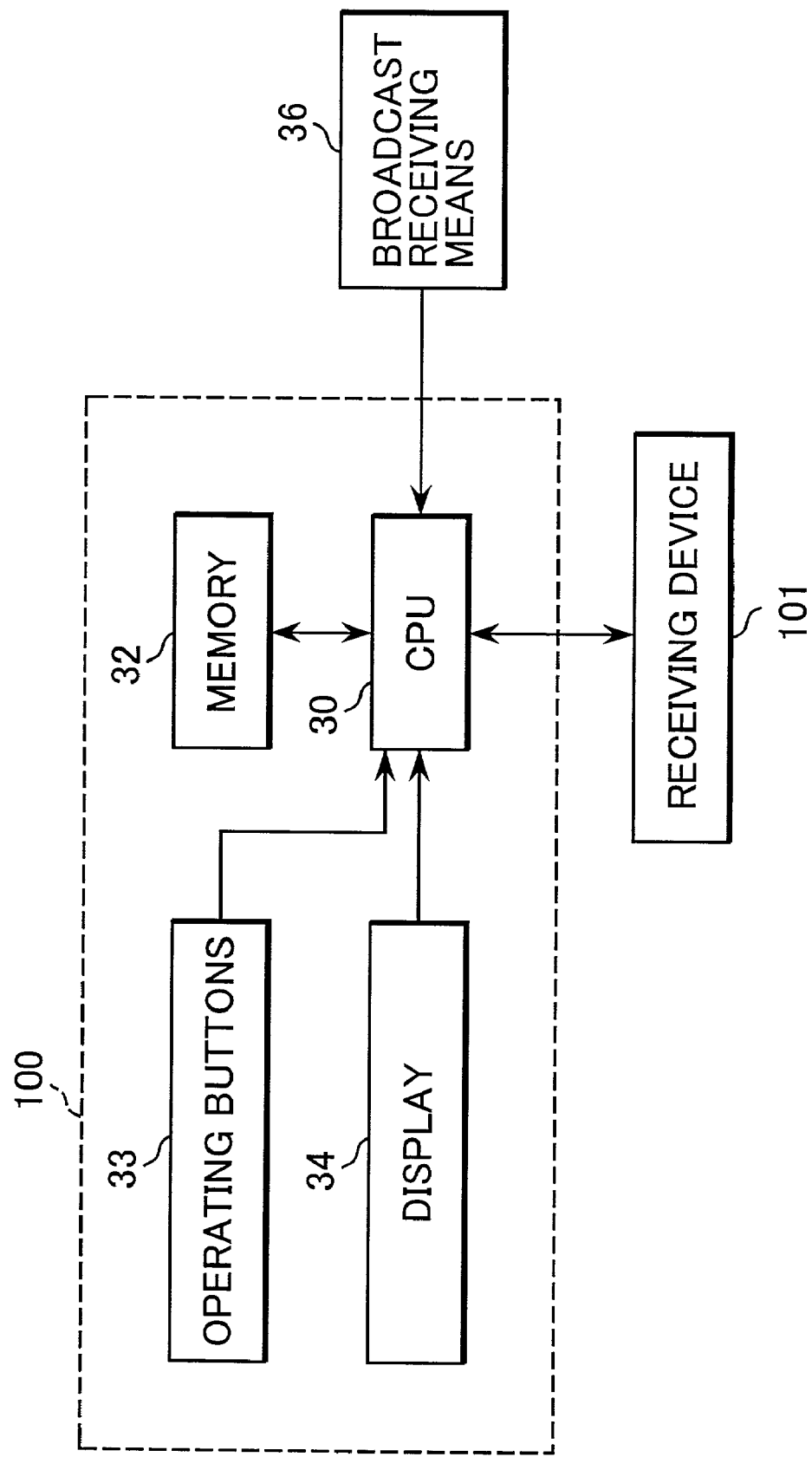
FIG. 18 is a schematic block diagram of a portable terminal apparatus of a data communication system related to another preferred aspect for implementing the present invention.

FIG. 18 is a schematic block diagram of the portable terminal apparatus 4 provided for the data communication system related to a still further aspect for implementing the present invention.

As shown in FIG. 18, the portable terminal apparatus 4 related to this embodiment is provided with a personal computer 100 consisting of the main-CPU 30, the memory 32, a group of operating buttons 33, and the display 34, a data receiving device 101 comprising a "Smart Media", and the broadcast data receiving means 36 for receiving broadcast data. The data receiving device 101 is interchangeably built in the portable terminal apparatus 4.

Figure 19:
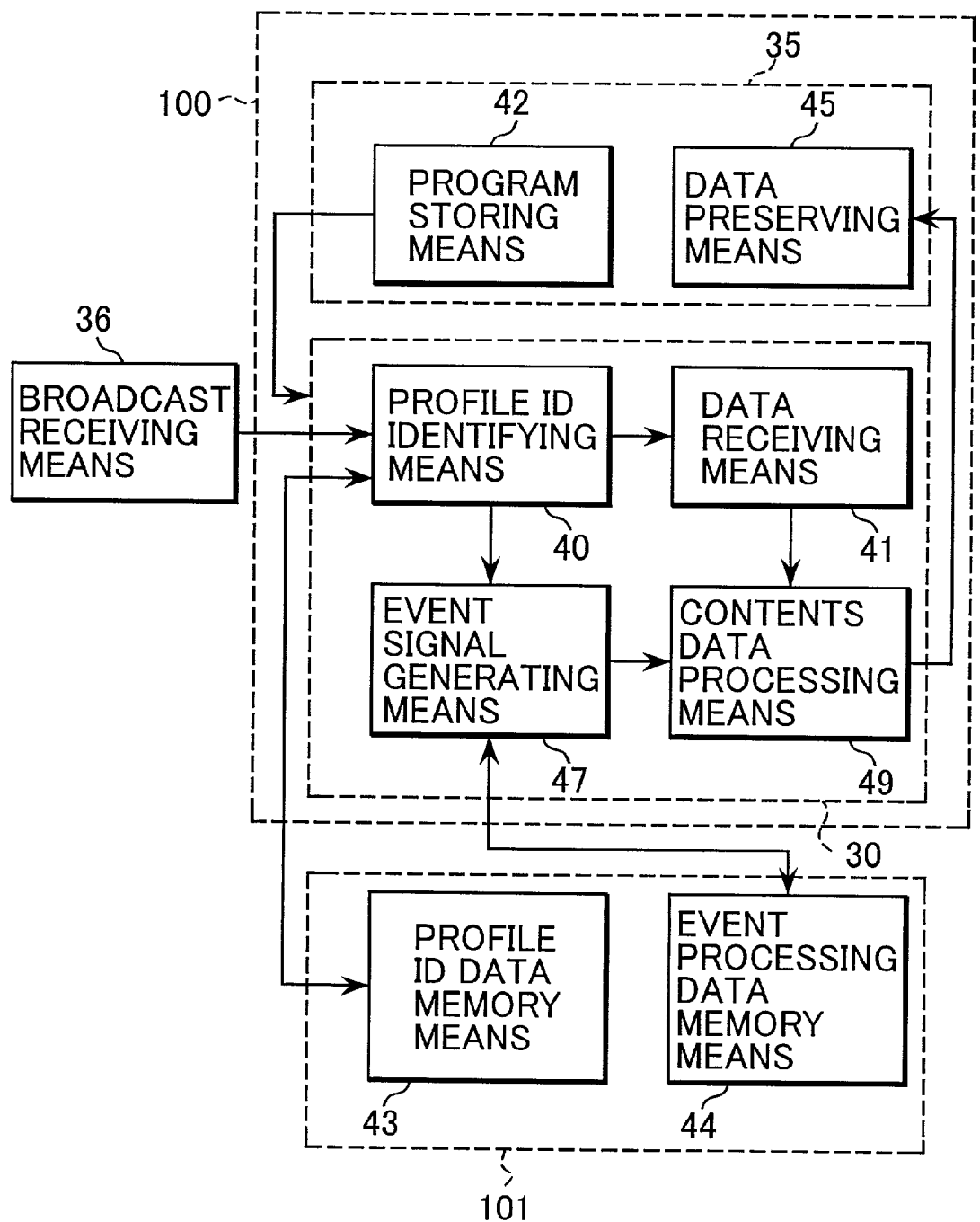
FIG. 19 is a schematic block diagram designating details of a personal computer and a data receiving device.

FIG. 19 is a schematic block diagram designating detailed structural components of the personal computer 100 and the data receiving device 101.

As shown in FIG. 19, the main-CPU 30 built in the personal computer 100 comprises the following: the profile ID identifying means 40 which, based on a profile ID added to a contents data received by the broadcast data transmitting means 36, identifies whether the contents data should decisively be received or not; and the data receiving means 41 which receives such a contents data identified by the profile ID identifying means 40 to be receivable decisively.

As shown in FIG. 19, the memory 32 of the personal computer 100 comprises the following: the program storing means 42 which stores operating programs of the main-CPU 30, and the data preserving means 45 which stores the contents data received by the data receiving means 41 of the main-CPU 30.

As shown in FIG. 19, the data receiving device 35 interchangeably built in the portable terminal apparatus 4 comprises the following: the received profile ID data memory means 43 which stores a received profile data consisting of receivable profile IDs; and the event processing data memory means 44 which stores such an event processing data for coordinating such a profile ID stored in the received profile ID memory means 43 with the processing contents.

As shown in FIG. 19, the main-CPU 30 built in the personal computer 100 comprises the following: the event signal generating means 47 which, in response to such a profile ID identified by the profile ID identifying means 40 to be receivable and in accordance with an event processing data stored in the event processing data memory means 44, generates an event signal for instructing to execute a predetermined process and then externally delivers the generated event signal; and the contents data processing means 49 which processes such a contents data received by the data receiving means 41.

The receivable profile ID data is generated by an independent apparatus discrete from the portable terminal apparatus 4 and then stored in the received profile ID data memory means 43. Likewise, the event processing data is generated by an independent apparatus discrete from the portable terminal apparatus 4 and then stored in the event processing data memory means 44.

According to this embodiment, the data receiving device 35 comprises the received profile ID data memory means 43 which stores such a received profile ID data consisting of receivable profile IDs and the event processing data memory means 44 which stores such an event processing data for coordinating such a profile ID stored in the received profile ID data memory means 43 with the processing contents. Inasmuch as the data receiving device 35 is interchangeably built in the portable terminal apparatus 4, by way of setting the data receiving devices 35 inside of other portable terminal apparatuses 4 and also by way of enabling other portable terminal apparatuses 4 to utilize the received profile ID data stored in the received profile ID data memory means 43 and the event processing data stored in the event processing data memory means 44 used for coordinating the profile ID with the processing contents, it is possible for each user to efficiently and selectively receive only the required contents data via a plurality of portable terminal apparatuses 4.

Figure 20:
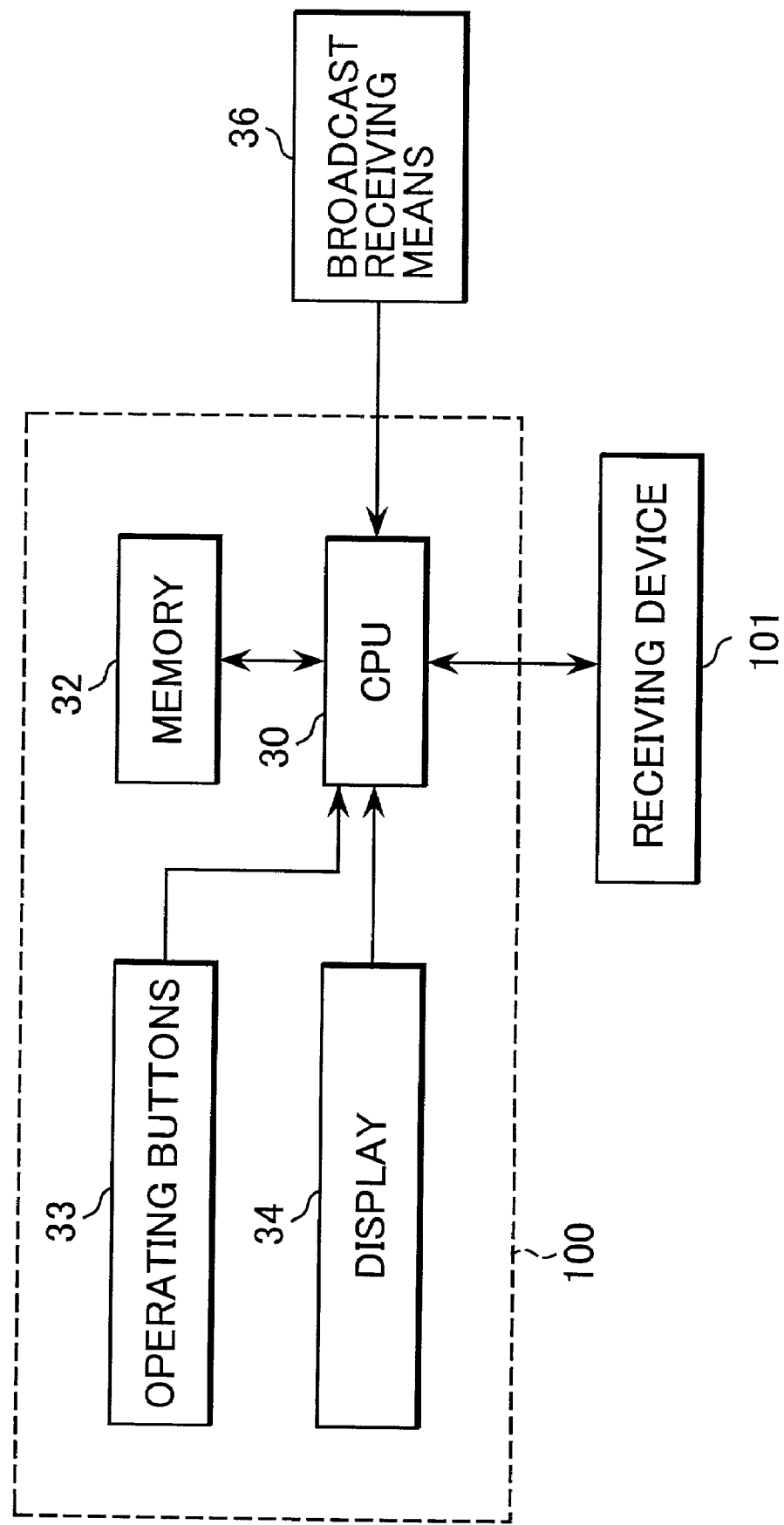
FIG. 20 is a schematic block diagram of a portable terminal apparatus of a data communication system related to a further preferred aspect for implementing the present invention.

FIG. 20 is a schematic block diagram of the portable terminal apparatus 4 of the data communication system related to a still further aspect for implementing the present invention.

As shown in FIG. 20, the portable terminal apparatus 4 related to this embodiment is provided with the personal computer 100 comprising the main-CPU 30, the memory 32, a group of operating buttons 33, and the display 34, the data receiving device 101, and the broadcast data receiving means 36 which receives broadcast data. The data receiving apparatus 101 is interchangeably built in the portable terminal apparatus 4.

Figure 21:
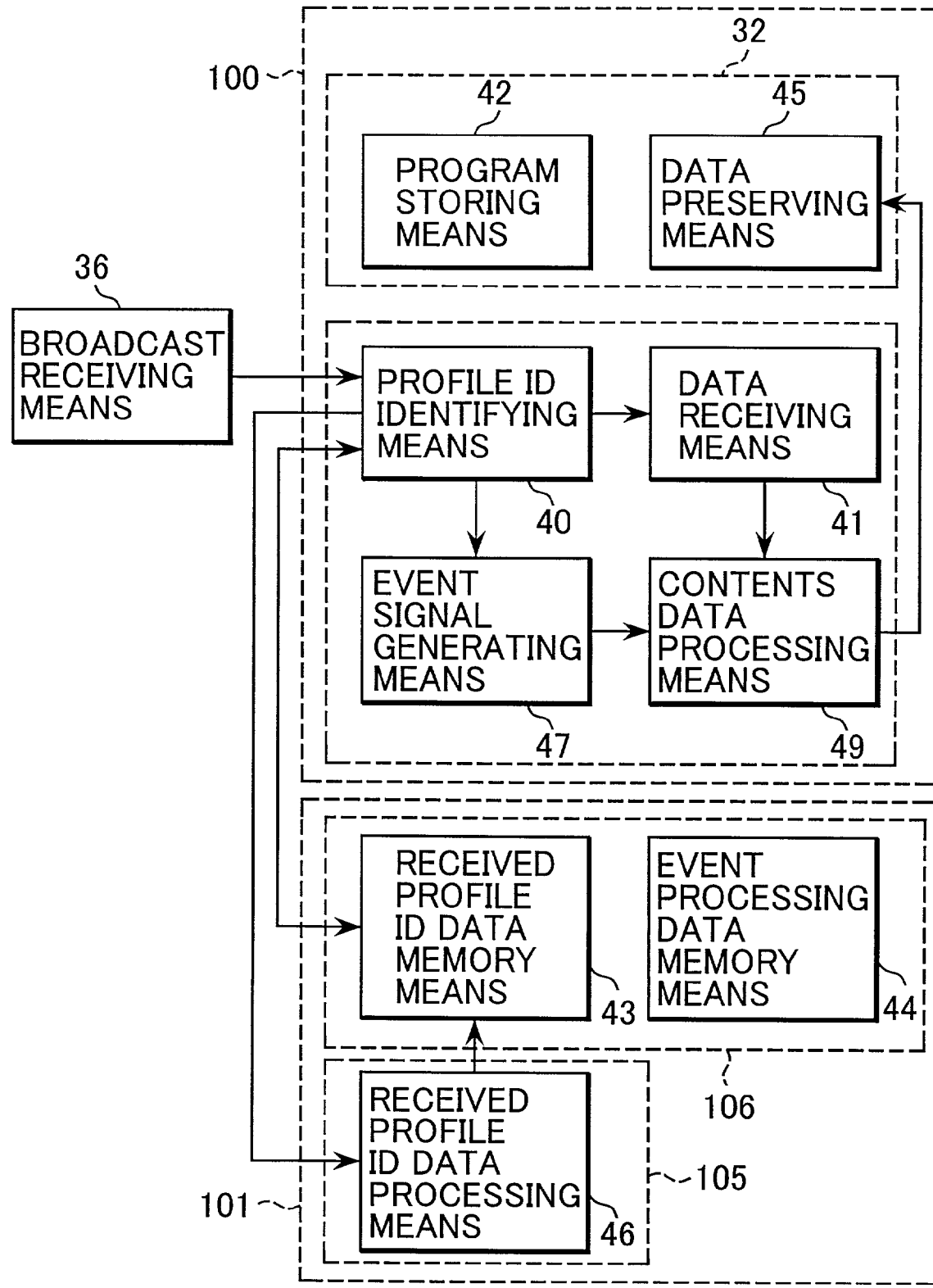
FIG. 21 is a schematic block diagram designating details of a personal computer and a data receiving device.

FIG. 21 is a schematic block diagram designating structural details of the personal computer 100 and the data receiving device 101.

As shown in FIG. 21, the main-CPU 30 built in the personal computer 100 comprises the following: the profile ID identifying means 40 which, based on the profile ID added to a contents data received by the broadcast data receiving means 36, identifies whether the contents data should decisively be received or not; and the data receiving means 41 which receives such a contents data identified by the profile ID identifying means 40 to be receivable decisively.

As shown in FIG. 21, the memory 32 built in the personal computer 100 comprises the program storing means 42 for storing operating programs of the main-CPU 30 and the data preserving means 45 for storing such a contents data received by the data receiving means 40 of the main-CPU 30.

As shown in FIG. 21, the data receiving device 35 interchangeably built in the portable terminal apparatus 4 incorporates a main-CPU 105 and a memory 106. The memory 106 comprises the following: the received profile ID data memory means 43 which stores such a received profile ID data consisting of receivable profile IDs, and the event processing data memory means 44 which stores such an event processing data for coordinating the profile ID stored in the received profile ID data memory means 43 with the processing contents.

The received profile ID data is generated by an independent apparatus discrete from the portable terminal apparatus 4 and stored in the received profile ID data memory means 43. Likewise, the event processing data is also generated by an independent apparatus discrete from the portable terminal apparatus 4 and stored in the event processing data memory means 44.

As shown in FIG. 21, the main-CPU 105 of the data receiving device 35 interchangeably built in the portable terminal apparatus 4 incorporates the received profile ID data processing means 46. Such a profile ID identified to be receivable by the profile ID identifying means 40 built in the main-CPU 30 of the personal computer 100 is delivered to the received profile ID data processing means 46 built in the main-CPU 105 of the data receiving device 35. On the other hand, in accordance with a program stored in the program storing means 42 of the memory 32, the received profile ID data processing means 46 analyzes the profile ID received from the profile ID identifying means 40 as the received antecedent data, and then rewrites the received profile ID data stored in the received profile ID data memory means 43 as required.

As shown in FIG. 21, the main-CPU 30 of the personal computer 100 comprises the following: the event signal generating means 47 which, in response to such a profile ID identified by the profile ID identifying means 40 to be receivable decisively and in accordance with an event processing data stored in the event processing data memory means 44 of the data receiving device 35, generates an event signal for instructing that a predetermined process should be executed and then externally delivers the event signal; and the contents data processing means 49 which processes such a contents data received by the data receiving means 41.

According to this embodiment, the data receiving device 35 comprises the above-referred received profile ID data memory means 43 which stores the received profile ID data consisting of receivable profile IDs; and the above-referred event processing data memory means 44 which stores such an event processing data for coordinating the profile ID stored in the received profile ID data memory means 43 with the processing contents. Inasmuch as the data receiving device 35 is interchangeably built in the portable terminal apparatus 4, by way of setting the data receiving devices 35 inside of other portable terminal apparatuses 4 and also by way of enabling other portable terminal apparatuses to also utilize such a received profile ID data stored in the received profile ID data memory means 43 and an event processing data for coordinating the profile ID stored in the event processing data memory means 44 with the processing contents, it is possible for each user to efficiently and selectively receive only the required contents data via a plurality of portable terminal apparatuses.

Further, according to this embodiment, the data receiving device 35 incorporating a received profile ID data processing means 46 is interchangeably built in the portable terminal apparatus 4, wherein the received profile ID data processing means 46 analyzes the profile ID identified by the profile ID identifying means 40 to be receivable as the received antecedent data and then rewrites the received profile ID data stored in the received profile ID data memory means 43, and thus, by way of setting the data receiving devices 35 inside of a plurality of portable terminal apparatuses 4 and also by way of generating a received profile ID data based on the profile IDs received by plural portable terminal apparatuses 4, it is possible to store the generated profile IDs in the received profile ID memory means 43.

Figure 22:
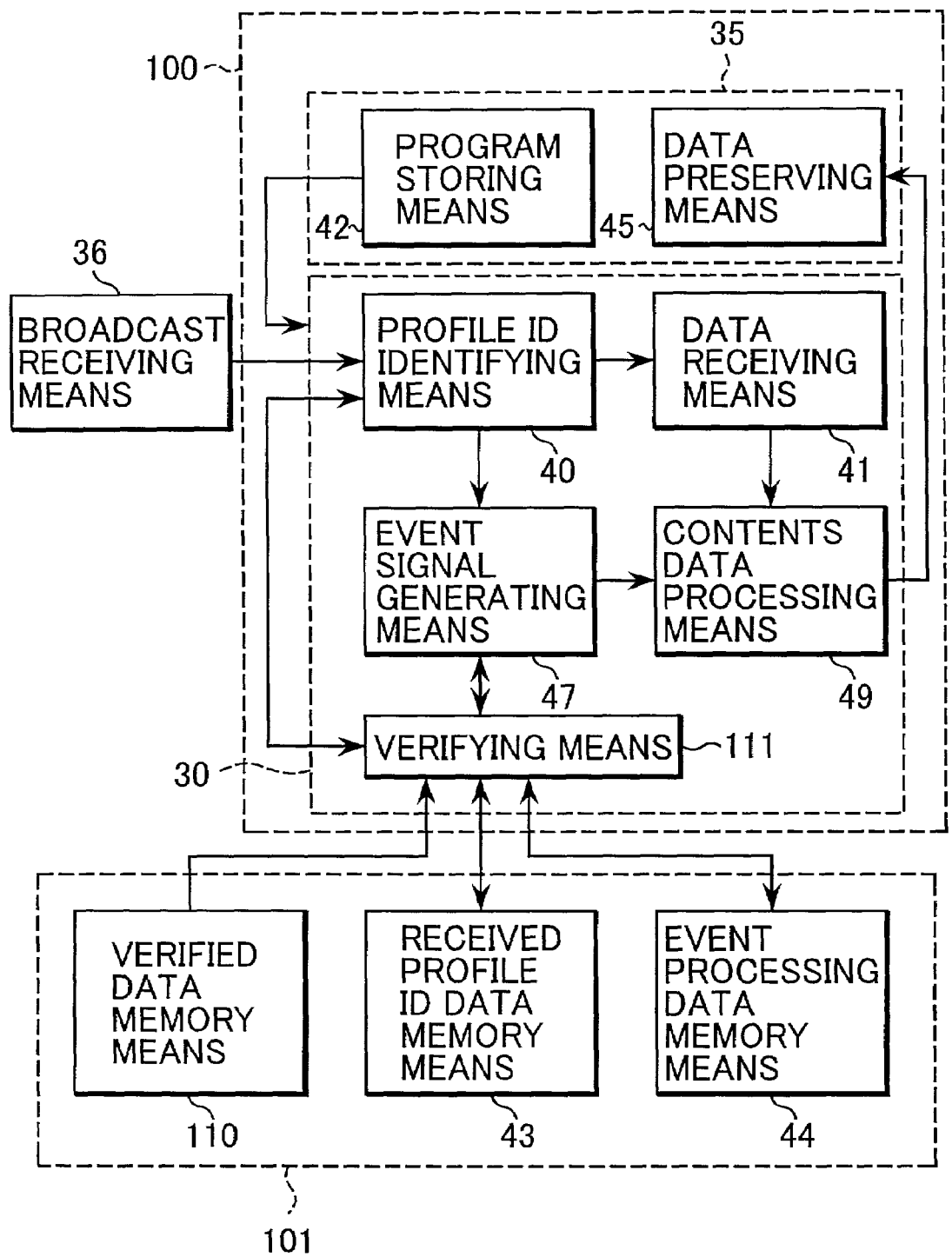
FIG. 22 is a schematic block diagram of a portable terminal apparatus and a data receiving device usable for a data communication system related to a still further preferred aspect for implementing the present invention.

FIG. 22 is a schematic block diagram of the portable terminal apparatus 3 and the data receiving device 101 used for the data communication system related to a still further preferred aspect for implementing the present invention.

The data receiving device 101 used for this embodiment consists of a portable "Memory Stick". Like the data receiving device 101 shown in FIG. 19, the data receiving device 101 used for this embodiment incorporates the received profile ID data memory means 43 and the event processing data memory mean 44.

The data receiving device 101 used for this embodiment further incorporates a verified data memory means 110. In this embodiment, the verified data memory means 110 stores individual finger prints as the verifying data.

The portable terminal apparatus 3 also incorporates a verifying means 111 in correspondence with the data receiving device 110. The portable terminal apparatus 3 reads a verified data stored in the verified data memory means 110, and then, solely in the case in which the readout verifying data correctly matches the predetermined verifying data, the portable terminal apparatus 3 approves connection of the data receiving device 101 thereto.

According to this embodiment, solely in the case in which a verified data stored in the verified data memory means 110 of the data receiving device 101 exactly corresponds to the predetermined verifying data, the portable terminal apparatus 3 approves connection of the data receiving device 101 thereto. Since the data receiving device 101 consists of a portable "Memory Stick", there is a fear of losing it for any reason. However, because of the above arrangement, it is possible to securely prevent the portable data receiving device 101 from being abused by others.

It should be understood that the scope of the present invention is not limited to the above-described practical aspects for implementing the present invention, but a variety of modifications and changes may also be effected within the scope of the present invention specified in claims, and yet, it is needless to mention that the practicable modifications and changes are also included in the scope thereof.

For example, in the embodiments shown in FIGS. 2 and 3 and another embodiment shown in FIG. 16, the personal computer 14 provided for the transmitting apparatus 5 of the data communication system incorporates the main-CPU 10 and the sub-CPU 11. However, it is also possible to provide the personal computer 14 with a single CPU or three or more than three of CPUs.

Further, in the embodiments shown in FIGS. 7, 8, 11, and 12, the personal computer 55 provided for the communication data processing apparatus 50 of the data communication system incorporates the main-CPU 50 and the sub-CPU 51. However, it is also possible to provide the personal computer 55 with a single CPU or three or more than three CPUs as well.

Further, in the embodiments shown in FIGS. 5, 6, 9, 10, 13, and 17, the data receiving device 35 interchangeably built in the portable terminal apparatus 4 of the data communication system incorporates the main CPU 30 and the sub-CPU 31. However, it is also possible to provide the data receiving device 35 with a single CPU or three or more than three CPUs as well.

Further, in the embodiments shown in FIG. 14 and 15, the data receiving device 35 interchangeably built in the portable terminal apparatus 4 of the data communication system incorporates the main-CPU 30, the first sub-CPU 71, and the second sub-CPU 72. However, it is also possible to provide the data receiving device 35 with a single CPU, or two CPUs, or four or more than four CPUs as well.

Further, in the preceding embodiments, each of the unit profile data such as a, . . . i, . . . j, k, constitutes a tree-structure having a minimum of 3 layers. However, it is not always necessary to provide all the unit profile data with the tree-structure having a minimum of 3 layers.

Further, in the embodiments shown in FIGS. 18 and 19, the data receiving device 35 consists of the "Smart Media", whereas another embodiment shown in FIG. 22 utilizes the data receiving device 35 consisting of the "Memory Stick". However, in the embodiments shown in FIGS. 18 and 19, it is also possible to utilize the data receiving device 35 consisting of the "Memory Stick". Likewise, in the embodiment shown in FIG. 22, it is also possible to utilize the data receiving device 35 consisting of the "Smart Media". Further it is also possible to constitute the data receiving device 101 by utilizing the "Sim Card", or the "Compact Flash", or the "Memory Card" in place of the "Smart Media" and the "Memory Stick".

Further, in the embodiment shown in FIG. 22, individual finger prints are utilized as the verifying data. However, it is also possible to utilize other verifying data comprising other biometrical data such as vein distribution data, voice-print data, or data on the reddened symptom of eye-balls, for example.

Further, in the preceding embodiments shown in FIGS. 5, 6, 9, 10, 13, 14, 15, and 17, the data receiving device 35 interchangeably built in the portable terminal apparatus 4 of the data communication system incorporates various functions including such a function for memorizing receivable profile IDs, such a function for identifying a profile ID added to a contents data and receiving the profile ID, and such a function for analyzing a profile ID identified by the profile ID identifying means 40 to be receivable and renewing the received profile ID data. However, like the data receiving device 35 interchangeably built in the portable terminal apparatus 4 of the data communication system according to the embodiments shown in FIGS. 18 and 19, even when the data receiving device 35 solely contains such a function for memorizing the receivable profile IDs, or like the data receiving device 35 interchangeably built in the portable terminal apparatus 4 of the data receiving device 35 related to the embodiments shown in FIGS. 20 and 21, it is also possible to provide the data receiving device 35 solely with such a function for memorizing the receivable profile IDs and such a function for analyzing the profile ID identified by the profile ID identifying means 40 to be receivable and renewing the received profile ID data.

Further, in the above embodiments, initially, operator inputs a profile via the keyboard 13 to cause the profile generating means 17 to generate a profile data and then causes the profile data memory means 20 to store the profile data therein. However, it is also possible to cause the profile data memory means 20 to store a discretely generated profile data and then causes the profile generating means 17 to change the profile data or add a profile to the profile data.

Further, in the above embodiments, a profile ID is written into a contents data by the profile ID writing means 24 and 94. However, it is merely required to cause a specific profile ID to be linked with the corresponding contents data, and thus, it is not always necessary to write the profile ID in the contents data.

Further, in the preceding embodiments shown in FIGS. 2 and 3, the above-referred data transmitting apparatus 15 of the transmitting apparatus 5 broadcasts a contents data containing a written profile ID. In the embodiments shown in FIGS. 7, 8, 11, and 12, the data transmitting apparatus 56 of the communication data processing apparatus 50 broadcasts a contents data containing a written profile ID. Further, in the embodiments shown in FIGS. 14 and 15, the data transmitting apparatus 85 of the portable terminal apparatus 4 broadcasts a contents data containing a written profile ID. However, in the same way as was done for the embodiment shown in FIG. 16, it is also allowable to cause only the profile ID to be broadcasted.

Further, in the above embodiment, in terms of the profile related to the contents of a contents data, in particular, when transmitting such a profile related to sports program, music program and movies program from a transmitting party, the name of the party and the time of transmitting the related contents data are specified, and yet, as the profile related to the receiving party of the profile, sexual classification, age, address, group ID, kinds of equipment for constituting the data receiving apparatus, receptive capacity of the receiving apparatus, reproduction capacity of the receiving apparatus are exemplified. However, the scope of profile related to the contents of the contents data is not solely limited to those which are cited above, but it is possible to generate any kind of profile related to the contents of the contents data such as live drama, cooking, travel, or the like, whereby making it possible to identify the contents of the contents data per corresponding profile. As the profile related to the transmitting party of the profile, the location and the method of transmission are also included. As the profile related to the receiving party of the profile, a variety of identifying data are included as cited below; sexual classification, age, blood-type, birth date, full name, address, zip code, ID address, stationary telephone number, portable telephone number, mail address, kinds of equipment for composing the data receiving apparatus, receptive capacity of the data receiving apparatus, reproduction capacity of the data receiving apparatus, operating system, names of POP/SMTP servers, group ID of the receiving party, group identifier, individual ID, and pass-words.

Further, in the above embodiment, the data receiving apparatus consists of a portable terminal apparatus 4. However, the data receiving apparatus is not solely sufficed with the portable terminal apparatus 4, but a variety of apparatuses containing communicating function are also available for the data receiving apparatus, and yet, the data receiving apparatus may be mounted on a movable means such as an automobile, an electric train, a mono-rail train, a bicycle, or a movable chair, or the like.

Further, it is also possible to set the data receiving apparatus 35 according to the preceding embodiments shown in FIGS. 5, 6, 9, 10, 13, 14, and 15 inside of any of the home electric apparatuses containing communicating function such as a TV monitor set, for example, in order to select a specific contents data that should be received based on a specific profile ID for receiving only the desired contents data.

Further, in the preceding embodiments, a profile and a profile ID are respectively generated by operating keyboards 13, 54 and operating buttons 33. However, it is also possible to select a proper profile and a proper profile ID by referring to a list of opened profiles and profile IDs via internet service in order to input the selected profile and profile ID to the data transmitting apparatus 5, the communication data processing apparatus 50, and to the portable terminal apparatus 4.

In the preceding embodiments, it is so arranged that, based on an event signal generated by the event signal generating means 47, the contents data processing means 49 causes the data preserving means 45 to store the received contents data therein and then processes this data before reproducing it. Alternatively, the content data processing means 49 causes such a contents data added with a profile ID to be stored in a predetermined holder area of the data preserving means 45. However, the process executed by the contents data processing means 49 against the received contents data based on an event signal generated by the event signal generating means 47 is not solely limited to the one described above.

Further, in the preceding embodiments shown in FIGS. 10 and 17, based on an event signal generated by the event signal generating means 47, it is so arranged that the event signal processing means 75 outputs a drive signal to the vibration generating means 77 and the audio generating means 78 to enable the vibration generating means 77 to vibrate the portable terminal apparatus 4 and the audio generating means 78 to generate audio. However, it is also possible to arrange the event signal generating means 75 in order that only either of the process for vibrating the portable terminal apparatus 4 and the other process for generating audio can be executed. Further, it is also possible to enable the event signal generating means 75 to execute those processes including display of a pop-up message, transfer of the received contents data to other portable terminal apparatuses, commencement of communication with other portable terminal apparatuses, and activation of a predetermined program, on an individual basis or by way of combining more than two of the above processes in addition to the above-referred vibration of the portable terminal apparatus 4 and generation of audio or in place of these functions.

Further, in the preceding embodiments shown in FIGS. 10 and 17, the resetting means 76 counts the rounds of the reception of contents data received by the data receiving means 41, and then, if the rounds of the reception of contents data received by the data receiving means 41 is less than a predetermined rounds N within a predetermined time T and found too small, the resetting means 76 resets a receivable profile ID to be back to such a profile ID corresponding to a profile having the layer upper by one than the profile corresponding to a profile ID preset by user, and then, the profile ID identifying means 40 identifies whether the above-referred contents data should be received or not in accordance with a profile ID corresponding to the profile having the layer upper by one until the rounds of the reception of contents data received by the data receiving means 41 exceed a predetermined round N within a predetermined time T. However, it is not always necessary to install the resetting means 76, but it is also practicable to cause the profile ID identifying means 40 to constantly identify whether the above-referred contents data should be received or not based on the profile ID preset by user.

Further, in the preceding embodiments shown in FIGS. 10 and 17, the above-referred resetting means 76 resets a profile ID in accordance with the rounds of the reception of contents data received by the data receiving means 41 within a predetermined time T. However, in addition to the rounds of the reception of contents data or in place of the rounds of the reception of contents data, it is also possible to enable the resetting means 76 to reset the profile ID itself in accordance with the time of receiving a contents data.

In the preceding embodiments shown in FIGS. 12 and 13, any of the above-referred contents data and any of the profile IDs added to the contents data are respectively ciphered by the ciphering means 80 and then deciphered solely by the deciphering means 81. However, it is also possible to arrange that only the profile ID is initially ciphered by the ciphering means 80 and then broadcast, and then, enable only such a data receiving apparatus like the portable terminal apparatus 4 capable of deciphering the ciphered profile ID via own deciphering means 81 to receive a specific contents data added with the deciphered profile ID.

Further, in the preceding embodiments shown in FIGS. 12 and 13, using the secrete key DES, a specific contents data and a specific profile ID added to the contents data are respectively ciphered via the ciphering means 80, which are then deciphered by the deciphering means 81. However, the applicable secrete key is not solely limited to the DES, but a triple DES key is also used. Further, it is also possible to cipher and decipher a specific contents data and a specific profile ID added thereto by applying the publicly open keys such as an RSA key, an RC4 key, or an RGP key being open other than the transmitting apparatus 5 and the portable terminal apparatus 4.

Further, in the preceding embodiment shown in FIG. 16, the transmitting apparatus 5 is mounted on a taxi cab. However, not only a taxi cab, but the transmitting apparatus 5 is also mountable on a private car, a bus, an electric train, a mono-rail train, a bicycle, a movable chair, or a movable food shop, or the like.

Further, in the preceding embodiments, each profile ID is written into a predetermined data area of a contents data. However, it is also allowable to write the profile ID into a corresponding contents data at a predetermined time interval by applying water mark technique.

Further, in the preceding embodiments, the personal computer 14 provided for the transmitting apparatus 5 incorporates the memory 12, whereas the personal computer 35 provided for the portable terminal apparatus 4 incorporates the memory 35, and yet, the other personal computer 55 provided for the communication data processing apparatus 50 incorporates the memory 53. Each of the personal computers 14, 35, and 55, incorporates individual memory 12, 32, and 53. It is also possible to provide all the personal computers 14, 35, and 55 with two or more than two of memories, or provide any of the above personal computers 14, 35, and 55, with two or more than two of memories.

Further, in the preceding embodiments shown in FIGS. 5 and 6, such a profile ID identified by the profile ID identifying means 40 to be receivable is delivered to the received profile ID data processing means 46. Then, in accordance with a program stored in the program storing means 42 of the memory 32, the received profile ID data processing means 46 analyzes the profile ID delivered from the profile ID identifying means 40 as the received antecedent data, and then rewrites the received profile ID data stored in the received profile ID data memory means 43 as required. However, it is not always necessary that the received profile ID data processing means 46 incorporates the function to analyze the profile ID. It is suggested to systematize the processes as follows: Initially, availing of a conventional profile data presented via an internet service, user inputs a receivable profile ID by operating buttons 33 of the portable terminal apparatus 4 or inputs a receivable profile so as to receive a corresponding profile ID via an internet service, and then causes the received profile ID data processing means 46 to write the corresponding profile ID into the received profile ID data memory means 43 to generate a reception profile ID data.

Further, in the preceding embodiments, each event processing data is stored in the event processing data memory means 44. However, it is also possible to store the event processing data in the received profile ID data memory means 43.

Further, it should be understood that the terms "means" described in this specification does not always mean a physical means, but it also includes such a case in which function of each means is realized via software. Further, even when the function of a single means is realized by two or more than two of physical means, it is possible to enable two or more than two of functions to be realized by a single physical means.

According to the present invention, even when the amount of data subject to broadcasting becomes significantly and excessively large, the present invention makes it possible to provide such a data communication system enabling the receiving party to selectively receive only the required contents data.

Further, according to the present invention, it is possible to provide such a receiving apparatus usable for the data communication system, which is compatible with such a data communication system capable of selectively receiving only those data actually required for reception by users even when the amount of broadcast data ever becomes excessively large.

What is claimed is:

1. A data communication system comprising:
   a transmitting apparatus incorporating a contents data generating means for generating a contents data;
   a plurality of receiving apparatuses;
   a data transmitting apparatus which transmits data between said transmitting apparatus and said receiving apparatuses;
   a data selecting and receiving means wherein at least one of said plural receiving apparatuses selects and receives data transmitted from said transmitting apparatus;
   a received data processing means for processing data received by said data selecting and receiving means; and
   a profile ID linking means which initially generates a profile ID corresponding to a profile related to said contents data and/or transmission and reception of said contents data and then causes said profile ID to be linked with said contents data;
   wherein a receiving device incorporating a received profile ID data memory means for storing a profile ID data including a receivable profile ID is interchangeably incorporated in at least one of said receiving apparatuses; and said data selecting and receiving means selects and receives data based on said profile ID;
   wherein said profile comprises such a data related to the contents of each contents data, such a data related to said transmitting apparatus, and such a data related to said receiving apparatuses;
   wherein said profile includes such a data containing a tree-structure; and
   wherein said received data processing means provided for at least one of aid receiving apparatuses further comprises a profile ID resetting means which, after causing said data selecting and receiving means to count the rounds of the reception of data received by itself, if the rounds of the reception of data received by said data selecting and receiving means are less than the predetermined rounds, resets said profile ID used for selecting data by said data selecting and receiving means to be back to such a profile ID corresponding to a profile having own layer one grade upper than a profile present in said tree structure corresponding to said profile ID.

2. A receiving apparatus used for a data communication system including
   a data selecting and receiving means for selecting and receiving a broadcast contents data and
   a received data processing means for processing said data received by said data selecting and receiving means;
   wherein said receiving apparatus comprises a receiving device provided with a received profile ID data memory means for storing such a profile ID data including a receivable profile ID;
   said data selecting and receiving means is constituted as to select a proper contents data based on such a profile ID corresponding to a profile related to said contents date and/or transmission and reception of said contents data and being linked with said contents data;
   wherein said profile comprises such a data related to the contents of a contents data, such a data related to the transmitting apparatus, and such a data related to the receiving apparatuses;
   wherein said profile includes such a data containing tree-structure;
   said receiving apparatus further comprising:
   a profile ID resetting means which, after causing said data selecting and receiving means to count the rounds of the reception of data received by said receiving means, if the rounds of the reception of data received by said receiving means are less than the predetermined rounds within a predetermined time T, resets said profile ID used for data selection by said data selecting and receiving means back to such a profile ID corresponding to such a profile having own layer upper than the profile present in said tree-structure corresponding to said profile ID.

* * * * *